United States Patent
Tsou et al.

(10) Patent No.: US 11,466,149 B2
(45) Date of Patent: Oct. 11, 2022

(54) PREPARATION OF BIMODAL RUBBER, THERMOPLASTIC VULCANIZATES, AND ARTICLES MADE THEREFROM

(71) Applicant: ExxonMobil Chemical Patents Inc., Baytown, TX (US)

(72) Inventors: Andy H. Tsou, Houston, TX (US); John R. Hagadorn, Houston, TX (US); Jian Yang, Houston, TX (US); Ron Walker, Pearland, TX (US); Sudhin Datta, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 34 days.

(21) Appl. No.: 16/460,260

(22) Filed: Jul. 2, 2019

(65) Prior Publication Data

US 2020/0024436 A1    Jan. 23, 2020

Related U.S. Application Data

(60) Provisional application No. 62/701,898, filed on Jul. 23, 2018.

(51) Int. Cl.
| | | |
|---|---|---|
| C08L 23/16 | (2006.01) | |
| C08F 210/18 | (2006.01) | |
| C08J 3/12 | (2006.01) | |
| B29K 23/00 | (2006.01) | |
| B29B 9/06 | (2006.01) | |

(52) U.S. Cl.
CPC ............ *C08L 23/16* (2013.01); *C08F 210/18* (2013.01); *C08J 3/12* (2013.01); *B29B 9/06* (2013.01); *B29K 2023/16* (2013.01); *C08F 2800/20* (2013.01); *C08L 2205/03* (2013.01); *C08L 2207/322* (2013.01); *C08L 2312/00* (2013.01)

(58) Field of Classification Search
CPC ...................................................... C08L 23/16
See application file for complete search history.

(56) References Cited

U.S. PATENT DOCUMENTS

| | | |
|---|---|---|
| 6,528,670 B1 | 3/2003 | Rix |
| 6,559,253 B2 | 5/2003 | Crowther et al. |
| 9,234,093 B2 | 1/2016 | Ellul et al. |
| 10,280,240 B2 | 5/2019 | Hagadorn et al. |
| 10,676,547 B2 | 6/2020 | Holtcamp et al. |
| 10,723,821 B2 | 7/2020 | Yang et al. |
| 2014/0256893 A1 | 9/2014 | Hagadorn et al. |
| 2019/0144653 A1 | 5/2019 | Tsou et al. |
| 2020/0199460 A1 | 6/2020 | Bridier et al. |

FOREIGN PATENT DOCUMENTS

| | | | |
|---|---|---|---|
| EP | 0612768 | 11/1997 | |
| WO | 1996/033227 | 10/1996 | |
| WO | 1997/022635 | 6/1997 | |
| WO | 2008/016429 | 2/2008 | |
| WO | 2009/082463 | 7/2009 | |
| WO | WO-2016196331 A1 * | 12/2016 | ............ C08F 110/06 |
| WO | WO-2017039994 A1 * | 3/2017 | .......... C08F 4/65916 |
| WO | 2017/204830 | 11/2017 | |

OTHER PUBLICATIONS

Paul, D. R. et al. (1980) "PolymerBlends," Jrnl. Macromol. Sci.-Rev. Macromol. Chem., C18, pp. 109-168.

Boyce, M. C. et al., (2001) "Micromechanisms of Deformation and Recovery in Thermoplastic Vulcanizates," J. Mech. Phys. of Solids, v.49, p. 1323 and p. 1343.

* cited by examiner

*Primary Examiner* — Vickey Nerangis

(57) ABSTRACT

Pellet-stable olefinic copolymer bimodal rubber is made using parallel reactors, with one reactor synthesizing higher molecular weight (MW) rubber with dual catalysts, with an improved molecular weight split ratio and an improved composition distribution of the moderate and ultra-high MW components, while another reactor synthesizes random isotactic polypropylene copolymer (RCP). The effluents are reactor-blended and result in pellet-stable bimodal rubber (P-SBR), which may be pelletized. When making thermoplastic vulcanizates (TPVs) with P-SBR, the need to granulate rubber bales and subsequently use talc, clay, or other anti-agglomeration agents to prevent granulated rubber crumbs from agglomerating are eliminated. TPVs made with P-SBR have vulcanized rubber particles that are smaller and more uniform in size, resulting in TPVs with higher particle counts and more thermoplastic "ligaments" between the particles, with such ligaments being made stronger by the added RCP. Such thus-produced TPVs have a lower hysteresis and flexural modulus, and better elastic properties.

30 Claims, 4 Drawing Sheets

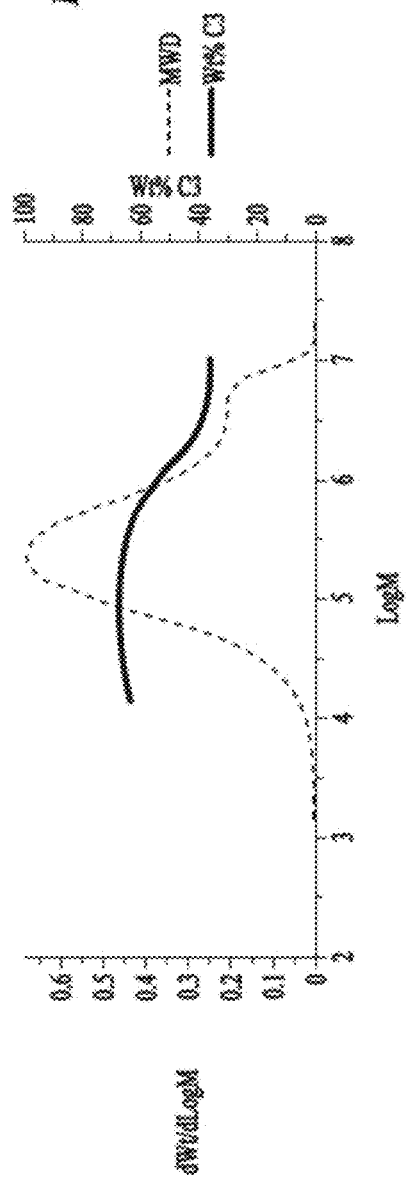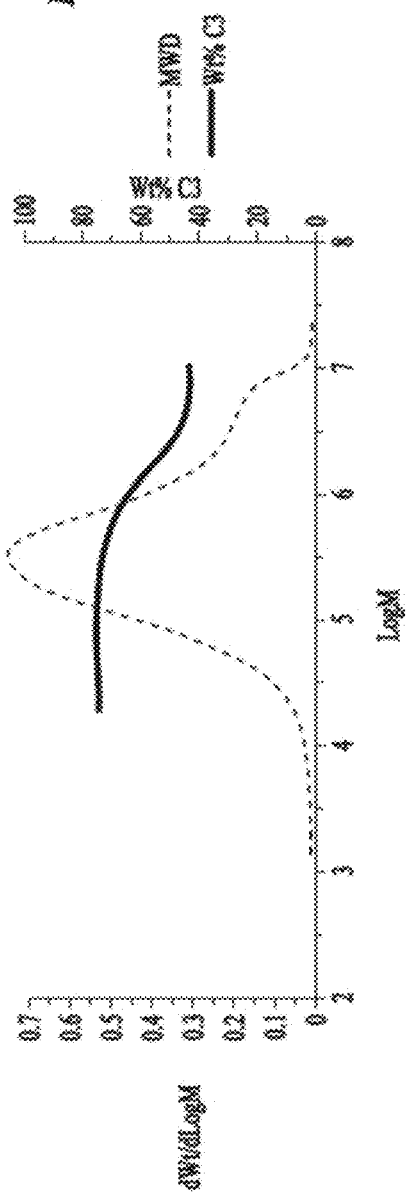

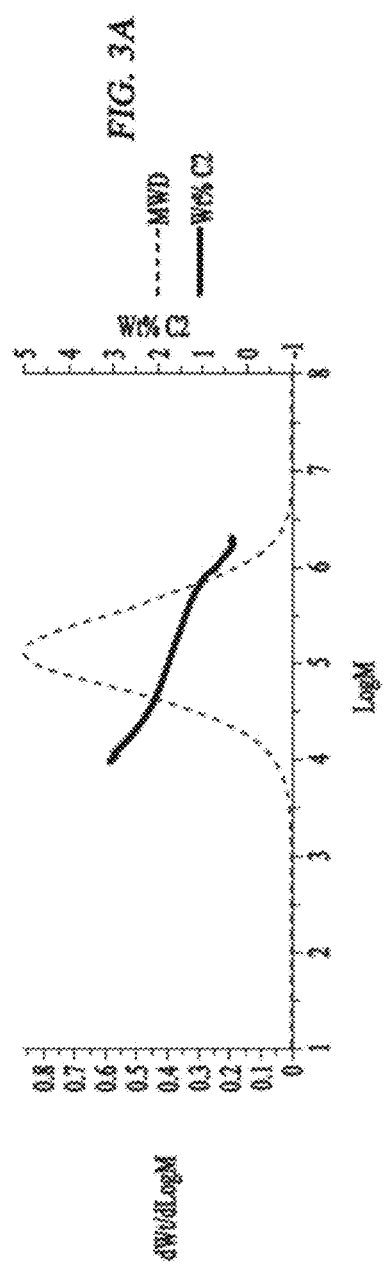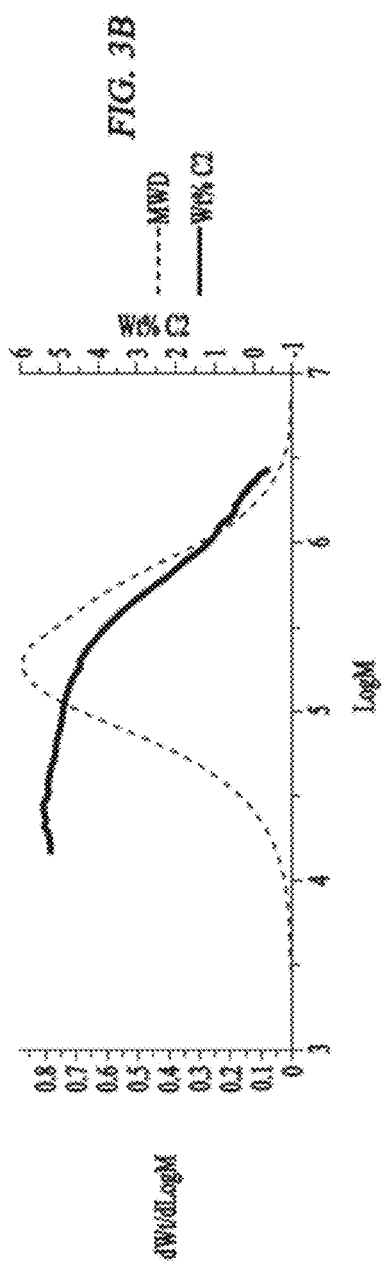

PREPARATION OF BIMODAL RUBBER, THERMOPLASTIC VULCANIZATES, AND ARTICLES MADE THEREFROM

PRIORITY CLAIM

This application claims priority to and the benefit of U.S. Ser. No. 62/701,898, filed Jul. 23, 2018 and European patent application number 18199611.7, filed Oct. 10, 2018, both of which are incorporated by reference in their entirety.

FIELD

This application relates to a high molecular weight olefinic copolymer rubber and methods of making and using the pellet-stable Bimodal Rubber, and articles made therefrom. The present disclosure also relates to thermoplastic vulcanizate (TPV) compositions, methods of making such TPVs with pellet-stable Bimodal Rubber, and articles made therefrom.

BACKGROUND

Thermoplastic vulcanizates (TPVs) have a wide-variety of uses and applications and include blends of dynamically cured rubber and thermoplastic polymers. Vulcanization, or crosslinking, of rubbers in TPVs is necessary to keep the rubber, which is the majority blend component, as the dispersed phase, instead of the continuous phase. The vulcanized rubber may be dispersed within the thermoplastic resin component as finely-divided rubber particles.

TPV compositions have advantageously demonstrated many of the properties of thermoset elastomers, yet they are processable as thermoplastics. Following the Paul-Barrow continuity criterion (Paul, D. R. et al. (1980) "Polymer Blends," Jrnl. Macromol. Sci.-Rev. Macromol. Chem., C18, pp. 109-168), where phi 1/phi 2=eta 1/eta 2, the phase with infinite viscosity, such as crosslinked rubbers, would stay dispersed. This allows for packing of a maximum amount of rubber dispersions within a plastic matrix without rubber phase inversion. The maximum packing volume percent is limited by packing physics and is typically less than 70 vol %. By squeezing in greater than 60 vol % of crosslinked rubber dispersions inside a plastic matrix, the plastic matrix becomes inter-connecting plastic "ligaments" sandwiched in between crosslinked rubber dispersions. Moreover, the elasticity of a TPV is actually derived from these thin plastic ligaments sandwiched in between rubber dispersions.

Based on experimental findings and theoretic modeling (Boyce, M. C. et al. (2001) "Micromechanisms of Deformation and Recovery in Thermoplastic Vulcanizates," J. Mech. Phys. of Solids, v. 49, pg. 1323 and pg. 1343), these thin plastic ligaments kink by plastic deformation during TPV deformation imposed upon by the incompressible and elastic deformation of sandwiching crosslinked rubber dispersions. Subsequently, these plastic ligament kinks act as spatial registrations to allow elastic recovery and to deliver elasticity. Thinner plastic ligaments are easily deformed and yielded for plastic flow/kink formation, relative to thicker or stronger plastic ligaments. If the plastic matrix has plastic patches that are relatively large in between rubber dispersions, these desired and required plastic flows and kink developments are not possible and can lead to poorer elastic properties.

For example, two TPVs may have the same, or about the same, rubber volume fraction, yet one TPV may have larger rubber dispersion sizes with only a few ligaments, in comparison to a TPV which has many more and smaller rubber dispersion sizes. The smaller rubber dispersion sizes enable the formation of more ligaments between the rubber particles.

Existing processes for producing TPVs require that the rubber component first be reduced into "free-flowing" rubber crumbs or clumps that can be conveyed and fed into an extruder before being mixed with the thermoplastic component and vulcanized. The current method for reducing the rubber into rubber crumbs/clumps requires mechanical granulation of the rubber bales. This is time-consuming and requires the uses of talc, clay, or other dusting agents to prevent the rubber clumps from agglomerating and plugging the extruder feed throat. Furthermore, these dusting "solids" are incorporated into the eventual TPV, which renders the TPV stiffer, due to solid particle reinforcement. The dusting solids also make the TPV weaker because of stress concentrations around solid particles, which could lead to premature failure of the TPV, and which consequently leads to premature failure of the article.

Therefore, there is an unmet need for better and less arduous processes for obtaining rubber particles that are suitable for TPV production, which do not require mechanical granulation of the rubber component, which are often in the form of large bales. Hence, there is an unmet need for pellet-stable rubber pellets, rather than bales, to allow for the direct feeding of rubber pellets into the extruder without bale granulation and without the usage of dusting agents.

Additionally in prior art TPVs, the various particulates used to keep the mechanically granulated rubber from agglomerating and necessary fillers added to facilitate mixing of the rubber particles with the thermoplastic resin negatively impact the physical properties and performance of the resulting TPV. Therefore, there is an unmet need for a process of producing thermoplastic vulcanizates (TPVs) without the necessity of dusting granulated rubber particles with clays, talc, or other anti-agglomeration agents, and there is an unmet need for pellet-stable bimodal rubbers that can be directly fed during TPV production without the need to granulate rubber particles. There is also an unmet need for the ability to formulate TPVs without the need to add substantial amounts of fillers in order to accomplish mixing.

Additionally rubber dispersion size and uniformity are critical to create a uniform plastic ligament network, without which the elastic properties of a TPV suffer. Therefore, there is an unmet need for thermoplastic vulcanizates (TPVs) with smaller rubber particle sizes and more numerous and more elastic particles within the TPVs, which lead to the formation of additional ligaments and kinks. There is also an unmet need for the formation of stronger ligaments.

SUMMARY

Disclosed is a method of preparing a pellet-stable olefinic copolymer bimodal rubber which comprises:

producing a high molecular weight olefinic copolymer rubber characterized by an improved bimodal molecular weight and an improved bimodal composition distribution ("bimodal rubber") within a first reactor;

concurrently producing isotactic polypropylene random copolymer (RCP) within a second reactor, wherein the first and second reactors are operated in parallel to each other;

obtaining an effluent from the first reactor;

obtaining an effluent from the second reactor;

reactor-blending the effluents in situ to thereby produce a pellet-stable RCP-containing bimodal rubber ("pellet-stable bimodal rubber"), and wherein about 80-97.5 weight % of the bimodal rubber is blended with about 2.5-20 weight % of the RCP, and optionally pelletizing the pellet-stable bimodal rubber.

In an embodiment, the bimodal rubber copolymer comprises from about 0.1 weight % to about 20 weight % of an ultra-high molecular weight component, based upon a total weight of the copolymer, and comprises from about 80 weight % to about 99.9 weight % of a moderate molecular weight component, based upon a total weight of the copolymer, and wherein the rubber has an improved molecular weight split ratio and composition distribution of the moderate and ultra-high MW components ("IR bimodal rubber"), as compared to a bimodal rubber copolymer produced within two or more reactors in series. Furthermore in an embodiment, the ultra-high molecular weight (MW) component of the copolymer has a peak molecular weight of from about 1,000,000 g/mol to about 20,000,000 g/mol, and has and one or more of:

a molecular weight (MW) spread (half-peak width) of from about 2 to about 20;

an ethylene content of from about 40 weight % to about 80 weight %;

a $C_3$ to $C_{40}$ alpha olefin content of from about 20 weight % to about 60 weight %; and a diene content of 0.1 to 12 weight %.

Furthermore in an embodiment, the moderate molecular weight (MW) component has a peak molecular weight of from about 100,000 to less than about 800,000 g/mol, and has one or more of:

a molecular weight (MW) spread (half peak width) of from about 2 to 20;

an ethylene content of from about 10 to about 50 weight %;

a $C_3$ to $C_{40}$ alpha olefin content of from about 50 weight % to about 90 weight %; and a diene content of from about 0.1 to about 12 weight %.

Furthermore in an embodiment, the RCP comprises propylene and at least one alpha-olefin comonomer, and the propylene:total comonomer molar ratio of the RCP is from about 90:10 to about 99.5:0.5. In an embodiment, the RCP has a weight average molecular weight (Mw) greater than 200,000 and a Mw/Mn from 1 to 6.

Also disclosed is a method of making a thermoplastic vulcanizate (TPV) from the pellet-stable bimodal rubber, wherein the rubber can be directly fed into the TPV extruder without granulation, and without an addition of an anti-agglomeration dusting agent.

Also disclosed is a method of preparing a thermoplastic vulcanizate (TPV), the method comprising:

obtaining pellet-stable RCP-containing bimodal rubber;

charging a reactor with the pellet-stable bimodal rubber;

adding a thermoplastic resin component (TRC);

adding a processing oil;

melt mixing the bimodal rubber, the TRC, and the oil, to thereby dynamically vulcanize the rubber and to thereby form a TPV, wherein the rubber forms dispersed particles within a continuous phase of the TRC;

wherein the rubber is produced using two catalysts in a single reactor; and wherein the RCP is produced by a novel catalyst (when a RCP is included).

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only examples of embodiments and are therefore not to be considered limiting of its scope, may admit to other equally effective embodiments.

FIG. 2A is a representative plot of dWt/d Log M versus propylene incorporation ($C_3$ weight %) for Example 1.

FIG. 2B is a representative plot of dWt/d Log M versus propylene incorporation ($C_3$ weight %) for Example 2.

FIG. 3A is a representative plot of dWt/d Log M versus ethylene incorporation ($C_2$ weight %) versus for Example 3.

FIG. 3B is a representative plot of dWt/d Log M versus ethylene incorporation ($C_2$ weight %) for Example 4.

DETAILED DESCRIPTION

Figure 1:
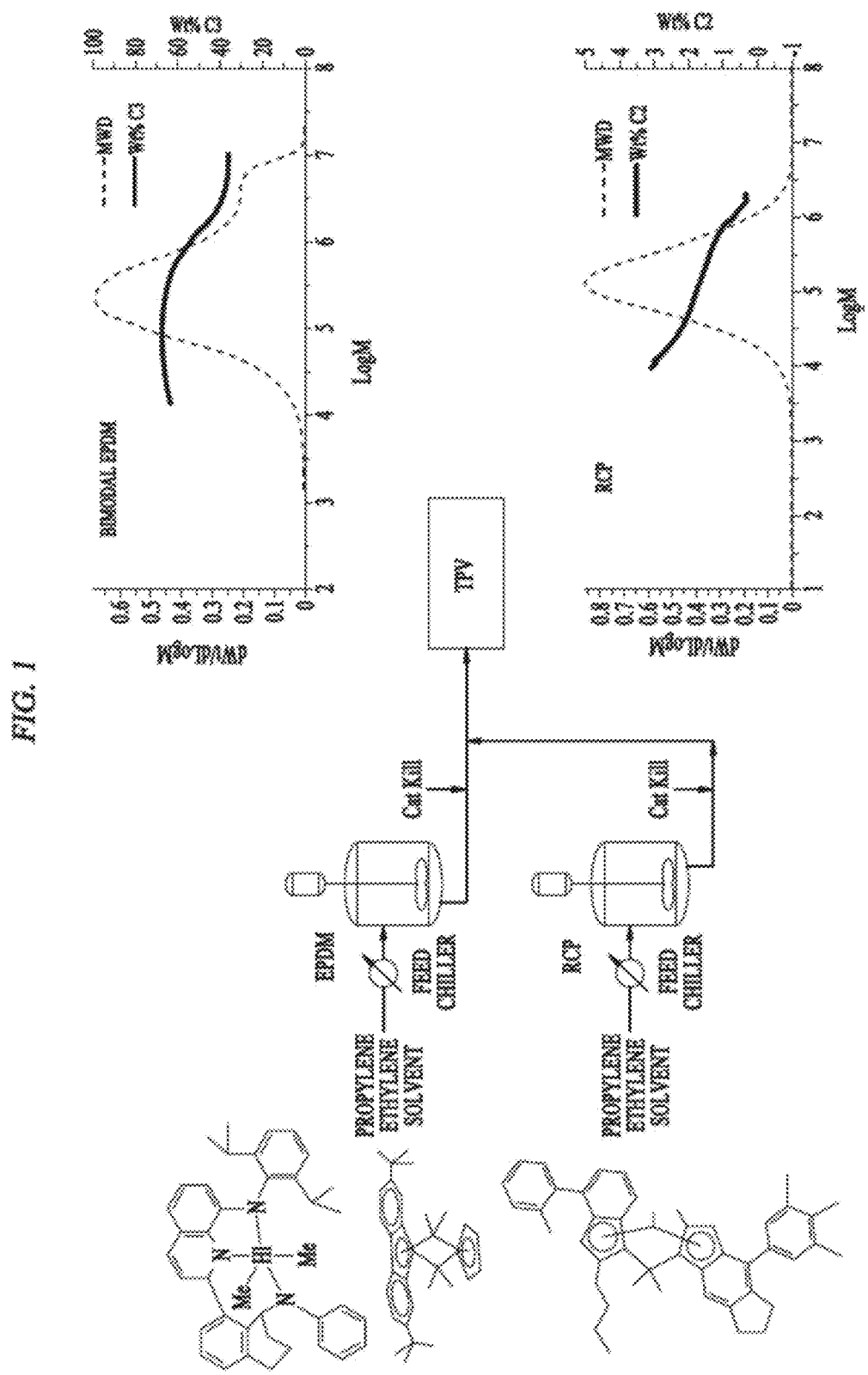
FIG. 1 is a schematic illustrating an example of how higher molecular weight olefinic copolymer bimodal rubber with an improved molecular weight split ratio of the molecular weight components ("IR Bimodal Rubber") and polypropylene random copolymer (RCP) are synthesized to thereby produce pellet-stable bimodal rubber.

This application relates to a high molecular weight olefinic copolymer rubber, which is characterized by a bimodal molecular weight, and which has an improved molecular weight split ratio of the moderate and ultra-high molecular weight components and an improved composition distribution ("Improved Ratio Bimodal Rubber"). The IR Bimodal Rubber is blended with isotactic polypropylene random copolymer (RCP), to thereby produce a pellet-stable olefinic copolymer Bimodal Rubber ("pellet-stable Bimodal Rubber"). The present disclosure also relates to methods of making and using the pellet-stable Bimodal Rubber, and articles made therefrom. The present disclosure also relates to thermoplastic vulcanizate (TPV) compositions, methods of making such TPVs with pellet-stable Bimodal Rubber, and articles made therefrom.

For purposes herein, the numbering scheme for the Periodic Table Groups is used as described in *Chemical And Engineering News*, v. 63(5), pg. 27 (1985). For example, a "group 4 metal" is an element from group 4 of the Periodic Table, e.g., Hf, Ti, or Zr.

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

Definitions

Certain abbreviations may be used for the sake of brevity and include but are not limited to those listed within the Definitions section.

The term "alkenyl" means a straight-chain, branched-chain, or cyclic hydrocarbon radical having one or more double bonds. These alkenyl radicals may be optionally substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl, and the like, including their substituted analogues.

The term "alkoxy" or "alkoxide" means an alkyl ether or aryl ether radical, wherein the term alkyl is as defined below. Examples of suitable alkyl ether radicals include, but are not limited to, methoxy, ethoxy, n-propoxy, iso-propoxy, n-butoxy, iso-butoxy, sec-butoxy, tert-butoxy, phenoxyl, and the like. "Alkoxides" include those where the alkyl group is a $C_1$ to $C_{10}$ hydrocarbyl, such as $C_1$ to $C_{10}$ alkyl or $C_5$ to $C_{20}$ aryl. The alkyl group may be straight chain, branched, or cyclic. The alkyl group may be saturated or unsaturated. In some embodiments, the alkyl group may include at least one aromatic group.

The term "alkyl" refers to a saturated hydrocarbon radical having from 1 to 12 carbon atoms (i.e., $C_1$-$C_{12}$ alkyl), particularly from 1 to 8 carbon atoms (i.e., $C_1$-$C_8$ alkyl), particularly from 1 to 6 carbon atoms (i.e., $C_1$-$C_6$ alkyl), and particularly from 1 to 4 carbon atoms (i.e., $C_1$-$C_4$ alkyl). Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth.

The term "asymmetric" as used in connection with indenyl compounds means that the substitutions at the 4-positions are different, or the substitutions at the 2-positions are different, or the substitutions at the 4-positions are different and the substitutions at the 2-positions are different.

As used herein, "$C_1$ alkyl" refers to methyl (—$CH_3$), "$C_2$ alkyl" refers to ethyl (—$CH_2CH_3$), "$C_3$ alkyl" refers to propyl (—$CH_2CH_2CH_3$) and "$C_4$ alkyl" refers to butyl (e.g., —$CH_2CH_2CH_2CH_3$, —$(CH_3)CHCH_2CH_3$, —$CH_2CH(CH_3)_2$, etc.).

Further, as used herein, Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane.

The term "aromatic" refers to unsaturated cyclic hydrocarbons having a delocalized conjugated π system and having from 5 to 20 carbon atoms (aromatic $C_5$-$C_{20}$ hydrocarbon), particularly from 5 to 12 carbon atoms (aromatic $C_5$-$C_{12}$ hydrocarbon), and particularly from 5 to 10 carbon atoms (aromatic $C_5$-$C_{12}$ hydrocarbon). In one or more embodiments, aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof. The term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

The term "aryl" or "aryl group" includes a C4-C20 aromatic ring, such as a six carbon aromatic ring, and the substituted variants thereof, including but not limited to, phenyl, 2-methyl-phenyl, xylyl, 4-bromo-xylyl. Likewise heteroaryl means an aryl group where a ring carbon atom (or two or three ring carbon atoms) has been replaced with a heteroatom, for example N, O, or S.

Unless otherwise indicated, where isomers of a named alkyl, alkenyl, alkoxy, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl). As used herein, the term "Bimodal Rubber" comprises: i) EPDMs comprising ethylene, alpha-olefin, and diene terpolymers with bimodalities in molecular weight and in composition, and ii) ethylene, propylene, and 5-ethylidene-2-norbornene terpolymers.

As used herein, a "catalyst" includes a single catalyst, or multiple catalysts with each catalyst being conformational isomers or configurational isomers. Conformational isomers include, for example, conformers and rotamers. Configurational isomers include, for example, stereoisomers.

As used herein, "catalyst productivity" is a measure of how many grams of polymer (P) are produced using a polymerization catalyst including W g of catalyst (cat), over a period of time of T hours; and may be expressed by the following formula: P/(T×W) and expressed in units of gPgcat$^{-1}$h$^{-1}$. Conversion is the amount of monomer that is converted to polymer product, and is reported as mole % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

A "homogeneous catalyst system" is a system where the transition metal catalyst compound and the activator are dissolved in the polymerization medium, typically the catalyst system is not supported on a support and is dissolved in the solvent/monomer mixture.

Unless otherwise indicated, "catalyst activity" is a measure of how active the catalyst is and, unless otherwise indicated, is reported as the mass of product polymer produced per mole of catalyst used over a period of time. This may be given in units of (kg of polymer)/(mmol of catalyst) (minute). Other units of mass, molar quantity, or time may similarly be employed. Unless otherwise indicated, "conversion" is the amount of monomer that is converted to polymer product, and is reported as mole % and is calculated based on the polymer yield and the amount of monomer fed into the reactor.

A "catalyst system" is the combination of at least one catalyst compound, a support material, an optional activator, and an optional co-activator. For the purposes of this disclosure and claims, when catalyst systems or compositions are described as comprising neutral stable forms of the components, it is well understood by one of ordinary skill in the art, that the ionic form of the component is the form that reacts with the monomers to produce polymers. When it is used to describe such after activation, it means the support, the activated complex, and the activator or other charge-balancing moiety. The transition metal compound may be neutral as in a precatalyst, or a charged species with a counter ion as in an activated catalyst system.

The terms "cocatalyst" and "activator" are used herein interchangeably and are defined to be any compound which can activate any one of the catalyst compounds herein by converting the neutral catalyst compound to a catalytically active catalyst compound cation. Non-limiting activators, for example, include ionizing activators, which may be neutral or ionic, e.g. a non-coordinating anion. Activators often include ionizing anion precursor compounds that abstract a reactive, σ-bound, metal ligand making the metal complex cationic and providing a charge-balancing noncoordinating or weakly coordinating anion.

The term "comparative sample" refers to a material made from a composition from the components described herein, but does not contain whichever component which is specifically excluded; otherwise it is the same composition of the TPV in terms of its constituents.

The term "complex," may also be referred to as catalyst precursor, precatalyst, catalyst, catalyst compound, transition metal compound, or transition metal complex; these words are used interchangeably; activator and co-catalyst are also used interchangeably.

The term "compression set" is a measure of the permanent deformation of the polymer sample, thermoplastic composition, or TPV when it is compressed.

The term "continuous" means a system that operates without interruption or cessation. For example a continuous process to produce a polymer would be one where the reactants are continually introduced into one or more reactors and polymer product is continually withdrawn.

The term "copolymer(s)" refers to polymers formed by the polymerization of at least two different monomers. A "copolymer" includes but is not limited to the copolymerization reaction product.

The term "cross-link" refers to a bond that links one polymer chain to another. As used herein, the term "cross-linking" refers to the use of cross-links to promote a difference in the polymers' physical properties.

The term "cross-linkable elastomeric polymer" refers to any elastomer having a free diene content of greater than 0.5 mole %. In an embodiment, it is measured by proton NMR to determine unsaturated olefinic group at 120° C., and using 1,1,2,2-tetrachloroethance-$d_2$ as solvent.

The term "partially cross-linked" is defined to be when less than 95 weight % (e.g. 10-95 weight %) of the rubber in the reactor is cross-linked. The term "fully cross-linked" is defined as when 95 weight % or greater of the rubber in the reactor is cross-linked.

As used herein, "crystalline" is defined as having identifiable peak melting points above about 100° C. as determined by Differential Scanning Calorimetry (DSC peak melting temperatures).

The term "cyclopentadienyl" refers to a 5-member ring having delocalized bonding within the ring and typically being bound to M through $\eta^5$-bonds, carbon typically making up the majority of the 5-member positions.

The terms "different" or "not the same" when used to refer to R groups in any formula herein (e.g., R2 and R8 or R4 and R10) or any substituent herein, indicates that the groups or substituents differ from each other by at least one atom or are different isomerically.

As used herein, the term "dynamic vulcanization" means vulcanization or curing of a curable rubber component blended with a thermoplastic resin component (TRC) under conditions of shear at temperatures above the melting point of the thermoplastic polymer, which is sufficient to plasticize the mixture. In at least one embodiment, the rubber component is simultaneously crosslinked and dispersed as micro-sized particles within the TRC. Depending on the degree of cure, the rubber component to TRC ratio, compatibility of the rubber component and TRC, the kneader type and the intensity of mixing (shear rate), other morphologies are possible, such as co-continuous rubber phases in the plastic matrix. Dynamic vulcanization may occur in the presence of a processing oil, or the oil can be added post dynamic vulcanization, or both.

For the purposes of this disclosure, ethylene shall be considered an α-olefin.

As used herein, "elastomer" or "elastomeric composition" refers to any polymer or composition of polymers (such as blends of polymers) consistent with the ASTM D1566 definition, and it is presumed that the elastomeric polymer is a cross-linkable elastomeric polymer. Elastomer includes mixed blends of polymers such as those prepared by melt mixing and/or reactor blending.

An "ethylene polymer" or "ethylene copolymer" is a polymer or copolymer comprising at least 50 mole % ethylene derived units.

A "heterocyclic ring" is a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

As used herein, "ultra-high molecular weight" or "ultra-high MW" Bimodal Rubber is defined bimodal rubber having a molecular weight (MW) value of 2,000,000 g/mol or more, as determined by Gel Permeation Chromatography (GPC). Conversely as used herein, "moderate molecular weight" or "moderate MW" is defined as molecular weight (MW), value of less than 2,000,000 g/mol as determined by GPC. There are moderate molecular weight (MW) components of the IR Bimodal Rubbers which have a peak MW of about 600,000 or less, are also propylene rich and are therefore compatible with polypropylene matrix and are the majority component of the overall composition of the IR Bimodal Rubbers. The ultra-high MW component of the Bimodal Rubbers is the minority component of the overall composition of the rubber, and is ethylene rich and therefore is very elastic, with a low glass transition temperature ($T_g$), a high MW, and with a peak MW of about 10,000,000 or less. The ultra-high MW component and moderate MW component in the polymer are determined by plotting the GPC curve (dWt versus Log M), identifying the 2,000,000 g/mol point on the abscissa (Log M), drawing a line straight up (90 degrees) from 2,000,000 g/mol point on the abscissa, and using that line to divide the GPC curve into the high MW component and the moderate MW component. The weight percent of the ultra-high and moderate MW components are then calculated by integrating the areas under the GPC curve separately. In one or more embodiments, the term ultra-high MW polymers or rubbers apply to those rubbers produced by dual catalysts, which in embodiments occur within a single reactor.

As used herein "homopolymer" means polymers resulting from the polymerization of a single monomer, i.e., a polymer consisting essentially of a single type of repeating unit.

The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and unsaturated), including mixtures of hydrocarbon compounds.

The terms "hydrocarbyl radical," "hydrocarbyl," "hydrocarbyl group," "alkyl radical," and "alkyl" are used interchangeably throughout this document. For purposes of this disclosure, "hydrocarbyl" or "unsubstituted hydrocarbyl" refers to $C_1$-$C_{100}$ radicals, that may be linear, branched, or cyclic, and when cyclic, aromatic or non-aromatic.

Examples of such radicals include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like.

As used herein, the term "hydroxyl" refers to an —OH group.

The term "IR Bimodal Rubber," relates to a higher molecular weight olefinic copolymer rubber, which is characterized by a bimodal molecular weight, an improved molecular weight split ratio of the moderate and ultra-high molecular weight components, and an improved bimodal composition distribution.

As used herein, the term "linear" means that the polymer has few, if any, long chain branches and typically has a $g'_{vis}$ value of 0.97 or above, such as 0.98 or above.

As used herein, the term "melting point" means average melting point when referring to a polymer blend. It is calculated by averaging the melting points of the thermoplastic polymers in the blend taking into account the proportion of each polymer in the blend.

In the description herein, a "metallocene catalyst" may be described as a catalyst precursor, a pre-catalyst compound, metallocene catalyst compound or a transition metal compound, and these terms are used interchangeably. An "anionic ligand" is a negatively charged ligand which donates one or more pairs of electrons to a metal ion.

A metallocene catalyst is defined as an organometallic compound with at least one t-bound cyclopentadienyl moiety (or substituted cyclopentadienyl moiety) and more frequently two t-bound cyclopentadienyl moieties or substituted cyclopentadienyl moieties bonded to a transition metal.

As used herein, Mn is number average molecular weight, Mw is weight average molecular weight, Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weights (e.g., Mw, Mn, and Mz) are g/mol and are determined by GPC-IR.

An "olefin," alternatively referred to as "alkene," is a linear, branched, or cyclic compound of carbon and hydrogen having at least one double bond. For purposes herein, when a polymer or copolymer is referred to as "comprising an olefin," the olefin present in such polymer or copolymer is the polymerized form of the olefin. For example, when a copolymer is said to have an "ethylene" content of 35 wt % to 55 wt %, it is understood that the "mer" unit in the copolymer is derived from ethylene in the polymerization reaction and said derived units are present at 35 wt % to 55 wt %, based upon the weight of the copolymer.

As used herein, "organometallic olefin polymerization catalyst(s)" refers to any catalyst that is capable of coordination polymerization addition where successive monomers are added in a monomer chain at the organometallic active center.

The abbreviation of "phr"=parts per 100 parts (by weight) rubber.

The term "polyethylene" means a polymer made of at least 50 mol %, ethylene units and having less than 20 wt % propylene units.

A "polymer" has two or more of the same or different mer units, a "homopolymer" is a polymer having mer units that are the same, a "copolymer" is a polymer derived from two or more different monomers (including terpolymers, tetrapolymers, etc.), and a "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. As used herein, when a polymer is referred to as comprising a monomer, the monomer is present in the polymer in the polymerized form of the monomer or in the derivative form of the monomer. As used herein, when a polymer composition or blend is said to comprise a certain weight percentage, wt %, of a monomer, that percentage of monomer is based on the total amount of monomer units in all the polymer components of the composition or blend, unless otherwise stated.

"Polymerizable conditions" or "conditions" refer to those conditions including a skilled artisan's selection of temperature, pressure, reactant concentrations, optional solvent/diluents, reactant mixing/addition parameters, and other conditions within at least one polymerization reactor that are conducive to the reaction of one or more olefin monomers when contacted with an activated olefin polymerization catalyst to produce the desired polyolefin polymer through typically coordination polymerization.

Polymerization:

A "bulk polymerization" means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

A "homogeneous polymerization" is one where the polymer product is dissolved in the polymerization medium. In one or more embodiments, such systems are not turbid as described in Oliveira, J. V. et al. (2000) "High-Pressure Phase Equilibria for Polypropylene-Hydrocarbon Systems," *Ind. Eng. Chem. Res., v.* 39, pp. 4627-4633.

As used herein the term "slurry polymerization process" means a polymerization process where a supported catalyst is employed and monomers are polymerized on the supported catalyst particles. At least 95 wt % of polymer products derived from the supported catalyst(s) are in granular form as solid particles (not dissolved in the diluent).

As used herein the term "solution polymerization" means a polymerization process in which the polymer is dissolved in a liquid polymerization medium, such as an inert solvent or monomer(s) or their blends. A solution polymerization is typically homogeneous.

The terms "polypropylene" or "propylene polymer" as used herein broadly means any homo, impact, or random polymer or copolymer of propylene, terpolymers, higher order polymers, impact copolymers, or interpolymers made from propylene derived units, or combinations thereof, which contain at least 50 percent by weight (or at least 50 mol %) of propylene derived units. Propylene polymers can vary widely in composition; examples include stereoregular polypropylene, stereoregular polypropylene segments separated by amorphous polypropylene, amorphous polypropylene, polypropylene copolymers, propylene terpolyomers, and higher order propylene copolymers.

The terms "random copolymer" or "RCP" herein refer to copolymer comprising propylene and at least one alpha-olefin comonomer having 2 or 4 to 12 carbon atoms, or a combination thereof, to thereby form isotactic polypropylene random copolymer (RCP), wherein the propylene:total comonomer molar ratio of the RCP is from 90:10 to 99.5:0.5.1.

The term "ring atom" means an atom that is part of a cyclic ring structure. By this definition, a benzyl group has six ring atoms and tetrahydrofuran has 5 ring atoms.

Unless otherwise indicated, "room temperature" is 23° C.

A "scavenger" is a compound that can be added to a reactor to facilitate polymerization by scavenging impurities. Some scavengers may also act as chain transfer agents. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound. Examples of scavengers include, but are not limited to, trialkylaluminums, methylalumoxanes, modified methylalumoxanes, MMAO-3A (Akzo Nobel), bis(diisobutylaluminum)oxide (Akzo Nobel), tri(n-octyl)aluminum, triisobutylaluminum, and diisobutylaluminum hydride.

Unless otherwise indicated, the term "substituted" means that a hydrogen group has been replaced with a hydrocarbyl, a heteroatom, or a heteroatom-containing group. For example, a "substituted hydrocarbyl" is a radical made of carbon and hydrogen where at least one hydrogen is replaced by a heteroatom or heteroatom containing group. Substituted radicals are radicals in which at least one hydrogen atom of the radical has been substituted with at least one halogen (such as Br, Cl, F or I) or at least one functional group such as $C(O)R^*$, $C(O)NR^*_2$, $C(O)OR^*$, $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like (where $R^*$ is independently a hydrogen or hydrocarbyl radical, and two or more $R^*$ may join together to form a substituted or unsubstituted saturated, partially unsaturated or aromatic cyclic or polycyclic ring structure), or where at least one heteroatom has been inserted within a ring.

The term "solvent" is defined to mean any hydrocarbon or mixture of hydrocarbons in which the polymers dissolve to form a homogenous solution.

The terms "substituent," "radical," "group," and "moiety" may be used interchangeably.

As used herein, a "thermoplastic polymer" is defined to be any polymer having a melting point of at least 70° C. as measured by DSC.

As used herein "stereoregular polypropylene" means polypropylene having stereoregular propylene sequences long enough to crystallize under conditions known to those skilled in the art.

The term "vulcanized" is defined herein in its broadest sense, as reflected in any issued patent, printed publication, or dictionary, and refers in general to the state of a composition after all or a portion of the composition (e.g., crosslinkable rubber) has been subjected to some degree or amount of vulcanization. Accordingly, the term encompasses both partial and total vulcanization. One type of vulcanization is "dynamic vulcanization," which also produces a "vulcanizate." In at least that context, the term vulcanization encompasses any form of curing (crosslinking), both thermal and chemical, which can be utilized in dynamic vulcanization. Also, in at least one embodiment, the term vulcanized refers to more than insubstantial vulcanization, such as curing (crosslinking) that results in a measurable change in pertinent properties, e.g., a change in the melt flow index (MFI) of the composition by 10% or more (according to any ASTM-1238 procedure).

As used herein, a "partially vulcanized" rubber component is one wherein more than 5 wt % of the crosslinkable rubber component is extractable in boiling xylene, subsequent to vulcanization (such as dynamic vulcanization), e.g., crosslinking of the rubber phase of the (TPV).

The term "vulcanizate" means a composition that includes some component (e.g., rubber) that has been vulcanized.

The term "thermoplastic vulcanizate" (TPV), is broadly defined as any material that includes a blend of a thermoplastic polymer or thermoplastic resin component and a dispersed, at least partially vulcanized/cross-linked, rubber component where there is a continuous and non-continuous phase within the thermoplastic resin component (TRC). In other embodiments, there is a co-continuous morphology or a phase inversion is achieved. A TPV material may further include additives, constituents, curatives, processing oils, other ingredients, and combinations thereof.

As used herein, the abbreviation "TPV" and "TPVs" may be used to refer to thermoplastic vulcanizate(s).

The term "resulting TPV" is used herein to describe compositions wherein the components are blended or mixed together in any order, in any manner, and for any length of time, and includes reaction products, solutions, slurries, mixtures, blends, and the like, or combinations thereof. Further, contacting of any component can occur in the presence or absence of any other component of the compositions described herein. Combining additional materials or components can be done by any suitable method.

Various specific embodiments, versions, and examples of the present disclosure will now be described, including various embodiments and definitions that are adopted herein. While the following detailed description gives specific embodiments, those skilled in the art will appreciate that these embodiments are examples only, and that the present disclosure can be practiced in other ways. Any reference to the "disclosure" may refer to one or more, but not necessarily all, of the embodiments defined by the claims. The use of headings is for purposes of convenience only and does not limit the scope of the present disclosure.

Improved Thermoplastic Vulcanizates (TPVs)

One or more embodiments of the present disclosure relate to the production of higher molecular weight olefinic copolymer bimodal rubber with an improved molecular weight split ratio of the moderate and ultra-high molecular weight components and with favorable composition distribution ("IR Bimodal Rubber"). In one or more embodiments, the IR Bimodal Rubber has a higher ethylene content in ultra-high MW components, and a higher propylene content in moderate MW components. The IR Bimodal Rubber is blended with isotactic polypropylene random copolymer (RCP), to thereby produce a pellet-stable RCP-containing olefinic copolymer Bimodal Rubber ("pellet-stable Bimodal Rubber").

In one or more embodiments of the present disclosure, the aforementioned Bimodal Rubbers are synthesized using at least two different catalysts in a single, first reactor, as shown generally in FIG. 1, rather than using one or more different catalysts in the usual multiple reactors in series. In one or more embodiments a second, single reactor, which is producing isotactic polypropylene random copolymer ("RCP"), operates in parallel with the first Bimodal Rubber producing reactor. Next in one or more embodiments, the separate reactor effluents of the Bimodal Rubber and the RCP are then reactor-blended in situ to thereby make the pellet-stable Bimodal Rubber, which may optionally be pelletized. Furthermore in one or more embodiments, pellets can be produced with the pellet-stable Bimodal Rubber without the necessity of fillers and/or particulate pellet coatings to prevent the agglomeration of the thus-produced pellets.

Also in one or more embodiments the pellet-stable Bimodal Rubber is used to make thermoplastic vulcanizates ("TPVs"). The use of such pellet-stable Bimodal Rubber eliminates the need to first granulate rubber bales, and eliminates the need to use talc, clay, or other anti-agglomeration agents which are otherwise necessary to prevent granulated rubber crumbs from agglomerating. Also in some embodiments, the amount of filler needed or used is decreased, or even in some cases, entirely unnecessary. In one or more embodiments, the improved TPVs are prepared by melt-mixing the pellet-stable RCP-containing bimodal elastomeric copolymers with an additional thermoplastic resin component (TRC), which in one or more embodiments comprises polypropylene. Also a curative is added. The aforementioned improved molecular weight split ratio of the Bimodal Rubber with favorable composition distribution provides excellent processability, elasticity, and compatibility with polypropylene (PP), thus allowing production of softer and more elastic TPVs, as further discussed below. The pellet-stable Bimodal Rubber also leads to improvements in the size and uniformity of rubber dispersions inside a TPV, which are also elastic. Furthermore, the RCP within the pellet-stable rubber leads to the formation of stronger, better thermoplastic ligaments.

Using pellet-stable bimodal EPDMs comprising ethylene, alpha-olefin, and diene terpolymers removes the prior-art dusting agents and provides finer and more elastic vulcanized rubber dispersions all of which improves TPV softness and toughness, which both enhance TPV elasticity.

Olefinic Elastomeric Copolymers

In one or more embodiments, the rubber component of the thermoplastic vulcanizate (TPV) is a crosslinkable rubber component (e.g., prior to vulcanization) or crosslinked rubber component (e.g., after vulcanization). Natural rubbers generally lack several properties essential to the elastomeric component in TPVs. In an aspect, the rubber component can be any olefin-containing rubber that can be vulcanized using free radical generators such as organic peroxides. In one or more embodiments, the multimodal olefinic elastomeric copolymer includes ethylene-alpha-olefin-non-conjugated diene rubbers. In one or more embodiments, ethylene-propylene rubber is used and may be manufactured or synthesized by using a variety of techniques. For example, these copolymers can be synthesized by employing solution, slurry, or gas phase polymerization techniques that employ numerous catalyst systems including Ziegler-Natta systems, single-site catalysts including vanadium catalysts and Group IV-VI metallocenes. The dispersions of vulcanized EPDM rubber can be further improved by using EPDMs with high propylene (propylene content of greater than 60%) which, in turn, would improve compatibility (by lowering interfacial tension) between EPDM rubber and the PP continuous matrix in TPV. However, raising the propylene content in an EPDM would raise its glass transition temperature and degrade its elastic properties. A bimodal EPDM bimodal EPDMs comprising ethylene, alpha-olefin, and diene terpolymers whereas the "minor" high molecular weight components are ethylene rich (of greater than 40%) and ultra high molecular weight (of greater than 1 million) both of which would significantly enhance elasticity of bimodal EPDMs comprising ethylene, alpha-olefin, and diene terpolymers balanced by majority moderate molecular weight propylene rich EPDM could deliver both fine (from propylene-rich moderate MW components) and elastic (from ethylene rich ultra-high MW components) vulcanized rubber dispersions in TPVs.

In one or more embodiments, ethylene-propylene rubbers include copolymers polymerized from ethylene, at least one α-olefin monomer, and optionally at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene (ENB); 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, one or more other α-olefins, and one or more diene monomers, the copolymer may be referred to as a terpolymer or even a tetrapolymer in the event that multiple α-olefins or dienes are used.

In one or more embodiments, the rubber is multimodal and may be produced by reactors in series, parallel, or combinations thereof. Commercially, bimodal rubbers are typically produced by serial reactors using a single catalyst where the molecular weight of each component is controlled by the two reactor temperatures.

Instead in one or more embodiments, the rubber is made by using series reactors as described herein, or by using parallel reactors, as generally shown in FIG. 1. In one or more embodiments, the peak molecular weight of the ultra-high molecular weight (MW) fraction is from 1,000,000 to 20,000,000, in other embodiments from 1,500,000 to 15,000,000, and in other embodiments from 2,000,000 to 10,000,000. In one or more embodiments, the moderate molecular weight (MW) components of the Bimodal Rubbers have a peak MW from 100,000 to 800,000, in other embodiments from 150,000 to 600,000, and in other embodiments from 200,000 to 500,000. The moderate MW components are also propylene rich and are therefore compatible with polypropylene matrix. The moderate MW components are the majority component of the overall composition of the EPDM rubbers comprising ethylene, alpha-olefin, and diene terpolymers.

The ultra-high MW components of the Bimodal Rubbers are the minority component of the overall composition of the EPDM rubbers comprising ethylene, alpha-olefin, and diene terpolymers, and are ethylene rich and therefore are very elastic, with a low glass transition temperature ($T_g$), and a high MW. These newly disclosed rubbers are processable, compatible, and elastic for a multitude of uses. In one or more embodiments, the selected rubber is a bimodal ethylene, alpha-olefin, diene copolymer.

Alternatively such rubber can be made by physically blending of a lower molecular weight component with a higher molecular weight component produced within the series and/or parallel reactors. In either case, the multimodality may manifest itself as two distinct peaks or a main peak and a shoulder peak in the $M_w$ GPC LALLS signal.

Catalysts for Producing Olefinic Elastomeric Copolymers

When the elastomeric polymer portion of the TPV is produced by direct polymerization, in one or more embodiments, the catalyst is a single-site catalyst. However, implementation of this disclosure is not limited to single-site catalysts. For example, olefinic copolymer bimodal rubbers may be prepared with: i) a bridged biscyclopentadienyl transition metal compound, ii) a transition metal pyridyldiamide, further described below, iii) a bridged or unbridged metallocene catalyst compound other than i) or ii), or the catalyst system described herein, or combinations thereof.

In an implementation when a single-site catalyst is utilized, it generally has an activity and longevity sufficient to polymerize in a homogeneous environment at temperatures of at least 100° C. In one or more embodiments, the different molecular weight fractions can be produced in successive reactors arranged in series by controlling temperature and/or by controlling hydrogen content. In one or more embodiments, the single site catalyst is a bulky ligand transition metal catalyst. The bulky ligand may contain a multiplicity of bonded atoms, for example carbon atoms, forming a group, which may be cyclic with one or more optional hetero-atoms. The bulky ligand may be a cyclopentadienyl derivative, which can be mono- or poly-nuclear. One or more bulky ligands may be bonded to the transition metal atom. The bulky ligand is assumed, according to prevailing scientific theory, to remain in position in the course of polymerization to provide a homogenous polymerization effect. Other ligands may be bonded or coordinated to the transition metal, for example detachable by a cocatalyst or activator, such as a hydrocarbyl or halogen-leaving group. It is assumed that detachment of any such ligand leads to the creation of a coordination site at which the olefin monomer can be inserted into the polymer chain. The transition metal atom is a Group IV, V or VI transition metal of the Periodic Table of Elements. The transition metal atom is for example a Group IVB atom. While it is assumed that the transition metal in the active catalyst state is in the 4+ oxidation state and a positively charged cation, precursor transition metal complexes that are generally neutral may be in a lower oxidation state. Reference is made to, for example, U.S. Pat. No. 6,211,312 for a more detailed description of suitable metallocene complexes.

The catalyst is derivable from a compound represented by the formula: $[L]_m M[X]_n$ wherein L is the bulky ligand; X is the leaving group, M is the transition metal and m and n are such that the total ligand valency corresponds to the transition metal valency. For example in embodiments, the catalyst is four-coordinate such that the compound is ionizable to a 1+ valency state. The ligands L and X may be bridged to each other, and if two ligands L and/or X are present, they may be bridged. The metallocenes may be full sandwich compounds having two ligands L which are cyclopentadienyl groups or half-sandwich compounds having one ligand L only which is a cyclopentadienyl group. Metallocenes include those compounds that contain one or more cyclopentadienyl moieties in combination with a transition metal of the Periodic Table of Elements. The metallocene catalyst component is represented by the general formula (Cp) mMRnR'p wherein Cp is a substituted or unsubstituted cyclopentadienyl ring; M is a Group IV, V or VI transition metal; R and R' are independently selected halogen, hydrocarbyl group, or hydrocarboxyl groups having 1-20 carbon atoms; m=I-3, n=0-3, p=0-3, and the sum of m+n+p equals the oxidation state of M.

In one or more embodiments, useful metallocenes include biscyclopentadienyl derivatives of a Group IV transition metal, for example zirconium or hafnium. See WO 1999/41294. These may be derivatives containing a fluorenyl ligand and a cyclopentadienyl ligand connected by a single carbon and silicon atom. (See WO 1999/45040; and WO 1999/45041). In certain embodiments, the Cp ring is unsubstituted and/or the bridge contains alkyl substituents such as alkylsilyl substituents to assist in the alkane solubility of the metallocene. See WO 2000/24792 and WO 2000/24793 (fully incorporated herein by reference, for purposes of U.S. patent practice). Other metallocene catalyst systems may show a polymerization capability suitable for making the composition according to the disclosure herein. For example, EP 418044 uses a monocyclopentadienyl compound similar to that of EP 416815. Similar compounds are described in EP 420436. Also, WO 1997/03992 shows a catalyst in which a single Cp species and a phenol are linked by a C or Si linkage, such as Me2C(Cp)(3-tBu-5-Me-2-phenoxy)TiCl$_2$. Further, WO 2001/05849 discloses Cp-phosphinimine catalysts, such as (Cp)((tBu)3P=N) TiCl$_2$.

In one or more implementations, metallocene catalysts are used in both reactors to thereby produce bimodal rubber.

The catalyst may be used with a cocatalyst or activator which, it is assumed according to prevailing theory, helps form the metallocene cation. Aluminum alkyl derived activators may be used of which methyl alumoxane is the prime and well know example. This material may also function as a scavenger and is commercially obtainable from Albemarle or Schering.

In embodiments, non or weakly coordinating anion (NCA) generating activators of the type described in EP 277004. These activators are often used and described in conjunction with the metallocene in the above metallocene patent references. NCA's may be generated from precursors which may be a neutral salt containing the stabilizing anion or a nonionic Lewis Base capable of abstracting a group from the transition metal complex to form a stabilizing anion. The NCA may, depending on mode of generation, have three or four ligands substituted on a metal atom such as boron or aluminum. The ligands are for example fluorinated, for example perfluorinated, and aromatic moieties such as phenyl bisphenyl or naphthyl. Reference is also made to WO 2001/42249 which describes another suitable NCA structure (fully incorporated herein by reference, for purposes of U.S. patent practice).

In operation on a commercial scale, the high catalyst activity and low catalyst concentration lead to increased sensitivity to poisons. Poisons may enter into the polymerization reactor as impurities in the solvent or monomer feed or be generated by secondary processes such as the catalyst killing operation, generally performed with water after polymerization proper is completed.

These poisons may be deactivated by using an alkyl aluminum scavenger such as triethylaluminum, (TEAL), titanium boron aluminum (TIBAL), bis(diisobutylaluminum) oxide (DIBALO), or n-octyl aluminum. The presence of poison can also be countered by providing a molecular sieve or other purifying installation as part of the recycle in the continuous reactor lay out.

Polymerization Processes

Any known polymerization process, including solution, suspension, slurry, supercritical and gas phase polymerization processes, and any known polymerization catalyst can be used to produce the elastomeric copolymer component. Generally, the catalyst used to produce the elastomeric copolymer component should be capable of polymerizing bulky monomers and also be capable of producing a polymer having an Mw of 20,000 or more and a crystallinity of less than 20%.

When multiple reactors are used in series, conditions as between the first and the second reactor may be differentiated as described in WO 1999/45047. Generally a terpolymer (containing a suitable diene) is made using ethylene, a higher alpha-olefin (e.g. propylene, butylene, hexene, and octene) and a non-conjugated diene in a process which comprises: a) feeding a first set of monomers containing a diene to a first reactor, b) adding a single site catalyst to the first reactor, c) operating the first reactor to polymerize the first set of monomers to produce an effluent containing a first polymer component and optionally unreacted monomers, d) feeding the effluent of c) to a second reactor, e) feeding a second set of monomers to the second reactor, f) operating the second reactor to polymerize the second set of monomers and any unreacted monomers to produce a second polymer component. Optionally, additional catalyst may also be fed to the second reactor. The final polymer product comprises the mixture of said first and second polymer components.

After polymerization and any catalyst deactivation or killing, the solvent can be removed by one or more flashing steps or a liquid phase separation as described in EP 552945 so that the solvent content is lowered to 0.1 wt % or less. The solvent can be recycled and the polymer baled or pelletized.

Transition Metal Pyridyldiamide Catalyst

The improved pellet-stable Bimodal Rubber described herein may also be prepared with Bimodal Rubbers synthesized by the transition metal pyridyldiamide catalyst disclosed in U.S. Application No. 62/585,634, filed Nov. 27, 2017, and entitled Bimodal Ethylene, Alpha-Olefin, And Diene Polymers Using Dual Organometallic Catalysts, which is hereby incorporated by reference for purposes of U.S. patent practice. Embodiments of the present disclosure also relate to improvements in the molecular weight split ratio and composition distribution of the bimodal EPDM rubbers comprising ethylene, alpha-olefin, and diene terpolymers. In one or more embodiments, a multiple (typically dual) catalyst system is used to produce an olefin-containing rubber, in a single reactor, rather than multiple reactors in series. In embodiments, the multiple catalyst system comprises at least one transition metal pyridyldiamide compound and at least one bridged metallocene compound. The thus-produced bimodal EPDM rubbers comprising ethylene, alpha-olefin, and diene terpolymers have an improved molecular weight split ratio and composition distribution. This is significant because even though bimodal rubbers comprising bimodal ethylene, alpha-olefin, and diene terpolymers are commercially available and easier to process than unimodal rubbers, many commercial bimodal EPDM-type rubbers do not have the preferred composition distribution for TPV applications. Namely such commercial EPDM-type rubbers lack high propylene components for dispersion, high ethylene components for elasticity, and ultra-high molecular weight components (necessary for high elasticity).

In at least one embodiment, the present disclosure relates to a multiple (typically dual) catalyst system which includes a transition metal pyridyldiamide compound and a bridged metallocene compound.

Typically, transition metal pyridyldiamide catalysts are useful for ultra-high Mw copolymers, such as high Mw EPDM rubbers comprising ethylene, alpha-olefin, and diene terpolymers. Particularly useful transition metal pyridyldiamide catalysts herein are described in U.S. Publication No. 2014/0256893 and are incorporated herein by reference. Typically, bridged metallocenes provide moderate (e.g., 75,000 g/mol Mw or more) Mw polymer, such as moderate Mw EPDM rubbers comprising ethylene, alpha-olefin, and diene terpolymers which are comprised of a majority of propylene. The bridged metallocenes typically contain a Group 4 transition metal, such as hafnium or zirconium. Particularly useful bridged biscyclopentadienyl hafnium complexes are those described in U.S. Pat. Nos. 6,559,253 and 6,528,670, the disclosures of which are incorporated herein by reference. The bridged hafnocenes described in WO 96/33227, WO 97/22635, and EP 0 612 768 are additionally suitable, the description and examples of these documents are incorporated by reference herein.

In an embodiment, a multimodal olefinic elastomeric copolymer is prepared using at least one metallocene catalyst in at least one reactor in series, wherein a higher molecular weight, higher viscosity component, is produced in the first reactor, and wherein a lower molecular weight, lower viscosity component is produced in the second reactor, and the combination of thereof results in a final multimodal copolymer.

In one or more embodiments, the higher molecular weight Bimodal Rubbers with the improved molecular weight split ratio and composition distribution ("IR Bimodal Rubbers"), may be produced by contacting olefins with a transition metal pyridyldiamide catalyst component, represented by formulas (I) or (II):

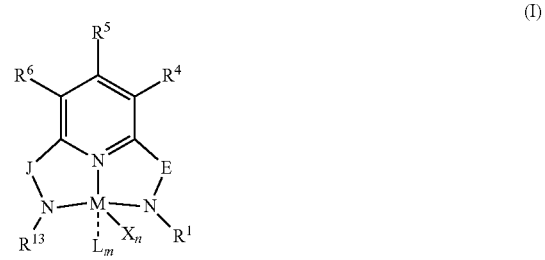

(I)

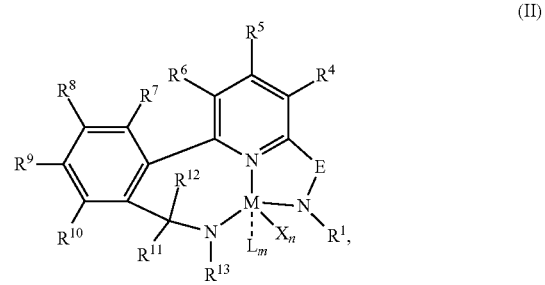

(II)

wherein:

M is a Group 3, 4, 5, 6, 7, 8, 9, or 10 metal (for example M is Zr or Hf);

E is $C(R^2)$ or $C(R^3)(R^{3'})$;

X is an anionic leaving group (for example X is $C_1$ to $C_{12}$ alkyl (such as methyl, ethyl, propyl, butyl, pentyl, hexyl, octyl, nonyl, decyl, undecyl, dodecyl, or isomers thereof, such as iso-, tert-, n-, sec-), hydrido, benzyl, neopentyl, trimethylsilylmethyl, halogen (such as chloride, bromide, fluoride, iodide), triflate, for example methyl, chloride, or dialkylamido);

L is a neutral Lewis base (for example L is ether, amine, phosphine, or thioether);

$R^1$ and $R^{13}$ are independently selected from substituted or unsubstituted hydrocarbyl or silyl groups (for example $R^1$ & $R^{13}$ are aryl groups, for example $R^1$ is 2,6-disubstituted aryl, for example $R^1$ is 2,6-diisopropylphenyl, for example $R^{13}$ is 2-substituted aryl, for example $R^{13}$ is phenyl, for example $R^1$ is 2,6-disubstituted aryl group and $R^{13}$ is an aryl group that is unsubstituted in the 2 and 6 positions);

$R^2$ is a group containing 1-10 carbon atoms that is optionally joined with $R^4$ to form an aromatic ring (for example $R^2$ & $R^4$ are joined to form a six membered aromatic ring);

$R^3$, $R^{3'}$, $R^4$, $R^5$, $R^6$, $R^7$, $R^8$, $R^9$, $R^{10}$, $R^{11}$, and $R^{12}$ are each independently selected from hydrogen, substituted or unsubstituted hydrocarbyl, alkoxy, silyl, amino, aryloxy, halogen, and phosphino (for example $R^3$ & $R^{3'}$ are hydrogen);
J is a divalent group that forms a three-atom-length bridge between the pyridine ring and the amido nitrogen (for example J is selected from:

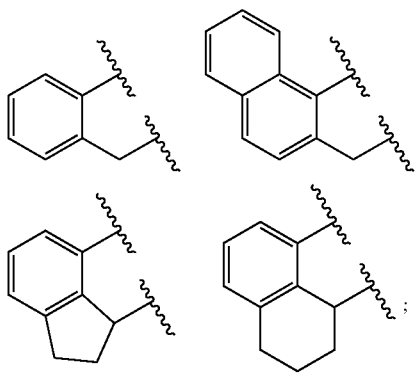

n is 1 or 2;
m is 0, 1, or 2; and
two X groups may be joined to form a dianionic group;
two L groups may be joined to form a bidentate Lewis base;
an X group may be joined to an L group to form a monoanionic bidentate group;
adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring (R7 & $R^8$ may be joined to form an aromatic ring, for example, $R^7$ & $R^8$ are joined to form cyclopentyl or cyclohexyl, R10 & $R^1$ may be joined to form a five- or six-membered ring, for example, $R^{10}$ & $R^{11}$ are joined to form cyclopentyl or cyclohexyl).

Additionally in one or more embodiments, the transition metal pyridyldiamide catalyst component used to synthesize Bimodal Rubber, which is used to make pellet-stable Bimodal Rubber, is represented by formula (III):

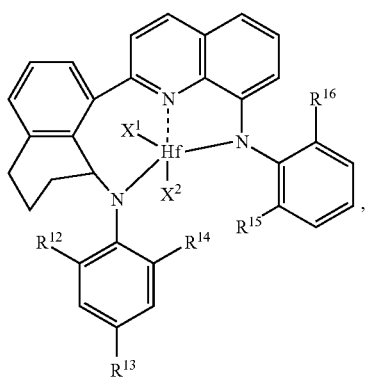

(III)

wherein:
each of $R^{12}$, $R^{13}$, $R^{14}$, $R^{15}$, and $R^{16}$ is independently hydrogen, methyl, ethyl, propyl, isopropyl, isobutyl, or tertbutyl, and
each of $X^1$ and $X^2$ is independently halogen or alkyl (for example F, Cl, Br, I, methyl, ethyl, propyl, butyl, pentyl, hexyl, octyl, nonyl, decyl, undecyl, dodecyl, or isomers thereof, such as iso-, tert-, n-, sec-).

Non-limiting embodiments of transition metal pyridyldiamides useful for the catalyst systems used to produce Bimodal Rubber that can be used to produce pellet-stable Bimodal Rubber are described herein, and include one or more of (1) to (8) below:

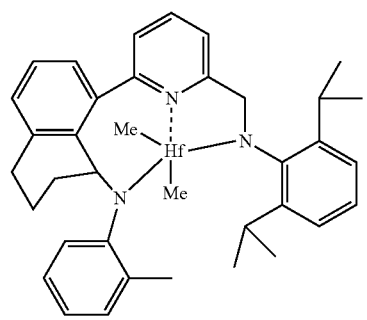
(1)

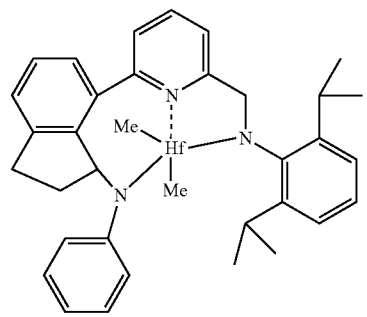
(2)

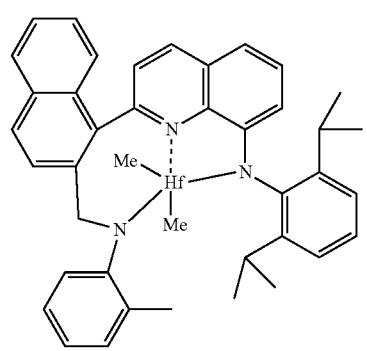
(3)

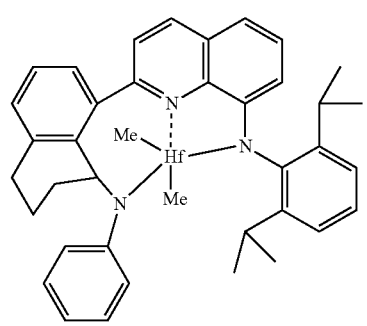
(4)

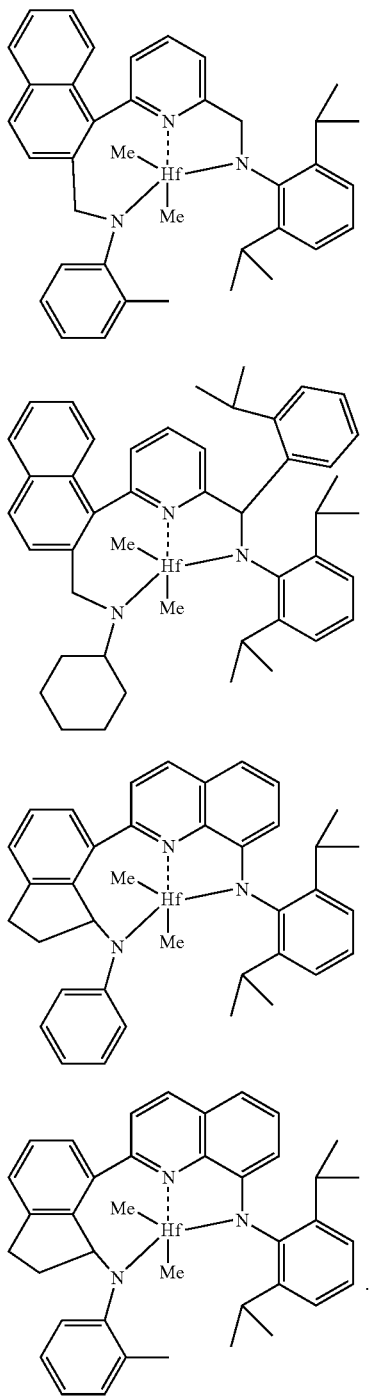

Bridged Metallocene Compounds

The bridged metallocene compounds which may be used to prepare the aforementioned IR Bimodal Rubber with the improved molecular weight split ratio and composition distribution are in one or more embodiments, bridged biscyclopentadienyl hafnium or zirconium compounds. These bridged biscyclopentadienyl hafnium or zirconium compounds of the present disclosure include those compounds having one substituted or unsubstituted carbon or substituted silicon atom bridging two cyclopentadienyl (Cp) ligands of the metal centers, the aromatic fused-ring substituted cyclopentadienyl ligand or ligands optionally containing substituents on the non-cyclopentadienyl aromatic rings selected from $C_1$-$C_{20}$ hydrocarbyl or hydrocarbylsilyl substituents. Substituents typically include one or more $C_1$ to $C_{30}$ hydrocarbon or hydrocarbylsilyl groups that can be linear, branched, cyclic, aliphatic, aromatic or combined groups, whether in a fused-ring or pendant configuration. Examples include methyl, isopropyl, n-propyl, n-butyl, isobutyl, tertiary butyl, neopentyl, phenyl, and benzyl. "Hydrocarbylsilyl" includes but is not limited to, $CH_2$—$SiR*_3$, (where $R*$ is $C_1$ to $C_{10}$ alkyl, such as methyl), trimethylsilyl and triethylsilyl. Similarly the use of heteroatom containing cyclopentadienyl rings or fused ring, where a non-carbon Group 14 or 15 atom replaces one of the ring carbons in the Cp ring or in a fused ring, is considered for this specification to be within the terms "cyclopentadienyl", "indenyl", and "fluorenyl."

Particularly useful bridged biscyclopentadienyl compounds can be represented by the formula:

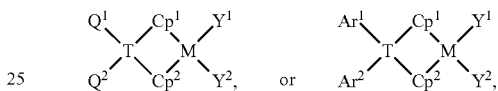

wherein:

M is zirconium or hafnium, for example hafnium;

each of $Cp^1$ and $Cp^2$ is independently a substituted or unsubstituted cyclopentadienyl-containing group;

T is a Group 14 element containing bridging group, for example comprising one or more carbon or silicon atoms;

each of $Y^1$ and $Y^2$ is independently an anionic leaving group;

each of $Q^1$ and $Q^2$ is independently a substituted or unsubstituted hydrocarbyl group; and each of $Ar^1$ and $Ar^2$ is independently a substituted or unsubstituted aryl group.

As illustrative non-limiting examples, $Ar^1$ and $Ar^2$ may be independently:

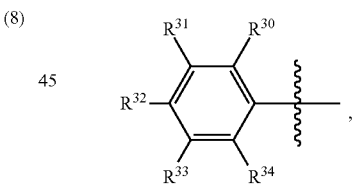

wherein each of $R^{30}$, $R^{31}$, $R^{32}$, $R^{33}$, and $R^{34}$ may be independently hydrogen, linear or branched $C_1$-$C_{40}$ hydrocarbyl, linear or branched substituted $C_1$-$C_{40}$ hydrocarbyl, silylcarbyl, substituted silylcarbyl, $C_6$-$C_{10}$ aryl, substituted $C_6$-$C_{10}$ aryl, —$NR'_2$, —$SR'$, —$OR'$, —$OSiR'_3$, —$PR'_2$, where each R' is hydrogen, halogen, $C_1$-$C_{10}$ alkyl, or phenyl.

As illustrative non-limiting examples, $Q^1$ and $Q^2$ may be independently hydrogen, linear or branched $C_1$-$C_{40}$ hydrocarbyl, linear or branched substituted $C_1$-$C_{40}$ hydrocarbyl, silylcarbyl, substituted silylcarbyl, $C_6$-$C_{10}$ aryl, substituted $C_6$-$C_{10}$ aryl, —$NR'_2$, —$SR'$, —$OR'$, —$OSiR'_3$, —$PR'_2$, where each R' is hydrogen, halogen, $C_1$-$C_{10}$ alkyl, or phenyl.

As illustrative, non-limiting examples, each of $Cp^1$ and $Cp^2$ may be independently unsubstituted cyclopentadienyl, substituted cyclopentadienyl, unsubstituted indenyl, substituted indenyl, unsubstituted fluorenyl, or substituted fluorenyl.

As illustrative non-limiting examples, $Y^1$ and $Y^2$ may be independently hydrogen, halide, hydroxyl, or $C_1$-$C_{50}$ substituted or unsubstituted hydrocarbyl, amide, alkoxide, sulfide, phosphide, halide, or a combination thereof, or $Y^1$ and $Y^2$ are joined together to form a metallocycle ring, or $Y^1$ and $Y^2$ are joined to form a chelating ligand, or an alkylidene, (for example each of $Y^1$ and $Y^2$ is independently a $C_1$ to $C_{12}$ alkyl (such as methyl, ethyl, propyl, butyl, pentyl, hexyl, octyl, nonyl, decyl, undecyl, dodecyl, or isomers thereof, such as iso-, tert-, n-, sec-), hydrido, benzyl, neopentyl, trimethylsilylmethyl, halogen (such as chloride, bromide, fluoride, iodide), triflate, for example, $Y^1$ and $Y^2$ may be methyl, chloride, or dialkylamido).

In an embodiment of the invention in any embodiment of any formula described herein, T is a bridging group comprising Si, Ge, or C, for example T is dialkyl silicon or dialkyl germanium, and for example T is dimethyl silicon.

In an embodiment of the invention in any embodiment of any formula described herein, T is a bridging group and is represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', or R'$_2$C—PR'—CR'$_2$, where each R' is, independently, hydrogen or a $C_1$ to $C_{20}$ containing hydrocarbyl, substituted hydrocarbyl, halocarbyl, substituted halocarbyl, silylcarbyl or germylcarbyl substituent, and optionally, two or more adjacent R' may join to form a substituted or unsubstituted, saturated, partially unsaturated or aromatic, cyclic or polycyclic substituent. T may be $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p-(Et)_3SiPh)_2C$, cyclopentasilylene ($Si(CH_2)_4$), or $Si(CH_2)_5$.

Specific bridged biscyclopentadienyl compounds include those derived from: (1) indenyl-based complexes such as the rac- or meso-isomer, or mixtures, of dimethylsilyl bis(indenyl)hafnium dimethyl, dimethylsilyl bis(2-methyl-indenyl) hafnium dimethyl, dimethylsilyl bis(2-propyl-indenyl)hafnium dimethyl, dimethylsilyl bis(4-methyl, 2-phenyl-indenyl)hafnium dimethyl, or methylene(indenyl)(2,7-di-tertbutyl-fluorenyl)hafnium dimethyl, and diphenylmethylene(indenyl)(2,7-bis tert-butylfluorenyl)hafnium dibenzyl; (2) fluorenyl-based complexes such as dibutylsilyl(fluorenyl)(cyclopentadienyl)hafnium dimethyl, dimethylsilyl(indenyl)(fluorenyl) hafnium dihydride, i-propyl (cyclopentadienyl)(fluorenyl)hafnium dimethyl, dinapthylmethylene(cyclopentadienyl)(fluorenyl)hafnium dimethyl, diphenylmethylene(2,7-di tertbutyl, 5-methyl-fluorenyl)(cyclopentadienyl)hafnium dimethyl, diphenylmethylene(2,7-di para-n-butyl-fluorenyl)(cyclopentadienyl) hafnium dimethyl, diphenylmethylene (cyclopentadienyl)(2,7-dimethylfluorenyl)hafnium dimethyl, diphenylmethylene (cyclopentadienyl)(2,7-di-tertbutyl-fluorenyl)hafnium dimethyl, methylene (2,7-di-tertbutylfluorenyl)(fluorenyl)hafnium dimethyl, diphenylmethylene(2,7-di-tertbutylfluorenyl) (fluorenyl) hafnium dimethyl, methylene bis(fluorenyl) hafnium dimethyl, or methylphenylmethylene bis(fluorenyl) hafnium dimethyl; and (3) cyclopentadienyl-based complexes such as the rac- or meso-isomer, or mixtures of (para-trimethylsilylphenyl)(para-n-butylphenyl)methylene (fluorenyl)(cyclopentadienyl)hafnium dimethyl, di(para-trimethylsilylphenyl)methylene(2,7-di-tertbutylfluorenyl) (cyclopentadienyl)hafnium dimethyl, di(para-trimethylsilylphenyl)methylene(2,7-di-tertbutyl-fluorenyl) (cyclopentadienyl)hafnium dimethyl, (para-trimethylsilylphenyl)(para-t-butylphenyl)methylene(2,7-di tertbutyl fluorenyl)(cyclopentadienyl)hafnium dimethyl or dibenzyl, di(para-trimethylsilylphenyl)methylene(2,7-dimethylfluorenyl)(cyclopentadienyl)hafnium dimethyl or dibenzyl, and bis(p-triethylsilylphenyl)carbyl(cyclopentadienyl)(2,7-di-t-butylfluorenyl)hafnium dimethyl.

Other useful bridged biscyclopentadienyl compounds include: diphenyl methylene (cyclopentadienyl)(9-fluorenyl)hafnium dimethyl, diphenyl methylene (cyclopentadienyl)(2,7-dimethyl-9-fluorenyl)hafnium dimethyl, diphenyl methylene (cyclopentadienyl)(2,7-di-tert-butyl-9-fluorenyl) hafnium dimethyl, di(p-trimethylsilyl-phenyl)methylene (cyclopentadienyl)(fluorenyl)hafnium dimethyl, di(p-trimethylsilyl-phenyl)methylene (cyclopentadienyl)(2,7-dimethyl-9-fluorenyl)hafnium dimethyl, di(p-trimethylsilyl-phenyl)methylene(cyclopentadienyl)(2,7-di-tert-butyl-9-fluorenyl)hafnium dimethyl, di(p-triethylsilyl-phenyl) methylene(cyclopentadienyl)(fluorenyl)hafnium dimethyl, di(p-triethylsilyl-phenyl)methylene(cyclopentadienyl)(2,7-dimethyl-9-fluorenyl)hafnium dimethyl, di(p-triethylsilyl-phenyl)methylene (cyclopentadienyl)(2,7-di-tert-butyl-9-fluorenyl)hafnium dimethyl, (p-triethylsilyl-phenyl)(p-tert-butylphenyl)methylene(cyclopentadienyl)(fluorenyl) hafnium dimethyl, (p-triethylsilyl-phenyl))(p-n-butylphenyl)methylene(cyclopentadienyl)(2,7-dimethyl-9-fluorenyl)hafnium dimethyl, (p-trimethylsilylphenyl)(p-n-butylphenyl)methylene(cyclopentadienyl)(2,7-di-tert-butyl-9-fluorenyl)hafnium dimethyl, and (p-triethylsilyl-phenyl) (p-n-butylphenyl)methylene (cyclopentadienyl)(2,7-dimethyl-9-fluorenyl)hafnium dimethyl.

It has been found that the asymmetric, bridged compounds, such as those listed above, are particularly useful in accordance with the current disclosure.

In particular, for the bridged hafnium compounds, it is thought that increasing the degree of substitution on the aromatic fused-ring substituted ligand contributes increased molecular weight, as is the use of covalent bridges between the cyclopentadienyl ligands having a substituted or unsubstituted carbon atom (—$CH_2$—, or —CHR—, or —$CR_2$—) or substituted silylene (—$SiR_2$—) bridging unit, where each R may be the same or different $C_1$ to $C_{20}$ hydrocarbyl substituent, or where the two R's may be covalently linked to form a cyclic structure. The substitution on the indenyl, fluorenyl or azulenyl radicals in the hafnium compounds will generally comprise two or more $C_1$ to $C_{30}$ hydrocarbon substituents on a 6-member fused-ring as defined above.

This invention further relates to a catalyst system used to produce bimodal rubber that can be used to produce pellet-stable Bimodal Rubber, comprising at least one of the bridged biscyclopentadienyl compounds described above, at least one of the transition metal pyridyldiamide compounds described above, an optional activator, optional co-activator, and optional support.

In at least one embodiment, a catalyst system can be used to produce Bimodal Rubber, which can then be used to produce pellet-stable Bimodal Rubber comprising:
A) a bridged biscyclopentadienyl compound comprising:
   i) at least one unsubstituted cyclopentadienyl ligand or aromatic fused-ring substituted cyclopentadienyl ligand;
   ii) one aromatic fused-ring substituted cyclopentadienyl ligand;
   iii) a transition metal bound to both cyclopentadienyl ligands;
   iv) a bridge group connecting the two cyclopentadienyl ligands, said bridge having one or more carbon or silicon atoms; and
B) a transition metal pyridyldiamide compound represented by formula (I) or (II):

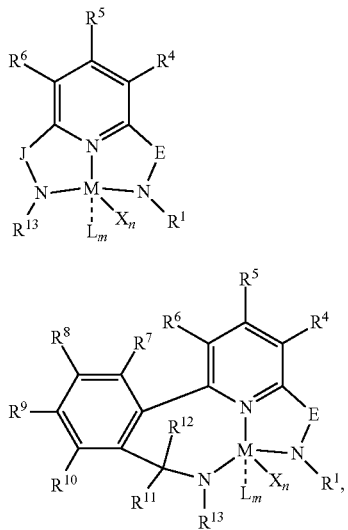

wherein:
M is a Group 3, 4, 5, 6, 7, 8, 9, or 10 metal (for example, M is Zr or Hf);
E is $C(R^2)$ or $C(R^3)(R^{3'})$;
X is an anionic leaving group (for example X is methyl, hydrido, benzyl, neopentyl, trimethylsilylmethyl, chloride, bromide, fluoride, iodide, propyl, ethyl, hexyl, triflate, more for example methyl, chloride, or dialkylamido);
L is a neutral Lewis base (for example L is ether, amine, phosphine, or thioether);
$R^1$ and $R^{13}$ are independently selected from substituted or unsubstituted hydrocarbyl or silyl groups (for example $R^1$ & $R^{13}$ are aryl groups, for example $R^1$ is 2,6-disubstituted aryl, for example $R^1$ is 2,6-diisopropylphenyl, for example $R^{13}$ is 2-substituted aryl, for example $R^{13}$ is phenyl, for example $R^1$ is 2,6-disubstituted aryl group and $R^{13}$ is an aryl group that is unsubstituted in the 2 and 6 positions);
$R^2$ is a group containing 1-10 carbon atoms that is optionally joined with $R^4$ to form an aromatic ring (for example $R^2$ & $R^4$ are joined to form a six membered aromatic ring);
$R^3$, $R^{3'}$, $R^4$, $R^5$, $R^6$, $R^7$, $R^8$, $R^9$, $R^{10}$, $R^{11}$, and $R^{12}$ are each independently selected from hydrogen, substituted or unsubstituted hydrocarbyl, alkoxy, silyl, amino, aryloxy, halogen, and phosphino (for example $R^3$ & $R^{3'}$ are hydrogen);
J is a divalent group that forms a three-atom-length bridge between the pyridine ring and the amido nitrogen (for example J is selected from:

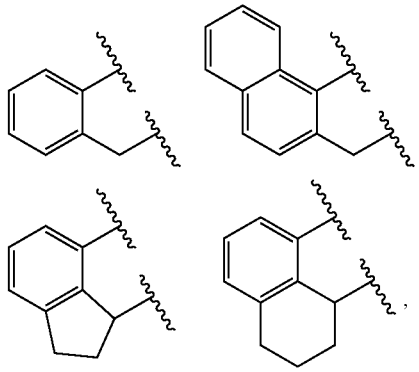

n is 1 or 2;
m is 0, 1, or 2;
two X groups may be joined to form a dianionic group;
two L groups may be joined to form a bidentate Lewis base;
an X group may be joined to an L group to form a monoanionic bidentate group; and
adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring (for example $R^7$ & $R^8$ are joined to form an aromatic ring, for example $R^7$ & $R^8$ are joined to form cyclopentyl or cyclohexyl, for example $R^{10}$ & $R^{11}$ are joined to form a five- or six-membered ring, for example $R^{10}$ & $R^{11}$ are joined to form cyclopentyl or cyclohexyl).

In at least one embodiment, M is hafnium.
In at least one embodiment, M is zirconium.
In at least one embodiment, the bridge is a single carbon or silicon atom.
In at least one embodiment, the aromatic fused-ring substituted cyclopentadienyl ligand is a substituted or unsubstituted fluorenyl ligand.
In at least one embodiment, the bridge group of the bridged biscyclopentadienyl compound is a substituted or unsubstituted carbon atom.
In at least one embodiment, the bridged atom is substituted with at least one aryl group.
In at least one embodiment, the bridged biscyclopentadienyl compound is at least one of: diphenyl methylene (cyclopentadienyl)(9-fluorenyl)hafnium dimethyl, diphenyl methylene (cyclopentadienyl)(2,7-dimethyl-9-fluorenyl) hafnium dimethyl, diphenyl methylene (cyclopentadienyl) (2,7-di-tert-butyl-9-fluorenyl)hafnium dimethyl, di(p-trimethylsilyl-phenyl)methylene(cyclopentadienyl)(fluorenyl) hafnium dimethyl, di(p-trimethylsilyl-phenyl)methylene (cyclopentadienyl)(2,7-dimethyl-9-fluorenyl)hafnium dimethyl, di(p-trimethylsilyl-phenyl)methylene(cyclopentadienyl)(2,7-di-tert-butyl-9-fluorenyl)hafnium dimethyl, di(p-triethylsilyl-phenyl)methylene(cyclopentadienyl)(fluorenyl) hafnium dimethyl, di(p-triethylsilyl-phenyl)methylene (cyclopentadienyl)(2,7-dimethyl-9-fluorenyl)hafnium dimethyl, di(p-triethylsilyl-phenyl)methylene (cyclopentadienyl)(2,7-di-tert-butyl-9-fluorenyl)hafnium dimethyl, (p-triethylsilyl-phenyl)(p-tert-butylphenyl)methylene(cyclopentadienyl)(fluorenyl)hafnium dimethyl, (p-triethylsilyl-phenyl))(p-n-butylphenyl)methylene(cyclopentadienyl) (2,7-dimethyl-9-fluorenyl)hafnium dimethyl, (p-trimethylsilylphenyl)(p-n-butylphenyl)methylene(cyclopentadienyl)(2,7-di-tert-butyl-9-fluorenyl)hafnium dimethyl, and (p-triethylsilyl-phenyl)(p-n-butylphenyl)methylene (cyclopentadienyl)(2,7-dimethyl-9-fluorenyl)hafnium dimethyl.

In at least one embodiment, the bridged biscyclopentadienyl compound is:

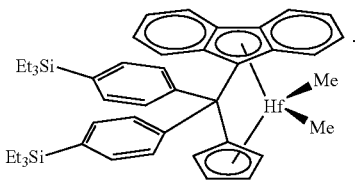

In at least one embodiment, the bridge group of the bridged biscyclopentadienyl compound is a substituted silicon atom.

In at least one embodiment, the catalyst system includes a transition metal pyridyldiamide compound represented by formula (III):

(III)

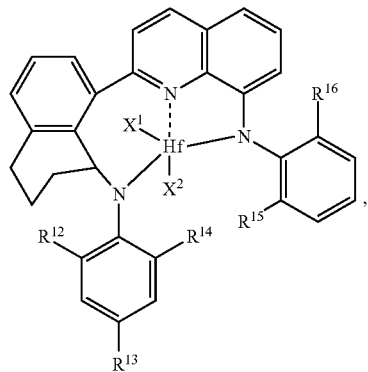

wherein:

each of $R^{12}$, $R^{13}$, $R^{14}$, $R^{15}$, and $R^{16}$ is independently hydrogen, methyl, ethyl, propyl, isopropyl, isobutyl, or tertbutyl, and each of $X^1$ and $X^2$ is independently halogen or alkyl.

In at least one embodiment, the catalyst system for example includes one or more of the following transition metal pyridyldiamide compounds of (1)-(8):

(1)

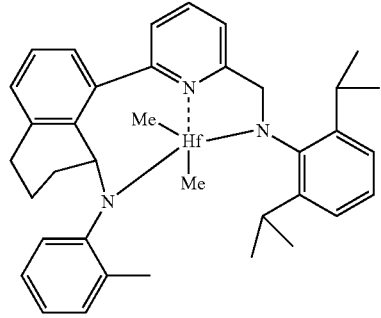

(2)

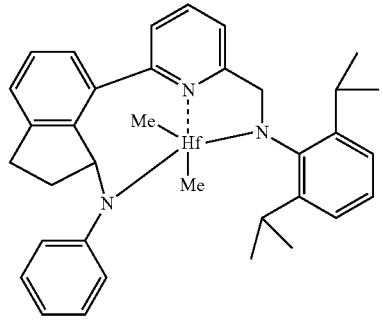

(3)

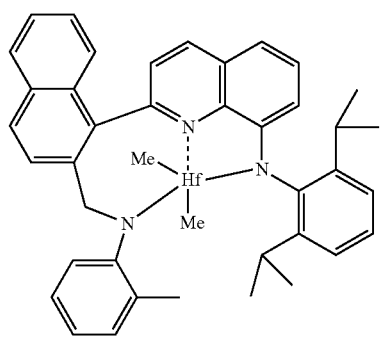

(4)

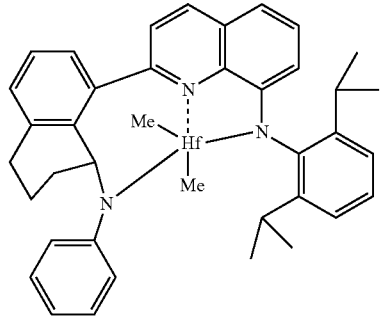

(5)

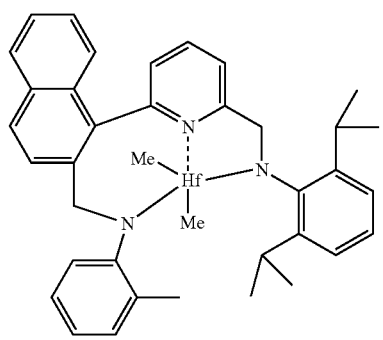

(6)
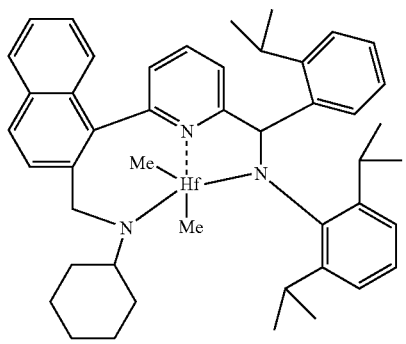

(7)
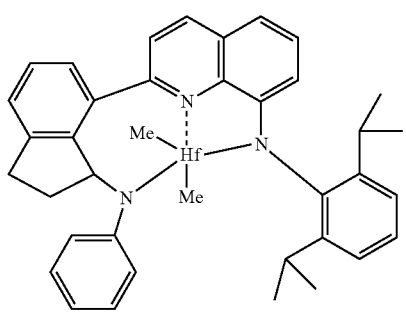

(8)
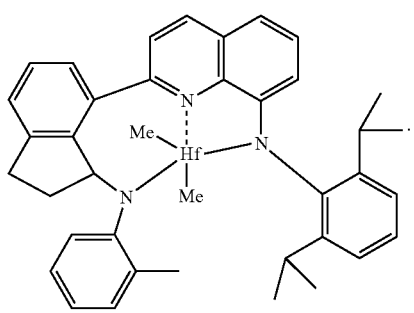

In at least one embodiment, the catalyst system for example includes the following transition metal pyridyldiamide compound:

(4)
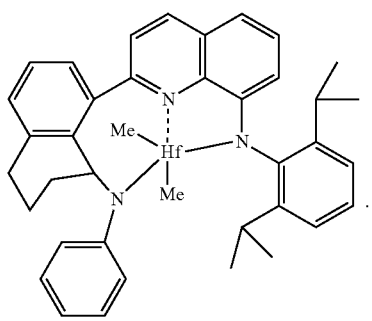

This invention further relates to a catalyst system for producing rubbers, comprising: a) a bridged biscyclopentadienyl compound as described above; b) a transition metal pyridyldiamide compound as described above; (c) a bridged or unbridged metallocene catalyst compound that is different from the bridged biscyclopentadienyl compound of (a); and d) a transition metal pyridyldiamide compound that is different from the transition metal pyridyldiamide compound of (b).

This invention further relates to a catalyst system for producing rubbers, comprising: a) a bridged biscyclopentadienyl compounds as described above; b) a transition metal pyridyldiamide compound as described above; and c) a transition metal pyridyldiamide compound that is different from the transition metal pyridyldiamide compound of (b).

This invention further relates to a catalyst system for producing rubbers, comprising: a) a bridged biscyclopentadienyl compound as described above; b) a transition metal pyridyldiamide compound as described above; and (c) a bridged or unbridged metallocene catalyst compound that is different from the bridged biscyclopentadienyl compound of (a).

For purposes of this invention, one catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of this invention, e.g., rac-dimethylsilylbis(2-methyl 4-phenyl)hafnium dimethyl is considered to be the same as meso-dimethylsilylbis(2-methyl 4-phenyl)hafnium dimethyl. Thus, as used herein, a single, bridged, asymmetrically substituted metallocene catalyst component having a racemic and/or meso isomer does not, itself, constitute two different bridged, metallocene catalyst components.

In any embodiment of this invention, the catalyst system further includes an activator. In any embodiment of this invention, the catalyst system further includes a support material. In any embodiment of this invention, the catalyst system further includes an activator and a support material.

In embodiments of the invention, the catalyst system for producing rubbers further comprises an activator comprising an alumoxane. In embodiments of the invention, the catalyst system further comprises an activator comprising a non-coordinating anion activator. In embodiments of the invention, the catalyst system further comprises a silica support.

Activators

After the catalyst complexes have been synthesized, catalyst systems may be formed by combining the complexes with optional activators in any suitable manner. The catalyst system, or any component thereof, may optionally be supported for use in slurry or gas phase polymerization. The catalyst systems may also be added to or generated in homogeneous polymerization systems, such as solution polymerization or bulk (in the monomer) polymerization. The catalyst system typically includes the two catalyst complexes as described above and an activator such as alumoxane or a non-coordinating anion.

Non-limiting activators, for example, include alumoxanes, aluminum alkyls, ionizing activators, which may be neutral or ionic, and conventional-type cocatalysts. Activators often include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In one embodiment, alumoxane activators are utilized as an activator in the catalyst system. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. In an embodiment, methylalumoxane is used and is a visually clear alumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Another useful alumoxane is solid polymethylaluminoxane as described in U.S. Pat. Nos. 9,340,630; 8,404,880; and 8,975,209.

When the activator is an alumoxane (modified or unmodified), some embodiments select the maximum amount of activator typically at up to about a 5000-fold molar excess Al/M over all the catalyst compounds (per metal catalytic site). The minimum activator-to-catalyst-compound is about a 1:1 molar ratio. Alternate ranges include from about 1:1 to about 500:1, alternately from about 1:1 to about 200:1, alternately from about 1:1 to about 100:1, or alternately from about 1:1 to about 50:1. In an alternate embodiment, little or no alumoxane is used in the polymerization processes described herein. For example, alumoxane is present at about zero mol %, alternately the alumoxane is present at a molar ratio of aluminum to catalyst compound transition metal less than about 500:1, for example less than about 300:1, for example less than about 100:1, for example less than about 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

"Compatible" non-coordinating anions can be those which are not degraded to neutrality when the initially formed complex decomposes, and the anion does not transfer an anionic substituent or fragment to the cation so as to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator.

In an embodiment, boron containing NCA activators represented by the formula below can be used:

$$Z_d^+(A^{d-})$$

where: Z is (L-H) or a reducible Lewis acid; L is a neutral Lewis base; H is hydrogen; $(L-H)^+$ is a Bronsted acid; $A^{d-}$ is a non-coordinating anion, for example a boron containing non-coordinating anion having the charge d−; and d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand containing transition metal catalyst precursor, resulting in a cationic transition metal species.

The activating cation $Z_d^+$ may also be a moiety such as silver, tropylium, carboniums, ferroceniums and mixtures, for example carboniums and ferroceniums. In one or more embodiments, $Z_d+$ is triphenyl carbonium. Examples of reducible Lewis acids include any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, for example the reducible Lewis acids in "Z" include those represented by the formula: $(Ph_3C)$, where Ph is a substituted or unsubstituted phenyl, for example substituted with $C_1$ to $C_{40}$ hydrocarbyls or substituted a $C_1$ to $C_{40}$ hydrocarbyls, for example $C_1$ to $C_{20}$ alkyls or aromatics or substituted $C_1$ to $C_{20}$ alkyls or aromatics, for example Z is a triphenylcarbonium.

When $Z_d+$ is the activating cation $(L-H)_d^+$, it is for example a Bronsted acid, capable of donating a proton to the transition metal catalytic precursor resulting in a transition metal cation, including ammoniums, oxoniums, phosphoniums, silyliums, and mixtures thereof, for example ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (for example 1, 2, 3, or 4); n−k=d; M is an element selected from Group 13 of the Periodic Table of the Elements, for example boron or aluminum; and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. In one or more embodiments, each Q is a fluorinated hydrocarbyl group having 1 to 20 carbon atoms, for example each Q is a fluorinated aryl group, and for example each Q may be a pentafluoryl aryl group. Examples of suitable $A^{d-}$ also include diboron compounds as disclosed in U.S. Pat. No. 5,447,895, which is fully incorporated herein by reference.

Examples of boron compounds which may be used as an activating cocatalyst include the compounds described as (and particularly those specifically listed as) activators in U.S. Pat. No. 8,658,556, which is incorporated by reference herein.

Bulky activators are also useful herein as NCAs. "Bulky activator" as used herein refers to anionic activators represented by the formula:

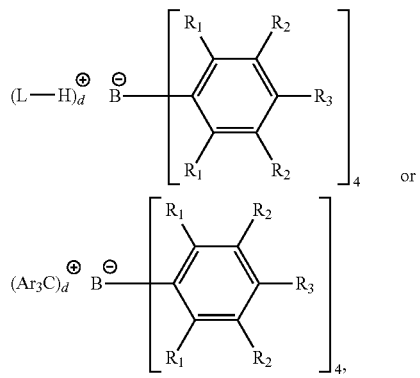

wherein:
each $R_1$ is, independently, a halide, such as a fluoride;
Ar is a substituted or unsubstituted aryl group (for example a substituted or unsubstituted phenyl), for example substituted with $C_1$ to $C_{40}$ hydrocarbyls, for example $C_1$ to $C_{20}$ alkyls or aromatics;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (for example R2 is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (for example $R_3$ is a fluoride or a $C_6$ perfluorinated aromatic hydrocarbyl group); wherein $R_2$ and $R_3$ can form one or more saturated or unsaturated, substituted or unsubstituted rings (for example $R_2$ and $R_3$ form a perfluorinated phenyl ring);
L is a neutral Lewis base; (L-H)+ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

In one or more embodiments, $(Ar_3C)_d^+$ is $(Ph_3C)_d^+$, where Ph is a substituted or unsubstituted phenyl, for example substituted with $C_1$ to $C_{40}$ hydrocarbyls or substituted $C_1$ to $C_{40}$ hydrocarbyls, for example $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in Girolami, G. S. (1994) "A Simple 'Back of the Envelope' Method for Estimating the Densities and Molecular Volumes of Liquids and Solids," Journal of Chemical Education, v. 71(11), pp. 962-964. Molecular volume (MV), in units of cubic Å, is calculated using the formula: MV=8.3Vs, where Vs is the scaled volume. Vs is the sum of the relative volumes of the constituent atoms, and is calculated from the molecular formula of the substituent using the following table of relative volumes. For fused rings, the Vs is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators as described in U.S. Pat. No. 8,658,556, which is incorporated by reference herein.

In another embodiment, one or more of the NCA activators is chosen from the activators described in U.S. Pat. No. 6,211,105.

Example activators include N,N-dimethylanilinium tetrakis(perfluorophenyl)borate, triphenylcarbenium tetrakis (perfluorophenyl)borate, $[Ph_3C^+][B(C_6F_5)4^-]$, $[Me_3NH^+][B(C_6F_5)4^-]$, 1-(4-(tris(pentafluorophenyl)borate)-2,3,5,6-tetrafluorophenyl)pyrrolidinium, 4-(tris(pentafluorophenyl) borate)-2,3,5,6-tetrafluoropyridine.

In an embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate.

In another embodiment, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

In one or more embodiments, the ionic activator $Z_d^+$ $(A^{d-})$ is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis (trifluoromethyl)phenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate, triphenylcarbenium tetra (perfluorophenyl)borate, trimethylammonium tetrakis (perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, or tropillium tetrakis(perfluoronaphthyl)borate.

The typical activator-to-catalyst ratio, e.g., all NCA activators-to-catalyst ratio is about a 1:1 molar ratio. Alternate ranges include from about 0.1:1 to about 100:1, alternately from about 0.5:1 to about 200:1, alternately from about 1:1 to about 500:1, alternately from about 1:1 to about 1000:1. A particularly useful range is from about 0.5:1 to about 10:1, about 1:1 to about 5:1.

It is also within the scope of the present disclosure that the catalyst compounds can be combined with combinations of alumoxanes and NCA's (see for example, U.S. Pat. Nos. 5,153,157 and 5,453,410, EP 0 573 120 B1, WO 94/07928, and WO 95/14044 which discuss the use of an alumoxane in combination with an ionizing activator).

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Useful chain transfer agents are typically alkylalumoxanes, a compound represented by the formula $AlR_3$, $ZnR_2$ (where each R is, independently, a $C_1$-$C_8$ aliphatic radical, for example methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Particularly useful chain transfer agents are trialkylaluminums and dialkylzincs, which are represented by the formulas $AlR_3$ and $ZnR_2$ (where each R is, independently, a $C_1$-$C_8$ aliphatic radical, for example methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

Optional Support Materials

In embodiments of the invention herein, the catalyst system may comprise an inert support material. For example, the supported material is a porous support material, for example, talc, and inorganic oxides. Other support materials include zeolites, clays, organoclays, or any other organic or inorganic support material and the like, or mixtures thereof.

For example, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Support materials include $Al_2O_3$, $ZrO_2$, $SiO_2$, and combinations thereof, for example $SiO_2$, $Al_2O_3$, or $SiO_2/Al_2O_3$.

In one or more embodiments, the support material, which for example is an inorganic oxide, has a surface area in the range of from about 10 to about 700 m²/g, pore volume in the range of from about 0.1 to about 4.0 cc/g and average particle size in the range of from about 5 to about 500 µm. In one or more embodiments, the surface area of the support material is in the range of from about 50 to about 500 m²/g, pore volume of from about 0.5 to about 3.5 cc/g and average particle size of from about 10 to about 200 m. In one or more embodiments, the surface area of the support material is in the range is from about 100 to about 400 m²/g, pore volume from about 0.8 to about 3.0 cc/g and average particle size is from about 5 to about 100 m. The average pore size of the support material useful in the present disclosure is in the range of from about 10 to about 1000 Å, for example 50 to about 500 Å, and for example 75 to about 350 Å. In some embodiments, the support material is a high surface area, amorphous silica (surface area=300 m²/gm; pore volume of 1.65 cm³/gm). Some silicas are marketed under the tradenames of DAVISON 952 or DAVISON 955 by the Davison Chemical Division of W.R. Grace and Company. In other embodiments, DAVISON 948 is used.

The support material should be dry, that is, free of absorbed water. Drying of the support material can be effected by heating or calcining at about 100° C. to about 1,000° C., for example at least about 600° C. When the support material is silica, it is heated to at least 200° C., for example about 200° C. to about 850° C., and for example at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this disclosure. The calcined support material is then contacted with at least one polymerization catalyst system having at least one catalyst compound and an activator.

The support material, having reactive surface groups, typically hydroxyl groups, is slurried in a non-polar solvent and the resulting is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., for example to about 23° C. to about 60° C., for example at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator and the catalyst compound, are at least partially soluble and which are liquid at reaction temperatures. Some non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Fluorided Support

In an embodiment, a fluorided (also referred to as fluoridated) support is used for any catalyst system disclosed herein. The fluorided supports (such as fluorided silica) can be obtained through the addition of a solution of polar solvent (such as water) and fluorine compound (such as $(NH_4)_2SiF_6$) to a slurry of support (such as a toluene slurry of silica). This preparation method contributes to an even distribution of the fluoride compound (such as $(NH_4)_2SiF_6$) onto the support surface (such as the silica surface), in contrast to a less homogeneous distribution observed when the solid salt is combined with the solid silica as described in U.S. Publication No. 2002/0123582 A1.

In an embodiment, an aqueous solution of fluorinating agent (such as $(NH_4)_2SiF_6$) is added to a slurry of support (such as a toluene slurry of silica). Vigorous stirring of the mixture allows the dissolved fluorine compound (in water) to be evenly absorbed onto the hydrophilic support surface. After filtration, the wet support is allowed to air dry until it is free flowing, and then may be calcined (typically at temperatures over about 100° C. for at least about 1 hour).

In an embodiment, a solution of polar solvent and fluorinating agent (such as $(NH_4)_2SiF_6$) is added to a slurry of support (such as a toluene slurry of silica). Vigorous stirring of the mixture allows the dissolved fluorine compound (in water) to be evenly absorbed onto the hydrophilic support surface. After filtration, the wet support is allowed to air dry until it is free flowing, and then may be calcined (typically at temperatures over about 100° C. for at least about 1 hour).

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, [H(OEt$_2$)$_2$]+, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Synthesized Olefinic Elastomeric Copolymers for Making Pellet-Stable Multimodal Rubber In one or more embodiments of the present disclosure, the Bimodal Rubber is synthesized using at least two different catalysts in a single, first reactor rather than using different catalysts in multiple reactors in series, as generally shown in FIG. 1. In one or more embodiments a second, single reactor, which is producing isotactic polypropylene random copolymer ("RCP"), described below, operates in parallel with the first Bimodal Rubber-producing reactor. Next in one or more embodiments, the separate reactor effluents of the Bimodal Rubbers and the RCP are combined via in situ-reactor blending. In one or more embodiments, the thus-produced RCP-containing Bimodal Rubber which is pellet-stable, and which may optionally be pelletized.

The Bimodal Rubbers are synthesized using dual organometallic catalysts (using C2 symmetric or pseudo-C2-symmetric metallocene catalysts), and are reactor-blended with isotactic polypropylene random copolymers (RCP) having a Mn greater than 60,000, and an ethylene co-monomer of less than 4 wt %. In one or more embodiments, the amount of isotactic copolymer in the reactor blends is from about 2.5 wt % to 20 wt %, or from 5 wt % to 15 wt %.

Polyolefin Products

In one or more embodiments, the foregoing catalyst systems and disclosed methods herein produce multimodal olefinic elastomeric copolymers, comprising: i) EPDMs comprising ethylene, alpha-olefin, and diene terpolymers with bimodalities in molecular weight and in composition, and ii) ethylene, propylene, and 5-ethylidene-2-norbornene terpolymers ("Bimodal Rubbers"). In an embodiment, these Bimodal Rubbers are synthesized by a mixture of bridged metallocene and pyridyldiamide transition metal homogeneous catalysts, as more fully described herein, at a molar ratio of 0.25 to 2 in a single solution reactor. In one or more embodiments, such Bimodal Rubbers may be synthesized by contacting ethylene, at least one alpha olefin (for example propylene), and at least one diene with such catalyst system.

The copolymers produced herein may be characterized by a bimodal molecular weight, i.e., having a moderate molecular weight component and an ultra-high molecular weight component and by a bimodal composition distribution, i.e., having propylene-rich (greater than 40 wt %) moderate MW components, and ethylene-rich (greater than 60 wt %) ultra-high MW components. The improved molecular weight split ratio and composition distribution of the Bimodal Rubbers provides excellent processability, elasticity, and compatibility with polypropylene (PP) which is present in the thermoplastic resin component, and also the RCP within the pellet-stable Bimodal Rubber, thus allowing production of softer and more elastic TPVs.

In an embodiment, the copolymers have a multimodal molecular weight distribution as determined by Gel Permeation Chromatography. By "multimodal" is meant that the GPC trace has at least two peaks. For GPC traces where the peaks include "shoulders," the term bimodal means that the GPC trace has at least two inflection points, e.g., one for the peak, and one the shoulder. (FIG. 2A and FIG. 2B are examples of a GPC trace having a peak and shoulder). An inflection point is that point where the second derivative of the curve changes in sign (e.g., from negative to positive or vice versus). In some embodiments herein, a multimodal polyolefin composition is produced, having a first polyolefin component and at least another polyolefin component, different from the first polyolefin component by molecular weight, such that the GPC trace has more than one peak or inflection point.

In an embodiment, the copolymers produced herein have 5.0 to 50 wt % of an ultra-high molecular weight component (based upon the weight of the copolymer), and 50 to 99.9 wt %, of a moderate molecular weight component.

Ethylene Derived Units—

In one or more embodiments, the maximum overall amount of ethylene derived units in the produced rubber is 15 mol % to 90 mol % (corresponding to 85 wt % in EPDM rubbers comprising bimodal ethylene, alpha-olefin, and diene terpolymers). In one or more embodiments, the moderate molecular weight (MW) fraction comprises less than 50 wt %, in other embodiments, less than 45 wt %, and in other embodiments, less than 45 wt % of ethylene derived units based on the total weight of ethylene and α-olefin. In one or more embodiments, the ultra-high MW fraction comprises more than 50 wt %, in other embodiments, more than 55 wt %, and in other embodiments, more than 60 wt % of ethylene derived units.

Weight Percent of Ethylene—

In one or more embodiments, the weight percent (based on total polymer weight) of ethylene in the moderate MW fraction and the weight percent of ethylene in the ultra-high MW fraction differ by no more than 30%, in other embodiments no more than 25%, in other embodiments no more than 20%. The relative amount of each fraction can vary and will depend on the desired overall polymer polydispersity and resiliency.

The ethylene content in EPDM rubbers comprising bimodal ethylene, alpha-olefin, and diene terpolymers is typically from about 45% to about 85% by weight with diene content varying from about 1% to about 12%, depending on application needs. In one or more other embodiments, the maximum amount of ethylene derived units is 80 mol %, in other embodiments 75 mol %, in other embodiments 70 mol %, in other embodiments 65 mol %, and in yet other embodiments 60 mol % based on the total moles of monomer. In one or more other embodiments, the minimum amount of ethylene derived units is 15 mol %, in other embodiments, 20 mol %, in other embodiments 25 mol %, in other embodiments 30 mol %, in other embodiments 35 mol %, in other embodiments 40 mol %, in other embodiments 50 mol %, and in other embodiments 55 mol % based on the total moles of monomer.

Diene Content—

In one or more embodiments, the diene content maximum is 5.0 mol % (15 wt %), in other embodiments 3.0 mol %, in other embodiments 2.5 mol %, in other embodiments 0.2 mol % (0.7 wt %), in other embodiments 0.3 mol %, and in other embodiments 0.5 mol %. In one or more embodiments, the balance of the polymer units is made up of an α-olefin.

In other embodiments, both fractions contain the same or similar weight percent of diene, the weight percent in each fraction differing by no more than 5 wt %, in other embodiments no more than 3 wt %, in other embodiments no more than 2 wt %, and in other embodiments no more than 1 wt % of diene. In one or more embodiments, the moderate MW and ultra-high MW fractions have a diene content of less than 15 wt %, in other embodiments less than 12 wt %, in other embodiments less than 10 wt %, in other embodiments less than 8 wt %, in other embodiments less than 5 wt %, and in other embodiments less than 3 wt % based on the total weight of ethylene, α-olefin, and diene.

Viscosity—

The molecular weight of the produced rubber is related to viscosity which can be measured in several ways, such as by using a Mooney viscometer according to ASTM D1646. In one or more embodiments, the moderate MW fraction has a Mooney viscosity (MST (5+4@200° C.)) of at least 50, in other embodiments at least 60, and in other embodiments at least 70. In one or more embodiments, the ultra-high MW fraction has a Mooney viscosity (ML(1+4@125° C.)) of greater than 120, in other embodiments greater than 200, in other embodiments greater than 250, in other embodiments greater than 300.

Peak Molecular Weights—

In one or more embodiments, the peak molecular weight of the ultra-high molecular weight (MW) fraction is from 1,000,000 g/mol to 20,000,000 g/mol, in other embodiments from 1,500,000 g/mol to 15,000,000 g/mol, and in other embodiments from 2,000,000 g/mol to 10,000,000 g/mol. In one or more embodiments, the peak molecular weight of the moderate molecular weight (MW) fraction is from 100,000 g/mol to 800,000 g/mol, in other embodiments from 150,000 g/mol to 600,000 g/mol, and in other embodiments from 200,000 g/mol to 500,000 g/mol.

Molecular Weight Distribution—

In one or more embodiments, the fractions in the bimodal EPDMs comprising ethylene, alpha-olefin, and diene terpolymers, each by themselves, may be characterized by a molecular weight distribution (MWD) of 6 or less, in other embodiments 5 or less, in other embodiments 4 or less, and in other embodiments 3 or less. It should be understood, however, that the MWD of the bimodal EPDMs comprising ethylene, alpha-olefin, and diene terpolymers is larger as a result of the bimodality with MWD greater than 6.

Branching Index—

In one or more embodiments, the multimodal rubber employed in preparing the TPVs may be characterized by a branching index (BI) of at least 0.7, in other embodiments at least 0.8, in other embodiments at least 0.85, in other embodiments at least 0.9, in other embodiments at least 0.92, in other embodiments at least 0.95, and in other embodiments at least 0.98. In one or more embodiments, the rubber copolymers produced herein (for example ethylene, alpha-olefin, diene copolymers) for example have a $g'_{vis}$ value of about 0.95 or greater, about 0.97 or greater, or even more about 0.98 or greater. In embodiments, the ethylene, propylene, diene (such as ethylidene norbornene) copolymer produced herein has a $g'_{vis}$ value of about 0.95 or greater, about 0.97 or greater, more about 0.98 or greater.

Weight Average Molecular Weight (Mw)—

In one or more embodiments, the bimodal ethylene-propylene rubbers have a weight average molecular weight (Mw) that is greater than 500,000 g/mol, in other embodiments greater than 600,000 g/mol, in other embodiments greater than 700,000 g/mol, and in other embodiments greater than 800,000 g/mol; and the weight average molecular weight of the ethylene-propylene rubbers of one embodiment is less than 15,000,000 g/mol, in other embodiments less than 10,000,000 g/mol, in other embodiments less than 5,000,000 g/mol, and in other embodiments less than 2,500,000 g/mol.

Number Average Molecular Weight (Mn)—

In one or more embodiments, useful ethylene-propylene rubber has a number average molecular weight (Mn) that is greater than 20,000 g/mol, in other embodiments greater than 50,000 g/mol, in other embodiments greater than 75,000 g/mol, and in other embodiments greater than 100,000 g/mol; and the number average molecular weight of the ethylene-propylene rubber of one or more embodiments is less than 1,000,000 g/mol, in other embodiments less than 750,000 g/mol, in other embodiments less than 500,000 g/mol, and in other embodiments less than 300,000 g/mol.

Ultra-High Molecular Weight Components of the Copolymers

Furthermore in in one or more embodiments where a bimodal rubber is produced, the ultra-high molecular weight components of the copolymers produced herein may comprise: A. about 5 to about 50 wt % of an ultra-high molecular weight (MW) fraction, in other embodiments from about 5 to about 40 wt %, in other embodiments from about 5 to about 30 wt %, in other embodiments from about 5 to 20 wt %, in other embodiments from about 5 to about 15 wt % of the ultra-high MW fraction, and in other embodiments less than about 15 wt %, based upon the total weight of the copolymer.

Further in one or more embodiments, the ultra-high molecular weight component of the copolymers produced herein have in one or more embodiments:

i) a peak molecular weight of about 1,000,000 g/mol to 20,000,000 g/mol, in other embodiments from about 1,500,000 g/mol to 15,000,000 g/mol, and in other embodiments from 2,000,000 g/mol to 10,000,000 g/mol, and from about 2,500,000 g/mol to about 9,000,000 g/mol, from about 3,000,000 g/mol to about 8,000,000 g/mol, in still other embodiments from about 2,500,000 g/mol to about 7,500,000 g/mol, from about 2,500,000 g/mol to about 5,000,000 g/mol, and from about 2,500,000 g/mol to about 3,500,000 g/mol, in yet other embodiments;

ii) an ethylene content (in wt %) of about 40 to about 80 wt %, in other embodiments greater than 45 wt %, or greater than 50 wt %, or greater than 55 wt %, and yet greater than 60 wt % in embodiments;

iii) a $C_3$ to $C_{40}$ alpha olefin (such as propylene) content (in wt %) of more than 20 to about 60 wt %, or from about 25 to about 55 wt %, or from about 30 to about 50 wt %, in other embodiments;

iv) a diene (such as ethylidene norbornene) content of greater than zero to about 12 wt %, and about 1 to about 7 wt %; and v) a spread (half-peak width) from about 2 to about 20.

Moderate Molecular Weight Components of the Copolymers

Furthermore in one or more embodiments, where a bimodal rubber is produced, the overall polymer may comprise:

A. at least 50 wt % of a moderate MW fraction, in other embodiments at least 60 wt %, in other embodiments at least 70 wt %, in other embodiments at least 80 wt %, and in other embodiments at least 85 wt % of the moderate molecular weight fraction (i.e., the lower viscosity fraction), and in yet further embodiments, the Bimodal Rubber polymers may contain greater than 85 wt % of a moderate molecular weight component.

Further in one or more embodiments, the moderate molecular weight component of the copolymers produced herein have in one or more embodiments:

i) a peak molecular weight of from about 100,000 g/mol to about 800,000 g/mol, or a peak molecular weight of from about 150,000 g/mol to about 600,000 g/mol in other embodiments, or a peak molecular weight of from about 200,000 g/mol to about 500,000 g/mol in other embodiments, a peak molecular weight of from about 250,000 g/mol to about 500,000 g/mol in other embodiments, or a peak molecular weight of less than about 500,000 g/mol in other embodiments;

ii) an ethylene content (in wt %) of less than 50 wt %, or less than 45 wt %, or less than 40 wt %, or less than 35 wt %, or less than 30 wt % in other embodiments;

iii) a $C_3$ to $C_{40}$ alpha olefin (such as propylene) content (in wt %) of more than 50 to about 90 wt %, about 55 to about 80 wt %, and about 60 to about 75 wt % in other embodiments;

iv) a diene (such as ethylidene norbornene) content of greater than zero to about 12 wt %, about 1 to about 7 wt %, about 2 to about 5 wt % in other embodiments; and v) a spread (half-peak width) from about 2 to about 20.

In one or more embodiments, the entire copolymer has:
1) a $g'_{vis}$ value of about 0.95 or greater;
2) an Mw of 500,000 g/mol or more (alternately 750,000 g/mol or more);
3) an Mn of 75,000 g/mol or more (alternately 100,000 g/mol or more);
4) an Mw/Mn of from 3 to 15, for example 4 to 10, for example 5 to 9; and
5) an average ethylene content of 55 wt % or less, alternately 10 to 45 wt %.

Molecular weight and measurement methods are described below. Unless otherwise indicated, measurements of the moments of molecular weight, i.e., peak molecular weight, weight average molecular weight (Mw), number average molecular weight (Mn), and z average molecular weight (Mz) are determined by Gel Permeation Chromatography (GPC) as described below. In at least some embodiments, the polymer produced is a tactic polymer, such as an isotactic polymer. The copolymers produced herein may have at least about 20% (for example at least about 30%, for example at least about 40%) isotactic pentads. A polymer is "isotactic" if it has 10% or more isotactic pentads (alternately 20% or more, alternately 30% or more, for example 40% or more isotactic pentads). A polyolefin is "atactic," also referred to as "amorphous" if it has less than about 10% isotactic pentads and syndiotactic pentads. For example, the copolymers produced herein have less than 10% isotactic pentads.

Since bimodal EPDM rubbers comprising ethylene, alpha-olefin, and diene terpolymers have more propylene and a higher Tg, it is desirable to have greater than about 40 wt % ethylene in the high MW components in Bimodal Rubbers for lower Tg and better elasticity. Such compositions allow for high elasticity, toughness, and processability.

The thus-produced polymers have a wide range of uses. In one or more embodiments, the Bimodal Rubber is mixed with Polypropylene Random Copolymer (RCP) to thereby produce pellet-stable Bimodal Rubbers, which then can be used for a variety of purposes, including but not limited to the production of TPVs.

Polypropylene Random Copolymer ("RCP")

This disclosure also pertains to the production of new random isotactic polypropylene copolymer ("RCP").

Catalysts for Producing Polypropylene Random Copolymer (RCP)

In one or more embodiments, metallocene catalyst compounds useful for producing such RCP's include those which can be contacted with olefins and are represented by the formula:

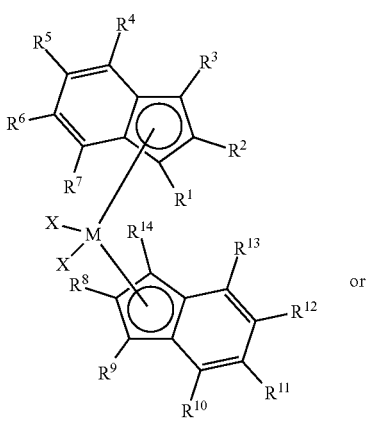

or

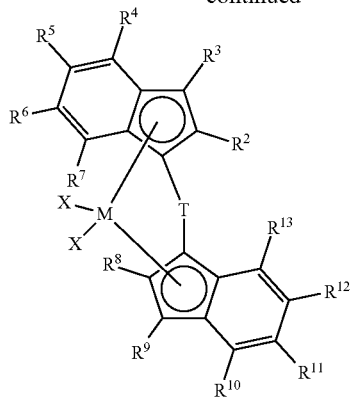

-continued wherein, $R^2$ and $R^8$ are may be the same or different and each is, independently a C1 to C20 linear alkyl group, for example at least one of $R^2$ and $R^8$ has at least 4 carbon atoms, for example at least 6 carbon atoms, and for example $R^2$ and $R^8$ have no branches at the alpha or beta-positions; $R^4$ and $R^{10}$ are substituted or unsubstituted aryl groups (such as substituted or unsubstituted phenyl groups, for example substituted phenyl groups), provided that at least one of the aryl groups is: 1) substituted at an othro-position with at least one group selected from $C_1$ to $C_{40}$ hydrocarbyls, heteroatoms, and heteroatom containing groups and/or 2) substituted at the 3', 4' or 5'-position with at least one group selected from $C_1$ to $C_{40}$ hydrocarbyls, heteroatoms, and heteroatom containing groups;

M is a group 2, 3 or 4 transition metal, for example group 4 transition metal;

T is a bridging group;

each X is an anionic leaving group; and each $R^1$, $R^3$, $R^5$, $R^6$, $R^7$, $R^9$, $R^{11}$, $R^{12}$, $R^{13}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents.

In an embodiment, $R^2$ may be a linear $C_1$-$C_{10}$ alkyl group, such as methyl, ethyl, n-propyl, n-butyl, n-pentyl, n-hexyl, n-heptyl, n-octyl, n-nonyl or n-decyl, which may be halogenated, for example with I, F, Cl or Br.

In an embodiment, $R^8$ is a linear $C_1$-$C_{10}$ alkyl group, for example methyl, ethyl, n-propyl, n-butyl, n-pentyl, n-hexyl, n-heptyl, n-octyl, n-nonyl or n-decyl, which may be halogenated, for example with I, F, Cl or Br.

In some embodiments of the disclosure, $R^2$ and $R^8$ are the same linear alkyl group, such as n-butyl, n-hexyl, etc. In alternate embodiments, $R^2$ and $R^8$ are different, such as $R^2$ is methyl and $R^8$ is n-butyl, n-pentyl, n-hexyl, n-heptyl, or n-octyl.

By "substituted phenyl group" is meant a phenyl is substituted with 1, 2, 3, 4, or 5 $C_1$ to $C_{20}$ substituted or unsubstituted hydrocarbyl groups, such as methyl, ethyl, propyl, butyl, pentyl, hexyl, heptyl, octyl, nonyl, decyl, undecyl, dodecyl, phenyl, substituted phenyl, biphenyl or an isomer thereof. In useful embodiments, the phenyl group is substituted at the meta or para-positions, for example the 3'- and/or 5'-positions, for example with $C_4$ to $C_{12}$ alkyl groups. Alternately, the phenyl group may be substituted at the 2'-position, but is for example not substituted in the 2'- and 6'-positions, e.g., in one or more embodiments of the disclosure when the 2'-position of the phenyl is substituted, the 6'-position is H. Alternately, the phenyl group may be substituted at the 4'-position, with a group of the formula (XR'n)—, wherein X is a Group 14, 15, 16, or 17 heteroatom and R' is one of a hydrogen atom, halogen atom, a $C_1$-$C_{10}$ alkyl group, or a $C_6$-$C_{10}$ aryl group and n is 0, 1, 2, or 3; for example —NR'$_2$, —SR', —OR', —OSiR'$_3$, —SiR'$_3$, or —PR'$_2$; and, optionally, one or more of the remaining positions on the phenyl are substituted, such as the 2', 3' and or 5'-positions.

In another aspect the 4'-position on the aryl group is not a $C_4$ group, alternately is not a hydrocarbyl group.

In another aspect, $R^4$ and $R^{10}$ are independently substituted phenyl groups, for example phenyl groups substituted with $C_1$ to a $C_{10}$ alkyl groups (such as t-butyl, sec-butyl, n-butyl, isopropyl, n-propyl, cyclopropyl, cyclobutyl, cyclopentyl, cyclohexyl, cycloheptyl, cyclooctyl, phenyl, mesityl, or adamantyl), or an aryl group which may be further substituted with an aryl group, and the two aryl groups bound together can be joined together directly or by linker groups, wherein the linker group is an alkyl, vinyl, phenyl, alkynyl, silyl, germyl, amine, ammonium, phosphine, phosphonium, ether, thioether, borane, borate, alane, or aluminate groups.

In another aspect, at least one of $R^4$ and $R^{10}$ is (or, optionally, both are) a phenyl group substituted at the 3' and 5'-position.

In another aspect, at least one of $R^4$ and $R^{10}$ is (or, optionally, both are) a phenyl group substituted at the 2'-position with an alkyl or an aryl group, such as a phenyl group.

In another aspect, at least one of $R^4$ and $R^{10}$ is (or, optionally, both are) a phenyl group substituted at the 3' and 5'-position and at least one of $R^4$ and $R^{10}$ is a phenyl group substituted at the 2'-position with an alkyl group or an aryl group, such as a phenyl group.

In yet another aspect, at least one of $R^4$ and $R^{10}$ is (or, optionally, both are) a phenyl group substituted at the 3' and 5'-positions with $C_1$ to a $C_{10}$ alkyl groups, such as a tertiary butyl group.

In yet another aspect, at least one of $R^4$ and $R^{10}$ is a phenyl group substituted at the 3' and 5'-positions with $C_1$ to a $C_{10}$ alkyl groups, such as a tertiary butyl group and at least one of $R^4$ and $R^{10}$ is a phenyl group substituted at the 2'-position with an alkyl or an aryl group, such as a phenyl group.

In yet another aspect, at least one of $R^4$ and $R^{10}$ is a phenyl group substituted at the 3' and 5'-positions with $C_1$ to a $C_{10}$ alkyl groups, such as a tertiary butyl group and at the 4'-position with (XR'$_n$)—, wherein X is a Group 14, 15, 16 or 17 heteroatom having an atomic weight of 13 to 79, R' is one of a hydrogen atom, halogen atom, a $C_1$-$C_{10}$ alkyl group, or a $C_6$-$C_{10}$ aryl group, and n is 0, 1, 2, or 3, such as methoxy, and at least one of $R^4$ and $R^{10}$ is a phenyl group substituted at the 2'-position with an alkyl or an aryl group, such as a phenyl group.

In yet another aspect, both $R^4$ and $R^{10}$ are a phenyl group substituted at the 3' and 5'-positions with $C_1$ to a $C_{10}$ alkyl groups, such as a tertiary butyl group.

In still another aspect, at least one of $R^4$ and $R^{10}$ is a phenyl group substituted at the 3' and 5'-positions with aryl groups, such as substituted or unsubstituted phenyl groups.

In still another aspect, both $R^4$ and $R^{10}$ are a phenyl group substituted at the 3' and 5'-positions with aryl groups, such as substituted or unsubstituted phenyl groups.

In another aspect, at least one of $R^4$ and $R^{10}$ is an aryl group substituted at 3' and 5'-positions with $C_1$ to a $C_{10}$ alkyl groups (such as t-butyl, sec-butyl, n-butyl, isopropyl, n-propyl, cyclopropyl, cyclobutyl, cyclopentyl, cyclohexyl, cycloheptyl, cyclooctyl, phenyl, mesityl, or adamantyl) or aryl groups and combinations thereof, wherein, when $R^4$ or $R^{10}$ is a phenyl group which is further substituted with an aryl group, the two groups bound together can be joined together directly or by linker groups, wherein the linker group is an alkyl, vinyl, phenyl, alkynyl, silyl, germyl, amine, ammonium, phosphine, phosphonium, ether, thioether, borane, borate, alane or aluminate groups.

Alternately, when at least one of $R^4$ and $R^{10}$ is a phenyl group substituted at 3' and 5' positions, the phenyl group may also be substituted at the 4'-position, for example with a substituent is selected from (XR'$_n$)—, wherein X is a Group 14, 15, 16 or 17 heteroatom having an atomic weight of 13 to 79 (for example N, O, S, P, or Si) and R' is one of a hydrogen atom, halogen atom, a $C_1$-$C_{10}$ alkyl group (such as methyl, ethyl, propyl, butyl, pentyl, hexyl, octyl, nonyl, decyl or an isomer thereof), or a $C_6$-$C_{10}$ aryl group and n is 0, 1, 2, or 3; for example (XR'$_n$)— is —NR'$_2$, —SR', —OR', —OSiR'$_3$, —SiR'$_3$, or —PR'$_2$, for example (XR'$_n$)— is —NR'$_2$, —SR', —OR', —OSiR'$_3$, or —PR'$_2$, for example (XR'$_n$)— is —SR', —OR', or —OSiR'$_3$, for example (XR'$_n$)— is —NR'$_2$ or —PR'$_2$, or for example (XR'$_n$)— is —OR'm, for example where R' is a $C_1$-$C_{10}$ alkyl group, particularly a methoxy, ethoxy, n-propoxy, isopropoxy, n-butoxy, iso-butoxy, sec-butoxy, or t-butoxy group, most particularly methoxy.

In yet another aspect, M is Hf, Ti and/or Zr, particularly Hf and/or Zr, particularly Zr.

Suitable radicals for the each of the groups $R^1$, $R^3$, $R^5$, $R^6$, $R^7$, $R^9$, $R^{11}$, $R^{12}$, $R^{13}$, and $R^{14}$ are independently selected from hydrogen or hydrocarbyl radicals including methyl, ethyl, ethenyl, and all isomers (including cyclics such as cyclohexyl) of propyl, butyl, pentyl, hexyl, heptyl, octyl, nonyl, decyl, undecyl, dodecyl, propenyl, butenyl, and from halocarbyls and all isomers of halocarbyls including perfluoropropyl, perfluorobutyl, perfluoroethyl, perfluoromethyl, and from substituted hydrocarbyl radicals and all isomers of substituted hydrocarbyl radicals including trimethylsilylpropyl, trimethylsilylmethyl, trimethylsilylethyl, and from phenyl, and all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like; from all isomers of halo substituted phenyl (where halo is, independently, fluoro, chloro, bromo and iodo) including halophenyl, dihalophenyl, trihalophenyl, tetrahalophenyl, and pentahalophenyl; and from all isomers of halo substituted hydrocarbyl substituted phenyl (where halo is, independently, fluoro, chloro, bromo and iodo) including halomethylphenyl, dihalomethylphenyl, (trifluoromethyl)phenyl, bis(trifluoromethyl)phenyl; and from all isomers of benzyl, and all isomers of hydrocarbyl substituted benzyl including methylbenzyl, dimethylbenzyl.

In other embodiments of the disclosure, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof (two X's may form a part of a fused ring or a ring system).

Suitable examples for X include chloride, bromide, fluoride, iodide, hydride, and $C_1$ to $C_{20}$ hydrocarbyls, for example methyl, ethyl, propyl, butyl, pentyl, hexyl, phenyl, benzyl, and all isomers thereof, or two X together are selected from $C_4$ to $C_{10}$ dienes, for example butadiene, methylbutadiene, pentadiene, methylpentadiene, dimethyl-pentadiene, hexadiene, methylhexadiene, dimethylhexadiene, or from $C_1$ to $C_{10}$ alkylidenes, for example methylidene, ethylidene, propylidene, or from $C_3$ to $C_{10}$ alkyldiyls, for example propandiyl, butandiyl, pentandiyl, and hexandiyl. In particular, X is chloride or methyl.

In any embodiment, T is a bridging group selected from R'$_2$C, R'$_2$Si, R'$_2$Ge, R'$_2$CCR'$_2$, R'$_2$CCR'$_2$CR'$_2$, R'C=CR', R'C=CR'CR'$_2$, R'$_2$CSiR'$_2$, R'$_2$SiSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'N, R'$_2$C—NR', R'$_2$C—NR'—CR'$_2$, R'P, R'$_2$C—PR', and R'$_2$C—PR'—CR'$_2$ where R' is, independently, hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent.

Suitable examples for the bridging group T include dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene.

In particular, T may be $CH_2$, $CH_2CH_2$, $C(CH_3)_2$, $SiMe_2$, $SiPh_2$, $SiMePh$, $Si(CH_2)_3$, $Si(CH_2)_4$, $Si(Me_3SiPh)_2$, or $Si(CH_2)_5$. In another embodiment, T is represented by the formula R2aJ, where J is C, Si, or Ge, and each Ra is, independently, hydrogen, halogen, $C_1$ to $C_{20}$ hydrocarbyl or a $C_1$ to $C_{20}$ substituted hydrocarbyl, and two Ra can form a cyclic structure including aromatic, partially saturated, or saturated cyclic or fused ring system.

In one or more embodiments of the disclosure in any formula described herein, T is represented by the formula, (R*2G)g, where each G is C, Si, or Ge, g is 1 or 2, and each R* is, independently, hydrogen, halogen, $C_1$ to $C_{20}$ hydrocarbyl or a $C_1$ to $C_{20}$ substituted hydrocarbyl, and two or more R* can form a cyclic structure including aromatic, partially saturated, or saturated cyclic or fused ring system.

In aspects of the disclosure, the rac/meso ratio in a mixture of racemic and meso isomeric forms of the metallocene catalyst is 50:1 or greater, or 40:1 or greater, or 30:1 or greater, or 20:1 or greater, or 15:1 or greater, or 10:1 or greater, or 7:1 or greater, or 5:1 or greater.

In an embodiment of the disclosure, the metallocene catalyst comprises greater than 55 mol % of the racemic isomer, or greater than 60 mol % of the racemic isomer, or greater than 65 mol % of the racemic isomer, or greater than 70 mol % of the racemic isomer, or greater than 75 mol % of the racemic isomer, or greater than 80 mol % of the racemic isomer, or greater than 85 mol % of the racemic isomer, or greater than 90 mol % of the racemic isomer, or greater than 92 mol % of the racemic isomer, or greater than 95 mol % of the racemic isomer, or greater than 98 mol % of the racemic isomer, based on the total amount of the racemic and meso isomer-if any, formed. In a particular embodiment of the disclosure, the metallocene, especially the bridged bis(indenyl)metallocene, compound consists essentially of the racemic isomer.

Amounts of rac and meso isomers are determined by proton NMR. 1H NMR data are collected at 23° C. in a 5 mm probe using a 400 MHz Bruker spectrometer with deuterated methylene chloride or deuterated benzene. Data is recorded using a maximum pulse width of 45°, 8 seconds between pulses and signal averaging 16 transients. The spectrum is normalized to protonated methylene chloride in the deuterated methylene chloride, which is expected to show a peak at 5.32 ppm.

In one or more embodiments in any of the processes described herein one catalyst compound is used, e.g., the catalyst compounds are not different. For purposes of this disclosure one metallocene catalyst compound is considered different from another if they differ by at least one atom. For example, "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes if this disclosure, e.g., rac-dimethylsilylbis(2-methyl 4-phenyl)hafnium dimethyl is considered to be the same as meso-dimethylsilylbis(2-methyl 4-phenyl)hafnium dimethyl.

In some embodiments, two or more different catalyst compounds are present in the catalyst system used herein. In some embodiments, two or more different catalyst compounds are present in the reaction zone where the process(es) described herein occur. When two transition metal compound based catalysts are used in one reactor as a mixed catalyst system, the two transition metal compounds should be chosen such that the two are compatible. A simple screening method such as by $^1H$ or $^{13}C$ NMR, known to those of ordinary skill in the art, can be used to determine which transition metal compounds are compatible. In embodiments, the same activator is used for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane is typically contacted with the transition metal compounds prior to addition of the non-coordinating anion activator.

The transition metal compounds (pre-catalysts) may be used in any ratio. For example molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

In one or more embodiments, T is dialkylsilyl, $R^2$ is methyl, $R^8$ is butyl, and $R^5$ and $R^6$ are joined to form a non-aromatic ring containing 5 or 6 or 7 atoms.

In one or more embodiments, M is zirconium, T is dialkylsilyl, $R^2$ is methyl, and $R^5$ and $R^6$ are joined to form a ring containing 5 or 6 or 7 atoms.

In one or more embodiments, T is dialkylsilyl, $R^2$ is methyl, $R^8$ is an unbranched alkyl group containing 2 to 14 carbons, and $R^5$ and $R^6$ are joined to form a ring containing 5 or 6 or 7 atoms.

In one or more embodiments, M is zirconium, T is dialkylsilyl, $R^2$ is methyl, $R^8$ is an unbranched alkyl group containing 2 to 14 carbons, and $R^5$ and $R^6$ are joined to form a ring containing 5 or 6 or 7 atoms.

Examples of some useful catalyst compounds herein include: $Me_2Si(4-oPh_2-2-nC_6-Ind)(2-Me-4-(3',5'-tBu_2-4'-OMe-Ph)-Ind)ZrCl_2$; Me2Si(4-oPh2-2-nBu-Ind)(2-Me-4-(3',5'-tBu$_2$-4'-OMe-Ph)-Ind)ZrCl$_2$; Me2Si(4-oPh2-2-nC5-Ind)(2-Me-4-(3',5'-tBu$_2$-4'-OMe-Ph)-Ind)ZrCl$_2$; $Me_2Si(4-oPh_2-2-nC_7-Ind)(2-Me-4-(3',5'-tBu_2-4'-OMe-Ph)-Ind)ZrCl_2$; $Me_2Si(4-oPh_2-2-nC_8-Ind)(2-Me-4-(3',5'-tBu_2-4'-OMe-Ph)-Ind)ZrCl_2$; $Me_2Si(4-oPh_2-2-nC_9-Ind)(2-Me-4-(3',5'-tBu_2-4'-OMe-Ph)-Ind)ZrCl_2$; $Me_2Si(4-oPh_2-2-nC_{10}-Ind)(2-Me-4-(3',5'-tBu_2-4'-OMe-Ph)-Ind)ZrCl_2$; $Me_2Si(4-oPh_2-2-nC_6-Ind)(2-Me-4-(3',5'-tBu_2Ph)-Ind)ZrCl_2$; $Me_2Si(4-oPh2-2-nBu-Ind)(2-Me-4-(3',5'-tBu_2Ph)-Ind)ZrCl_2$; Me2Si(4-oPh2-2-nC5-Ind)(2-Me-4-(3',5'-tBu$_2$Ph)-Ind)ZrCl$_2$; $Me_2Si(4-oPh_2-2-nC_7-Ind)(2-Me-4-(3',5'-tBu_2Ph)-Ind)ZrCl_2$; $Me_2Si(4-oPh_2-2-nC_8-Ind)(2-Me-4-(3',5'-tBu_2Ph)-Ind)ZrCl_2$; $Me_2Si(4-oPh_2-2-nC_9-Ind)(2-Me-4-(3',5'-tBu_2Ph)-Ind)ZrCl_2$; $Me_2Si(4-oPh_2-2-nC_{10}-Ind)(2-Me-4-(3',5'-tBu_2Ph)-Ind)ZrCl_2$; $Me_2Si(4-oPh_{2-2}-nC_6-Ind)(2-Me-4-(3',5'-tBu_2-4'-OMe-Ph)-Ind)ZrCl_2$; Me2Si(4-oPh2-2-nBu-Ind)(2-Me-4-(3',5'-tBu$_2$-4'-OMe-Ph)-Ind)ZrCl$_2$; Me2Si(4-oPh2-2-nC5-Ind)(2-Me-4-(3',5'-tBu$_2$-4'-OMe-Ph)-Ind)ZrCl$_2$; $Me_2Si(4-oPh_2-2-nC_7-Ind)(2-Me-4-(3',5'-tBu_2-4'-OMe-Ph)-Ind)ZrCl_2$; $Ph_2Si(4-oPh_2-2-nC_8-Ind)(2-Me-4-(3',5'-tBu_2-4'-OMe-Ph)-Ind)ZrCl_2$; $Me_2Si(4-oPh_2-2-nC_9-Ind)(2-Me-4-(3',5'-tBu_2-4'-OMe-Ph)-Ind)ZrCl_2$; $Me_2Si(4-oPh_2-2-nC_{10}-Ind)(2-Me-4-(3',5'-tBu_2-4'-OMe-Ph)-Ind)ZrCl_2$; $Me_2Si(4-oPh_2-2-nC_6-Ind)(2-Me-4-(3',5'-tBu_2Ph)-Ind)ZrCl_2$; Me2Si(4-oPh2-2-nBu-Ind)(2-Me-4-(3',5'-tBu$_2$Ph)-Ind)ZrCl$_2$; Me2Si(4-oPh2-2-nC5-Ind)(2-Me-4-(3',5'-tBu$_2$Ph)-Ind)ZrCl$_2$; $Me_2Si(4-oPh_{2-2}-nC_7-Ind)(2-Me-4-(3',5-tBu_2Ph)-Ind)ZrCl_2$; $Me_2Si(4-oPh_2-2-nC_8-Ind)(2-Me-4-(3,5'-tBu_2Ph)-Ind)ZrCl_2$; $Me_2Si(4-oPh_2-2-nC_9-Ind)(2-Me-4-(3',5'-tBu_2Ph)-Ind)ZrCl_2$; $Me_2Si(4-oPh_2-2-nC_{10}-Ind)(2-Me-4-(3',5'-tBu_2Ph)-Ind)ZrCl_2$; $Me_2Si(4-oPh_2-2-nC_6-Ind)(2-Et-4-(3',5'-tBu_2-4'-OMe-Ph)-Ind)ZrCl_2$; Me2Si(4-oPh2-2-nBu-Ind)(2-Et-4-(3,5'-tBu$_2$-4'-OMe-Ph)-Ind)ZrCl$_2$; Me2Si(4-oPh2-2-nC5-Ind)(2-Et-4-(3,5'-tBu$_2$-4'-OMe-Ph)-Ind)ZrCl$_2$; $Me_2Si(4-oPh_2-2-nC_7-Ind)(2-Et-4-(3',5'-tBu_2-4'-OMe-Ph)-Ind)ZrCl_2$; $Me_2Si(4-oPh_2-2-nC_8-Ind)(2-Et-4-(3',5'-tBu_2-4'-OMe-Ph)-Ind)ZrCl_2$; $Me_2Si(4-oPh_2-2-nC_9-Ind)(2-Et-4-(3',5'-tBu_2-4'-OMe-Ph)-Ind)ZrCl_2$; Me2Si(4-oPh$_2$-2-nC$_{10}$-Ind)(2-Et-4-(3',5'-tBu$_2$-4'-OMe-Ph)-Ind)ZrCl$_2$; $Me_2Si(4-oPh_2-2-nC_6-Ind)(2-Et-4-(3',5'-tBu_2Ph)-Ind)ZrCl_2$; Me2Si(4-oPh$_2$-2-nBu-Ind)(2-Et-4-(3',5'-tBu$_2$Ph)-Ind)ZrCl$_2$; Me2Si(4-oPh$_2$-2-nC$_{10}$-Ind)(2-Et-4-(3',5'-tBu$_2$Ph)-Ind)ZrCl$_2$; $Me_2Si(4-oPh_2-2-nC_6-Ind)(2-Et-4-(3',5'-tBu_2-4'-OMe-Ph)-Ind)ZrCl_2$; Me2Si(4-oPh$_2$-2-nBu-Ind)(2-t-4-(3',5'-tBu$_2$-4'-OMe-Ph)-Ind)ZrCl$_2$; Me2Si(4-oPh$_2$-2-nC5-Ind)(2-Et-4-(3',5'-tBu$_2$-4'-OMe-Ph)-Ind)ZrCl$_2$; $Me_2Si(4-oPh_2-2-nC_7-Ind)(2-Et-4-(3',5'-tBu_2-4'-OMe-Ph)-Ind)ZrCl_2$; $Me_2Si(4-oPh_2-2-nC_8-Ind)(2-Et-4-(3',5'-tBu_2-4'-OMe-Ph)-Ind)ZrCl_2$; $Me_2Si(4-oPh_2-2-nC_9-Ind)(2-Et-4-(3',5'-tBu_2-4'-OMe-Ph)-Ind)ZrCl_2$; $Me_2Si(4-oPh_2-2-nC_{10}-Ind)(2-Et-4-(3',5'-tBu_2-4'-OMe-Ph)-Ind)ZrCl_2$; $Me_2Si(4-oPh_2-2-nC_6-Ind)(2-Et-4-(3',5'-tBu_2Ph)-Ind)ZrCl_2$; $Me_2Si(4-oPh_2-2-nC_8-Ind)(2-Et-4-(3,5'-tBu_2Ph)-Ind)ZrCl_2$; $Me_2Si(4-oPh_2-2-nC_9-Ind)(2-Et-4-(3',5'-tBu_2Ph)-Ind)ZrCl_2$; $Me_2Si(4-oPh_2-2-nC_7-Ind)(2-Et-4-(3,5'-tBu_2Ph)-Ind)ZrCl_2$; $Me_2Si(4-oPh_2-2-nC_8-Ind)(2-Et-4-(3',5'-tBu_2Ph)-Ind)ZrCl_2$; $Me_2Si(4-oPh_2-2-nC_9-Ind)(2-Et-4-(3',5'-tBu_2Ph)-Ind)ZrCl_2$; $Me_2Si(4-oPh_2-2-nC_{10}-Ind)(2-Et-4-(3',5'-tBu_2Ph)-Ind)ZrCl_2$; $Me_2Si(4-oPh_2-2-nC_6-Ind)(2-nPr-4-(3',5'-tBu_2-4'-OMe-Ph)-Ind)ZrCl_2$; Me2Si(4-oPh2-2-nBu-Ind)(2-nPr-4-(3',5'-tBu$_2$-4'-OMe-Ph)-Ind)ZrCl$_2$; Me2Si(4-oPh2-2-nC5-Ind)(2-Et-4-(3',5'-tBu$_2$-4'-OMe-Ph)-Ind)ZrCl$_2$; $Me_2Si(4-oPh_2-2-nC_7-Ind)(2-Et-4-(3,5'-tBu_2-4'-OMe-Ph)-Ind)ZrCl_2$; $Me_2Si(4-oPh_2-2-nC_8-Ind)(2-Et-4-(3',5'-tBu_2-4'-OMe-Ph)-Ind)ZrCl_2$; $Me_2Si(4-oPh_2-2-nC_9-Ind)(2-Et-4-(3',5'-tBu_2-4'-OMe-Ph)-Ind)ZrCl_2$; $Me_2Si(4-oPh_2-2-nC_{10}-Ind)(2-Et-4-(3',5'-tBu_2-4'-OMe-Ph)-Ind)ZrCl_2$; $Me_2Si(4-oPh_2-2-nC_6-Ind)(2-Et-4-(3',5'-tBu_2Ph)-Ind)ZrCl_2$; Me2Si(4-oPh2-2-nBu-Ind)(2-Et-4-(3',5'-tBu$_2$Ph)-Ind)ZrCl$_2$; Me2Si(4-oPh$_2$-2-nC5-Ind)(2-Et-4-(3,5'-tBu$_2$Ph)-Ind)ZrCl$_2$; $Me_2Si(4-oPh_2-2-nC_7-Ind)(2-Et-4-(3',5'-tBu_2Ph)-Ind)ZrCl_2$; $Me_2Si(4-oPh_2-2-nC_8-Ind)(2-Et-4-(3,5'-tBu_2Ph)-Ind)ZrCl_2$; $Me_2Si(4-oPh_2-2-nC_9-Ind)(2-Et-4-(3',5'-tBu_2Ph)-Ind)ZrCl_2$; $Me_2Si(4-oPh_2-2-nC_{10}-Ind)(2-Et-4-(3',5'-tBu_2Ph)-Ind)ZrCl_2$; $Me_2Si(4-oPh_2-2-nC_6-Ind)(2-Et-4-(3',5'-tBu_2-4'-OMe-Ph)-Ind)ZrCl_2$; Me2Si(4-oPh2-2-nBu-Ind)(2-t-4-(3',5'-tBu$_2$-4'-OMe-Ph)-Ind)ZrCl$_2$; Me2Si(4-oPh2-2-nC5-Ind)(2-Et-4-(3',5'-tBu$_2$-4'-OMe-Ph)-Ind)ZrCl$_2$; $Me_2Si(4-oPh_2-2-nC_7-Ind)(2-Et-4-(3',5'-tBu_2-4'-OMe-Ph)-Ind)ZrCl_2$; $Me_2Si(4-oPh_2-2-nC_8-Ind)(2-Et-4-(3',5'-tBu_2-4'-OMe-Ph)-Ind)ZrCl_2$; $Me_2Si(4-oPh_2-2-nC_9-Ind)(2-n-propyl-4-(3',5'-tBu_2-4'-OMe-Ph)-Ind)ZrCl_2$; $Me_2Si(4-oPh_2-2-nC_{10}-Ind)(2-nC3-4-(3',5'-tBu_2-4'-OMe-Ph)-Ind)ZrCl_2$; $Me_2Si(4-oPh_2-2-nC_6-Ind)(2-nC3-4-(3',5-tBu_2Ph)-Ind)ZrCl_2$; Me2Si(4-oPh2-2-nBu-Ind)(2-nPr-4-(3',5'-tBu$_2$Ph)-Ind)ZrCl$_2$; Me2Si(4-oPh2-2-nC5-Ind)(2-nPr-4-(3',5'-tBu$_2$Ph)-Ind)ZrCl$_2$; $Me_2Si(4-oPh_2-2-nC_7-Ind)(2-n-propyl-4-(3',5'-tBu_2Ph)-Ind)ZrCl_2$; Me2Si(4-oPh2-2-nC8-Ind)(2-n-propyl-4-(3',5'-tBu$_2$Ph)-Ind)ZrCl$_2$; $Me_2Si(4-oPh_2-2-nC_9-Ind)(2-nC3-4-(3',5'-tBu_2Ph)-Ind)ZrCl_2$; $Me_2Si(4-oPh_2-2-nC_{10}-Ind)(2-n-propyl-4-(3',5'-tBu_2Ph)-Ind)ZrCl_2$; $Me_2Si(4-oPh_2-2-nC_6-Ind)_2ZrCl_2$; Me2Si(4-oPh2-2-nC5-Ind)$_2$ZrCl$_2$; $Me_2Si(4-oPh_2-2-nBu-Ind)_2ZrCl_2$; $Me_2Si(4-oPh_2-2-nC_7-Ind)_2ZrCl_2$; $Me_2Si_2(4-oPh_2-2-nC_8-Ind)_2ZrCl_2$; $Me_2Si(4-oPh_2-2-nC_9-Ind)_2ZrCl_2$; $Me_2Si(4-oPh_2-2-nC_{10}-Ind)_2ZrCl_2$; $Me_2Si(2-nBu-4-(3',5'-tBu_2-4'-OMe-Ph)-Ind)_2ZrCl_2$; $Me_2Si(2-nC_{5-4}-(3',5'-tBu_2-4'-OMe-Ph)-Ind)_2ZrCl_2$; $Me_2Si_2(2-n-hexyl-4-(3',5'-tBu_{2-4}-4'-OMe-Ph)-Ind)_2ZrCl_2$; $Me_2Si(2-nC_{7-4}-(3',5-tBu_2-4'-OMe-Ph)-Ind)_2ZrCl_2$; $Me_2Si(2-nC_8-4-(3',5'-tBu_2-4'-OMe-Ph)-Ind)_2ZrCl_2$; $Me_2Si(2-nC_9-4-(3',5'-tBu_2-4'-OMe-Ph)-Ind)_2ZrCl_2$; $Me_2Si(2-nC_{10}-4-(3',5'-tBu_2-4'-OMe-Ph)-Ind)_2ZrCl_2$; $Me_2Si(2-nBu-4-(3',5'-tBu_2Ph)-Ind)_2ZrCl_2$; $Me_2Si(2-nC_5-4-(3',5'-tBu_2Ph)-Ind)_2ZrCl_2$; $Me_2Si(2-n-hexyl-4-(3',5'-tBu_2Ph)-Ind)_2ZrCl_2$; $Me_2Si(2-nC_{7-4}-(3',5'-tBu_2Ph)-Ind)_2ZrCl_2$; $Me_2Si(2-nC_8-4-(3',5'-tBu_2Ph)-Ind)_2ZrCl_2$; $Me_2Si(2-nC_9-4-(3',5'-tBu_2Ph)-Ind)_2ZrCl_2$; $Me_2Si(2-nC_{10}-4-(3',5-tBu_2Ph)-Ind)_2ZrCl_2$; $Me_2Si(2-Me-4-$ (3,5'-tBu$_2$-4'-OMe-Ph)-Ind)(2-nBu-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-nC$_5$-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-n-hexyl-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-nC$_7$-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-nC$_8$-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-nC$_9$-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-nC$_{10}$-4-(3',5'-tBu$_2$-4'-OMe-Ph)-Ind)ZrCl$_2$; Me$_2$Si(2-Me-4-(3',5'-tBu$_2$Ph)-Ind)(2-nBu-4-(3',5'-tBu$_2$Ph)-Ind)ZrCl$_2$; Me$_2$Si(2-Me-4-(3',5'-tBu$_2$Ph)-Ind)(2-nC$_5$-4-(3',5'-tBu$_2$Ph)-Ind)ZrCl$_2$; Me$_2$Si(2-Me-4-(3',5'-tBu$_2$Ph)-Ind)(2-n-hexyl-4-(3',5'-tBu$_2$Ph)-Ind)ZrCl$_2$; Me$_2$Si(2-Me-4-(3',5'-tBu$_2$Ph)-Ind)(2-nC$_7$-4-(3',5'-tBu$_2$Ph)-Ind)ZrCl$_2$; Me$_2$Si(2-Me-4-(3',5'-tBu$_2$Ph)-Ind)(2-nC$_8$-4-(3',5'-tBu$_2$Ph)-Ind)ZrCl$_2$; Me$_2$Si(2-Me-4-(3',5'-tBu$_2$Ph)-Ind)(2-nC$_9$-4-(3',5'-tBu$_2$Ph)-Ind)ZrCl$_2$; Me$_2$Si(2-Me-4-(3',5'-tBu$_2$Ph)-Ind)(2-nC$_{10}$-4-(3',5'-tBu$_2$Ph)-Ind)ZrCl$_2$; Me$_2$Si(4-oPh$_2$-2-Me-Ind)(4-oPh$_2$-2-nBu-Ind)ZrCl$_2$; Me$_2$Si(4-oPh$_2$-2-Me-Ind)(4-oPh$_2$-2-nC$_5$-Ind)ZrCl$_2$; Me$_2$Si(4-oPh$_2$-2-Me-Ind)(4-oPh$_2$-2-nC$_6$-Ind)ZrCl$_2$; Me$_2$Si(4-oPh$_2$-2-Me-Ind)(4-oPh$_2$-2-nC$_7$-Ind)ZrCl$_2$; Me$_2$Si(4-oPh$_2$-2-Me-Ind)(4-oPh$_2$-2-nC$_5$-Ind)ZrCl$_2$; Me$_2$Si(4-oPh$_2$-2-Me-Ind)(4-oPh$_2$-2-nC$_9$-Ind)ZrCl$_2$; Me$_2$Si(4-oPh$_2$-2-Me-Ind)(4-oPh$_2$-2-nC$_{10}$-Ind)ZrCl$_2$; Me$_2$Si(4-oPh$_2$-2-Et-Ind)(4-oPh$_2$-2-nBu-Ind)ZrCl$_2$; Me$_2$Si(4-oPh$_2$-2-Et-Ind)(4-oPh$_2$-2-nC$_5$-Ind)ZrCl$_2$; Me$_2$Si(4-oPh$_2$-2-Et-Ind)(4-oPh$_2$-2-nC$_6$-Ind)ZrCl$_2$; Me$_2$Si(4-oPh$_2$-2-Et-Ind)(4-oPh$_2$-2-nC$_7$-Ind)ZrCl$_2$; Me$_2$Si(4-oPh$_2$-2-Et-Ind)(4-oPh$_2$-2-nC$_8$-Ind)ZrCl$_2$; Me$_2$Si(4-oPh$_2$-2-Et-Ind)(4-oPh$_2$-2-nC$_9$-Ind)ZrCl$_2$; Me$_2$Si(4-oPh$_2$-2-Et-Ind)(4-oPh$_2$-2-nC$_{10}$-Ind)ZrCl$_2$; Me$_2$Si(4-oPh$_2$-2-n-propyl-Ind)(4-oPh$_2$-2-nBu-Ind)ZrCl$_2$; Me$_2$Si(4-oPh$_2$-2-n-propyl-Ind)(4-oPh$_2$-2-nC$_5$-Ind)ZrCl$_2$; Me$_2$Si(4-oPh$_2$-2-n-propyl-Ind)(4-oPh$_2$-2-nC$_6$-Ind)ZrCl$_2$; Me$_2$Si(4-oPh$_2$-2-n-propyl-Ind)(4-oPh$_2$-2-nC$_7$-Ind)ZrCl$_2$; Me$_2$Si(4-oPh$_2$-2-n-propyl-Ind)(4-oPh$_2$-2-nC$_8$-Ind)ZrCl$_2$; Me$_2$Si(4-oPh$_2$-2-nPr-Ind)(4-oPh$_2$-2-nC$_9$-Ind)ZrCl$_2$; Me2Si(4-oPh$_2$-2-nPr-Ind)(4-oPh$_2$-2-nC$_{10}$-Ind)ZrCl$_2$; Me$_2$Si(4-oPh$_2$-2-nC$_6$-Ind)2ZrCl$_2$; Me$_2$Si(4-oPh$_2$-2-nC$_5$-Ind)2ZrCl$_2$; Me$_2$Si(4-oPh$_2$-2-nBu-Ind)$_2$ZrCl$_2$; Me$_2$Si(4-oPh$_2$-2-nC$_7$-Ind)$_2$ZrCl$_2$; Me$_2$Si(4-oPh2-2-nC$_8$-Ind)$_2$ZrCl$_2$; Me$_2$Si(4-oPh$_2$-2-nC$_9$-Ind)$_2$ZrCl$_2$; Me$_2$Si(4-oPh$_2$-2-nC$_{10}$-Ind)$_2$ZrCl$_2$; Me2Si(4-oPh$_2$-2-nBu-Ind)(4-(3',5'-tBu$_2$-4'-OMePh)-2-Me-THI)ZrCl$_2$; dimethylsilyl (4-o-biphenyl-2-n-butyl indenyl) (4-(3',5'-di-tert-butyl-4'-methoxyphenyl)-2-methyl-1,5,6,7-tetrahydro-s-indacenyl) zirconium dimethyl; Me2Si(4-oPh$_2$-2-nC$_5$-Ind)(4-(3',5'-tBu$_2$-4'-OMePh)-2-Me-THI)ZrCl$_2$; Me2Si(4-oPh$_2$-2-nC$_6$-Ind)(4-(3',5'-tBu$_2$-4'-OMePh)-2-Me-THI)ZrCl$_2$; Me2Si(4-oPh$_2$-2-nC$_7$-Ind)(4-(3',5'-tBu$_2$-4'-OMePh)-2-Me-THI)ZrCl$_2$; Me$_2$Si(4-oPh$_2$-2-nC$_8$-Ind)(4-(3',5'-tBu$_2$-4'-OMePh)-2-Me-THI)ZrCl$_2$; Me2Si(4-oPh$_2$-2-nC$_9$-Ind)(4-(3',5'-tBu$_2$-4'-OMePh)-2-Me-THI)ZrCl$_2$; Me$_2$Si(4-oPh$_2$-2-nC$_{10}$-Ind)(4-(3',5'-tBu$_2$-4'-OMePh)-2-Me-THI)ZrCl$_2$; Me2Si(4-oPh$_2$-2-nBu-Ind)(4-(3',5'-tBu$_2$-4'-OMePh)-2-Me-THI)ZrCl$_2$; Me2Si(4-oPh$_2$-2-nC$_5$-Ind)(4-(3',5'-tBu$_2$-4'-OMePh)-2-Me-THI)ZrCl$_2$; Me$_2$Si(4-oPh$_2$-2-nC$_6$-Ind)(4-(3',5'-tBu$_2$-4'-OMePh)-2-Me-THI)ZrCl$_2$; Me$_2$Si(4-oPh$_2$-2-nC$_7$-Ind)(4-(3',5'-tBu$_2$-4'-OMePh)-2-Me-THI)ZrCl$_2$; Me$_2$Si(4-oPh$_2$-2-nC$_8$-Ind)(4-(3',5'-tBu$_2$-4'-OMePh)-2-Me-THI)ZrCl$_2$; Me$_2$Si(4-oPh$_2$-2-nC$_9$-Ind)(4-(3',5'-tBu$_2$-4'-OMePh)-2-Me-THI)ZrCl$_2$; Me$_2$Si(4-oPh$_2$-2-nBu-Ind)(4-(3',5'-tBu$_2$)-2-Me-THI)ZrCl$_2$; Me$_2$Si(4-oPh$_2$-2-nBu-Ind)(4-(3',5'-tBu$_2$)-2-Me-THI)ZrCl$_2$; Me2Si(4-oPh$_2$-2-nC5-Ind)(4-(3',5'-tBu$_2$)-2-Me-THI)ZrCl$_2$; Me$_2$Si(4-oPh$_2$-2-nC$_6$-Ind)(4-(3',5'-tBu$_2$)-2-Me-THI)ZrCl$_2$; Me$_2$Si(4-oPh$_2$-2-nC$_7$-Ind)(4-(3',5'-tBu$_2$)-2-Me-THI)ZrCl$_2$; Me$_2$Si(4-oPh$_2$-2-nC$_8$-Ind)(4-(3',5'-tBu$_2$)-2-Me-THI)ZrCl$_2$; Me$_2$Si(4-oPh$_2$-2-nC$_9$-Ind)(4-(3',5'-tBu$_2$)-2-Me-THI)ZrCl$_2$; Me2Si(4-oPh$_2$-2-nBu-Ind)(4-(3',5'-tBu$_2$-4'-OMePh)-2-Et-THI)ZrCl$_2$; Me2Si(4-oPh$_2$-2-nC$_5$-Ind)(4-(3',5'-tBu$_2$-4'-OMePh)-2-Et-THI)ZrCl$_2$; Me$_2$Si(4-oPh$_2$-2-nC$_6$-Ind)(4-(3',5'-tBu$_2$-4'-OMePh)-2-Et-THI)ZrCl$_2$; Me$_2$Si(4-oPh$_2$-2-nC$_7$-Ind)(4-(3',5'-tBu$_2$-4'-OMePh)-2-Et-THI)ZrCl$_2$; Me$_2$Si(4-oPh$_2$-2-nC$_8$-Ind)(4-(3',5'-tBu$_2$-4'-OMePh)-2-Et-THI)ZrCl$_2$; Me$_2$Si(4-oPh$_2$-2-nC$_9$-Ind)(4-(3',5'-tBu$_2$-4'-OMePh)-2-Et-THI)ZrCl$_2$; Me2Si(4-oPh$_2$-2-nBu-Ind)(4-(3',5'-tBu$_2$-4'-OMePh)-2-n-propyl-THI)ZrCl$_2$; Me2Si(4-oPh$_2$-2-nC$_5$-Ind)(4-(3',5'-tBu$_2$-4'-OMePh)-2-n-propyl-THI)ZrCl$_2$; Me$_2$Si(4-oPh$_2$-2-nC$_6$-Ind)(4-(3',5'-tBu$_2$-4'-OMePh)-2-n-propyl-THI)ZrCl$_2$; Me$_2$Si(4-oPh$_2$-2-nC$_7$-Ind)(4-(3',5'-tBu$_2$-4'-OMePh)-2-n-propyl-THI) ZrCl$_2$; Me$_2$Si(4-oPh$_2$-2-nC$_5$-Ind)(4-(3',5'-tBu$_2$-4'-OMePh)-2-n-propyl-THI)ZrCl$_2$; Me$_2$Si(4-oPh$_2$-2-nC$_9$-Ind)(4-(3',5'-tBu$_2$-4'-OMePh)-2-n-propyl-THI) ZrCl$_2$; Me$_2$Si(4-oPh$_2$-2-Me-Ind)(4-(3',5'-tBu$_2$-4'-OMePh)-2-nBu-THI) ZrCl$_2$; Me$_2$Si(4-oPh$_2$-2-Me-Ind)(4-(3',5'-tBu$_2$-4'-OMePh)-2-nC$_8$-THI) ZrCl$_2$; Me$_2$Si(4-oPh$_2$-2-Me-Ind)(4-(3',5'-tBu$_2$-4'-OMePh)-2-n-hexyl-THI) ZrCl$_2$; Me$_2$Si(4-oPh$_2$-2-Me-Ind)(4-(3',5'-tBu$_2$-4'-OMePh)-2-nC$_7$-THI)ZrCl$_2$; Me$_2$Si(4-oPh$_2$-2-Me-Ind)(4-(3',5'-tBu$_2$-4'-OMePh)-2-nC$_5$-THI)ZrCl$_2$; Me$_2$Si(4-oPh$_2$-2-Me-Ind)(4-(3',5'-tBu$_2$-4'-OMePh)-2-nC$_9$-THI)ZrCl$_2$; Me$_2$Si(4-oPh$_2$-2-Me-Ind)(4-(3',5'-tBu$_2$-4'-OMePh)-2-nC$_{10}$-THI) ZrCl$_2$; Me$_2$Si(4-oPh$_2$-2-nBu-Ind)(4-(3',5'-tBu$_2$-4'-OMePh)-2-nBu-THI) ZrCl$_2$; Me$_2$Si(4-oPh$_2$-2-nC$_5$-Ind)(4-(3',5'-tBu$_2$-4'-OMePh)-2-nC$_5$-THI)ZrCl$_2$; Me$_2$Si(4-oPh$_2$-2-n-hexyl-Ind)(4-(3',5'-tBu$_2$-4'-OMePh)-2-n-hexyl-THI)ZrCl$_2$; Me$_2$Si(4-oPh$_2$-2-nBu-Ind)(4-(3',5'-tBu$_2$-4'-OMePh)-2-nC$_7$-THI)ZrCl$_2$; and Me$_2$Si(4-oPh$_2$-2-n-hexyl-Ind)(4-(3',5'-tBu2-4'-OMePh)-2-nC$_{10}$-THI)ZrCl$_2$, where oPh2 is o-biphenyl, nC$_6$ is n-hexyl, t-Bu$_2$ and tBu$_2$ are di-tertiary butyl, nBu is n-butyl, OMe is methoxy, Ind is indenyl, Ph is phenyl, nC$_3$ and nPr are n-propyl, oPh2 is ortho-biphenyl, nC$_5$ is n-pentyl, nC$_7$ is n-heptyl, nC$_8$ is n-octyl, nC$_9$ is n-nonyl, nC$_{10}$ is n-decyl, Me is methyl, Et is ethyl, THI is 1,5,6,7-tetrahydro-s-indacenyl, and OMe-Ph and OMePh are methoxyphenyl. The hafnium analogs of the Zr compounds listed above are also useful as catalyst compounds herein.

Activators

In one or more embodiments, little or no alumoxane is used in the polymerization processes described herein. In one or more embodiments, alumoxane is present at zero mol %; alternately the alumoxane is present at a molar ratio of aluminum to catalyst compound transition metal less than 500:1, for example less than 300:1, for example less than 100:1, for example less than 1:1.

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this disclosure are those that are compatible, stabilize the transition metal cation in the sense of balancing its ionic charge at +1, and yet retain sufficient liability to permit displacement during polymerization.

It is within the scope of this disclosure to use an ionizing or stoichiometric activator, neutral or ionic, such as tri (n-butyl) ammonium tetrakis (pentafluorophenyl) borate, dimethylaniliniumtetrakis-(pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this disclosure to use neutral or ionic activators alone or in combination with alumoxane or modified alumoxane activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, aryl halides, alkoxy, and halides. For example, the three groups are independently selected from halogen, mono or multicyclic (including halo substituted) aryls, alkyls, and alkenyl compounds, and mixtures thereof, such as alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). In one or more embodiments, the three groups are alkyls having 1 to 4 carbon groups, phenyl, naphthyl, or mixtures thereof. In one or more embodiments, the three groups are halogenated, for example fluorinated, aryl groups. One example of a neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds, and the like, are described in European publications EP 0 570 982 A; EP 0 520 732 A; EP 0 495 375 A; EP 0 500 944 B1; EP 0 277 003 A; EP 0 277 004 A, for example; and U.S. publication, such as U.S. Pat. Nos. 5,153,157; 5,198,401; 5,066,741; 5,206,197; 5,241,025; 5,384,299; and 5,502,124, and U.S. Ser. No. 08/285,380, filed Aug. 3, 1994, for example; all of which are herein fully incorporated by reference.

Example compounds useful as an activator in the process of this disclosure comprise a cation, which is for example a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed, for example, in EP 0 277,003 A1, and EP 0 277,004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In one or more embodiments, the stoichiometric activators include a cation and an anion component, and in an example are represented by the following formula (II):

$$(Z)_d^+(A^{d-}) \qquad (II)$$

wherein Z is (L-H) or a reducible Lewis Acid, L is an neutral Lewis base; H is hydrogen; (L-H)$^+$ is a Bronsted acid; $A^{d-}$ is a non-coordinating anion having the charge d−; and d is an integer from 1 to 3.

When Z is (L-H) such that the cation component is $(L-H)_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. For example, the activating cation $(L-H)_d^+$ is a Bronsted acid, capable of donating a proton to the transition metal catalytic precursor resulting in a transition metal cation, including ammoniums, oxoniums, phosphoniums, silyliums, and mixtures thereof, for example ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it is for example represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, for example the reducible Lewis acid is represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl. In an embodiment, the reducible Lewis acid is triphenyl carbenium.

The anion component $A^{d-}$ include those having the formula $[M^{k+}Q_n]^{d-}$ wherein k is 1, 2, or 3; n is 1, 2, 3, 4, 5, or 6, for example 3, 4, 5, or 6; n−k=d; M is an element selected from Group 13 of the Periodic Table of the Elements, for example boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. For example, each Q is a fluorinated hydrocarbyl group having 1 to 20 carbon atoms, and for example each Q is a fluorinated aryl group, and most for example each Q is a pentafluoryl aryl group. Examples of suitable $A^{d-}$ components also include diboron compounds as disclosed in U.S. Pat. No. 5,447,895, for example, and is fully incorporated herein by reference.

In one or more embodiments, this disclosure relates to a method of making pellet-stable olefinic copolymer rubber ("pellet-stable Bimodal Rubber"), and also making TPV, wherein the olefinic copolymer Bimodal Rubber component is made by contacting olefins (for example ethylene) with a catalyst compound and a boron containing NCA activator represented by the formula (14):

$$Z_d^+(A^{d-}) \qquad (14)$$

where: Z is (L-H) or a reducible Lewis acid; L is an neutral Lewis base (as further described above); H is hydrogen; (L-H) is a Bronsted acid (as further described above); $A^{d-}$ is a boron containing non-coordinating anion having the charge d− (as further described above); d is 1, 2, or 3.

In one or more embodiments in any NCA represented by Formula 14 described above, the reducible Lewis acid is represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, for example the reducible Lewis acid is represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In one or more embodiments in any of the NCAs represented by Formula 14 described above, $Z_d^+$ is represented by the formula: $(L-H)_d^+$, wherein L is an neutral Lewis base; H is hydrogen; (L-H) is a Bronsted acid; and d is 1, 2, or 3, for example $(L-H)_d^+$ is a Bronsted acid selected from ammoniums, oxoniums, phosphoniums, syliums, and mixtures thereof.

In one or more embodiments in any of the NCAs represented by Formula 14 described above, the anion component $A^{d-}$ is represented by the formula $[M^{*k*}+Q^*_{n*}]^{d*-}$ wherein k* is 1, 2, or 3; n* is 1, 2, 3, 4, 5, or 6 (for example 1, 2, 3, or 4); n*–k*=d*; M* is boron; and Q* is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q* having up to 20 carbon atoms with the proviso that in not more than 1 occurrence is Q* a halide.

This disclosure also relates to a method to polymerize olefins to produce RCP used to make pellet-stable Bimodal Rubber by contacting olefins (such as ethylene) with a catalyst compound and an NCA activator represented by the formula (I):

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula I also comprises a suitable cation that is essentially non-interfering with the ionic catalyst complexes formed with the transition metal compounds, for example the cation is $Z_d^+$ as described above.

In one or more embodiments in any of the NCAs comprising an anion represented by Formula I described above, R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl groups; $—SR^1$, $—NR^2_2$, and $—PR^3_2$, where each $R^1$, $R^2$, or $R^3$ is independently a substituted or unsubstituted hydrocarbyl as defined above; or a $C_1$ to $C_{30}$ hydrocarbyl substituted organometalloid.

In one or more embodiments in any of the NCAs comprising an anion represented by Formula I described above, the NCA also comprises cation comprising a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, for example the reducible Lewis acid represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In one or more embodiments in any of the NCAs comprising an anion represented by Formula I described above, the NCA also comprises a cation represented by the formula, $(L-H)_d+$, wherein L is an neutral Lewis base; H is hydrogen; (L-H) is a Bronsted acid; and d is 1, 2, or 3, for example $(L-H)_d^+$ is a Bronsted acid selected from ammoniums, oxoniums, phosphoniums, syliums, and mixtures thereof.

Further examples of useful activators include those disclosed in U.S. Pat. Nos. 7,297,653 and 7,799,879, for example.

Another activator useful herein comprises a salt of a cationic oxidizing agent and a noncoordinating, compatible anion represented by the formula (16):

wherein $OX^{e+}$ is a cationic oxidizing agent having a charge of e+; e is 1, 2, or 3; d is 1, 2 or 3; and $A^{d-}$ is a non-coordinating anion having the charge of d– (as further described above). Examples of cationic oxidizing agents include: ferrocenium, hydrocarbyl-substituted ferrocenium, $Ag^+$, or $Pb^{+2}$. One embodiment of $A^{d-}$ includes tetrakis(pentafluorophenyl)borate. In another embodiment, the catalyst compounds described herein, for synthesizing the RCP used in the pellet-stable Bimodal Rubber, can be used with Bulky activators. A "Bulky activator" as used herein refers to anionic activators represented by the formula:

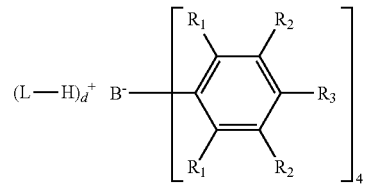

where:
each $R_1$ is, independently, a halide, for example a fluoride;
each $R_2$ is, independently, a halide, a $C_6$ to $C_{20}$ substituted aromatic hydrocarbyl group or a siloxy group of the formula $—O—Si—R_a$, where $R_a$ is a $C_1$ to $C_{20}$ hydrocarbyl or hydrocarbylsilyl group (for example $R_2$ is a fluoride or a perfluorinated phenyl group);
each $R_3$ is a halide, $C_6$ to $C_{20}$ substituted aromatic hydrocarbyl group or a siloxy group of the formula $—O—Si—R_a$, where $R_a$ is a $C_1$ to $C_{20}$ hydrocarbyl or hydrocarbylsilyl group (for example $R_3$ is a fluoride or a $C_6$ perfluorinated aromatic hydrocarbyl group); wherein $R_2$ and $R_3$ can form one or more saturated or unsaturated, substituted or unsubstituted rings (for example $R_2$ and $R_3$ form a perfluorinated phenyl ring);
L is an neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Examples of bulky substituents of activators suitable herein and their respective scaled volumes and molecular volumes are shown in the table at column 20, line 35 et seq. of U.S. Pat. No. 9,266,977.

For a list of particularly useful Bulky activators please also see, for example, U.S. Pat. No. 8,658,556, which is incorporated by reference herein.

In another embodiment, one or more of the NCA activators is chosen from the activators described in U.S. Pat. No. 6,211,105, for example.

In one or more embodiments, activators include N,N-dimethylanilinium tetrakis(perfluoronaphthalen-2-yl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4$$^-$]; 1-(4-(tris(pentafluorophenyl)borate)-2,3,5,6-tetrafluorophenyl)pyrrolidinium; and 4-(tris(pentafluorophenyl)borate)-2,3,5,6-tetrafluoropyridine.

In one or more embodiments, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In one or more embodiments, any of the activators described herein may be mixed together before or after combination with the catalyst compound, for example before being mixed with the catalyst compound.

In some embodiments two NCA activators may be used in the polymerization and the molar ratio of the first NCA activator to the second NCA activator can be any ratio. In some embodiments, the molar ratio of the first NCA activator to the second NCA activator is 0.01:1 to 10,000:1, for example 0.1:1 to 1000:1, for example 1:1 to 100:1.

Further, the typical activator-to-catalyst ratio, e.g., all NCA activators-to-catalyst ratio is a 1:1 molar ratio. Alternate ranges include from 0.1:1 to 100:1, alternately from 0.5:1 to 200:1, alternately from 1:1 to 500:1, alternately from 1:1 to 1000:1. A particularly useful range is from 0.5:1 to 10:1, for example 1:1 to 5:1.

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Chain Transfer Agents

This disclosure further relates to methods to polymerize olefins using the above catalysts in the presence of a chain transfer agent that may be hydrogen or a main-group metal organometallic compound.

A "chain transfer agent" is any agent capable of hydrocarbyl and/or polymeryl group exchange between a coordinative polymerization catalyst and the chain transfer agent during a polymerization process. The chain transfer agent can be any desirable chemical compound such as those disclosed in WO 2007/130306. For example, the chain transfer agent is selected from Group 2, 12, or 13 alkyl or aryl compounds; for example zinc, magnesium or aluminum alkyls or aryls; for example where the alkyl is a $C_1$ to $C_{30}$ alkyl, alternately a $C_2$ to $C_{20}$ alkyl, alternately a $C_3$ to $C_{12}$ alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; and where di-ethylzinc is selected.

In a particularly useful embodiment, this disclosure relates to a catalyst system comprising activator, catalyst compound as described herein and chain transfer agent wherein the chain transfer agent is selected from Group 2, 12, or 13 alkyl or aryl compounds.

In a particularly useful embodiment, the chain transfer agent is selected from dialkyl zinc compounds, where the alkyl is selected independently from methyl, ethyl, propyl, butyl, isobutyl, tertbutyl, pentyl, hexyl, cyclohexyl, and phenyl.

In a particularly useful embodiment, the chain transfer agent is selected from trialkyl aluminum compounds, where the alkyl is selected independently from methyl, ethyl, propyl, butyl, isobutyl, tertbutyl, pentyl, hexyl, cyclohexyl, and phenyl.

Useful chain transfer agents are typically present at from 10 or 20 or 50 or 100 equivalents to 600 or 700 or 800 or 1,000 equivalents relative to the catalyst component. Alternately the chain transfer agent ("CTA") is preset at a catalyst complex-to-CTA molar ratio of from about 1:3000 to 10:1; alternatively about 1:2000 to 10:1; alternatively about 1:1000 to 10:1; alternatively about 1:500 to 1:1; alternatively about 1:300 to 1:1; alternatively about 1:200 to 1:1; alternatively about 1:100 to 1:1; alternatively about 1:50 to 1:1; alternatively about 1:10 to 1:1.

Useful chain transfer agents include diethylzinc, tri-n-octyl aluminum, trimethylaluminum, triethylaluminum, triisobutylaluminum, tri-n-hexylaluminum, diethyl aluminum chloride, dibutyl zinc, di-n-propylzinc, di-n-hexylzinc, di-n-pentylzinc, di-n-decylzinc, di-n-dodecylzinc, di-n-tetradecylzinc, di-n-hexadecylzinc, di-n-octadecylzinc, diphenylzinc, diisobutylaluminum hydride, diethylaluminum hydride, di-n-octylaluminum hydride, dibutylmagnesium, diethylmagnesium, dihexylmagnesium, and triethylboron.

Polymerization Processes for Producing Polypropylene Random Copolymer (RCP)

In embodiments herein, the disclosure relates to polymerization processes where propylene monomer, and optionally comonomer, are contacted with a catalyst system comprising a non-coordinating anion activator and at least one metallocene compound, as described above, to thereby synthesize RCP. The catalyst compound and activator may be combined in any order, and are combined typically prior to contacting with the monomer.

Monomers useful herein include substituted or unsubstituted $C_2$ to $C_{40}$ alpha olefins, for example $C_2$ to $C_{20}$ alpha olefins, for example $C_2$ to $C_{12}$ alpha olefins, for example ethylene, propylene, butene, pentene, hexene, heptene, octene, nonene, decene, undecene, dodecene and isomers thereof. In In one or more embodiments of the disclosure, the monomer comprises propylene and an optional comonomers comprising one or more of ethylene or $C_4$ to $C_{40}$ olefins, for example $C_4$ to $C_{20}$ olefins, or for example $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another embodiment, the monomer comprises ethylene and an optional comonomer comprising one or more $C_3$ to $C_{40}$ olefins, for example $C_4$ to $C_{20}$ olefins, or for example $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Examples of $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbomadiene, substituted derivatives thereof, and isomers thereof, for example hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbomadiene, and their respective homologs and derivatives, for example norbornene, norbomadiene, and dicyclopentadiene.

Polymerization processes of this disclosure can be carried out in any manner known in the art. Any homogeneous, bulk, solution (including supercritical) phase polymerization process known in the art can be used. Such processes can be run in a batch, semi-batch, or continuous mode. Homogeneous solution polymerization processes and slurry processes are useful. (A homogeneous polymerization process is defined to be a process where at least 90 wt % of the product is soluble in the reaction media.) A bulk homogeneous process is particularly useful. (A bulk process is typically a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-10 alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In one or more embodiments, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, for example aromatics are present in the solvent at less than 1 wt %, for example less than 0.5 wt %, for example less than 0 wt % based upon the weight of the solvents.

In one or more embodiments, the feed concentration of the monomers and comonomers for the polymerization is 60 vol % solvent or less, for example 40 vol % or less, or 20 vol % or less, based on the total volume of the feedstream. In one or more embodiments, the polymerization is run in a bulk process.

In embodiments polymerizations can be run at any temperature and/or pressure suitable to obtain the desired polymers. Typical temperatures and/or pressures include a temperature in the range of from about 80° C. to about 300° C., for example from about 85° C. to about 200° C., for example from about 90° C. to about 150° C., for example from about 90° C. to about 120° C., for example from about 95° C. to about 110° C.; and at a pressure in the range of from about 0.35 MPa to about 10 MPa, for example from about 0.45 MPa to about 6 MPa, or for example from about 0.5 MPa to about 4 MPa.

In a typical polymerization, the ethylene is present in the polymerization reactor at a partial pressure of 0 to 1000 psig (0 to 6900 kPa), 5 to 300 psig (34 to 2068 kPa), for example 10 to 100 psig (69 to 690 kPa).

In a typical polymerization, the run time of the reaction is up to 300 minutes, for example in the range of from about 5 to 250 minutes, or for example from about 10 to 120 minutes.

In another embodiment of the disclosure, the polymerization temperature is for example from about 70° C. to about 130° C., for example from about 80° C. to about 125° C., for example from about 90° C. to about 120° C., for example from about 95° C. to about 110° C. and the polymerization process is a homogeneous process, for example a solution process.

In some embodiments, hydrogen is present in the polymerization reactor at a partial pressure of 0.001 to 50 psig (0.007 to 345 kPa), for example from 0.01 to 25 psig (0.07 to 172 kPa), or from 0.1 to 10 psig (0.7 to 70 kPa). In some embodiments, hydrogen is not added the polymerization reactor, i.e., hydrogen may be present from other sources, such as a hydrogen generating catalyst, but none is added to the reactor.

In an embodiment of the disclosure, the activity of the catalyst is at least 50 g/mmol/hour, for example 500 g/mmol/hour or more, for example 5000 g/mmol/hr or more, for example 50,000 g/mmol/hr or more, for example 100,000 g/mmol/hr or more, for example 150,000 g/mmol/hr or more, for example 200,000 g/mmol/hr or more, for example 250,000 g/mmol/hr or more, for example 300,000 g/mmol/hr or more, for example 350,000 g/mmol/hr or more. In an alternate embodiment, the conversion of olefin monomer is at least 10%, based upon polymer yield and the weight of the monomer entering the reaction zone, for example 20% or more, for example 30% or more, for example 50% or more, for example 80% or more.

In one or more embodiments, little or no scavenger is used in the process to produce the ethylene polymer. For example, scavenger (such as tri alkyl aluminum) is present at zero mol %, alternatively the scavenger is present at a molar ratio of scavenger metal to transition metal of less than 100:1, for example less than 50:1, for example less than 15:1, for example less than 10:1.

In one or more embodiments, the polymerization: 1) is conducted at temperatures of 80° C. to 130° C. (for example 90° C. to 120° C., for example 95° C. to 120° C.); 2) is conducted at a pressure of atmospheric pressure to 10 MPa (for example from 0.35 to 10 MPa, for example from 0.45 to 6 MPa, for example from 0.5 to 4 MPa); 3) is conducted in an aliphatic hydrocarbon solvent (such as, isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; for example where aromatics are for example present in the solvent at less than 1 wt %, for example less than 0.5 wt %, for example at 0 wt % based upon the weight of the solvents); 4) ethylene is present in the polymerization reactor at a partial pressure of 0 to 1000 psig (0 to 6900 kPa), for example 5 to 300 psig (34 to 2068 kPa), more for example 10 to 100 psig (69 to 690 kPa); 5) the polymerization for example occurs in one reaction zone; 6) the productivity of the catalyst compound is at least 80,000 g/mmol/hr (for example at least 150,000 g/mmol/hr, for example at least 200,000 g/mmol/hr, for example at least 250,000 g/mmol/hr, for example at least 300,000 g/mmol/hr); 7) optionally, scavengers (such as trialkyl aluminum compounds) are absent (e.g., present at zero mol %, alternately the scavenger is present at a molar ratio of scavenger metal to transition metal of less than 100:1, for example less than 50:1, for example less than 15:1, for example less than 10:1); and 8) optionally, hydrogen is present in the polymerization reactor at a partial pressure of 0.001 to 50 psig (0.007 to 345 kPa) (for example from 0.01 to 25 psig (0.07 to 172 kPa), or for example 0.1 to 10 psig (0.7 to 70 kPa)).

In an embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In an embodiment, the polymerization occurs in one reaction zone. Room temperature is 23° C. unless otherwise noted. Multi-stage polymerization techniques utilize at least two reactors known to those skilled in the art, such as for example, two or more continuous flow, stirred tank reactors in series. Multi-stage polymerization methods provide broad control over (a) the amount of components, (b) the component composition, and (c) component molecular weight. Examples of multi-stage reactor systems are disclosed in U.S. Pat. Nos. 6,319,998, 4,016,342, and 4,306,041, each of which is herein incorporated by reference in its entirety.

Other additives may also be used in the polymerization, as desired, such as one or more scavengers, promoters, modifiers, chain transfer agents (such as diethyl zinc or hydrogen), reducing agents, oxidizing agents, hydrogen, aluminum alkyls, or silanes.

Solution Phase Polymerization

As used herein, the phrase "solution phase polymerization" refers to a polymerization system where the polymer produced is soluble in the polymerization medium. Generally this involves polymerization in a continuous reactor in which the polymer formed and the starting monomer and catalyst materials supplied, are agitated to reduce or avoid concentration gradients and in which the monomer acts as a diluent or solvent or in which a hydrocarbon is used as a diluent or solvent. Suitable processes typically operate at temperatures from about 80° C. to about 250° C., for example from about 80° C. to about 200° C., for example from about 80° C. to about 150° C., or for example from about 90° C. to about 140° C., or for example from about 95° C. to about 120° C. and at pressures of about 0.1 MPa or more, such as 2 MPa or more. The upper pressure limit is not critically constrained but typically can be about 200 MPa or less, for example 120 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

In an embodiment, the polymerization process can be described as a continuous, non-batch process that, in its steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1. In such a reactor, there will be a substantially homogeneous monomer distribution.

For example, in a continuous process, the mean residence time of the catalyst and polymer in the reactor generally can be from about 5 minutes to about 8 hours, and for example from about 10 minutes to about 6 hours, or for example from 10 minutes to 1 hour. In some embodiments, comonomer (such as ethylene) can be added to the reaction vessel in an amount to maintain a differential pressure in excess of the combined vapor pressure of the main monomer (such as propylene) and any optional diene monomers present.

In another embodiment, the polymerization process can be carried out at a pressure of ethylene of from about 0 kPa to about 6900 kPa, for example from about 34 to about 2068 kPa, or for example from about 69 to 690 kPa. The polymerization is generally conducted at a temperature of from about 25° C. to about 250° C., for example from about 75° C. to about 200° C., and for example from about 95° C. to about 200° C.

The addition of a small amount of hydrocarbon to a typical solution phase process can cause the polymer solution viscosity to drop and or the amount of polymer solute to increase. Addition of a larger amount of solvent in a traditional solution process can cause the separation of the polymer into a separate phase (which can be solid or liquid, depending on the reaction conditions, such as temperature or pressure).

The processes discussed and described herein can be carried out in continuous stirred tank reactors, batch reactors, or plug flow reactors. One reactor can be used even if sequential polymerizations are being performed, for example, as long as there is separation in time or space of the two reactions. Likewise, two or more reactors, operating in series or parallel, can also be used. These reactors can have, or not have, internal cooling and the monomer feed may, or may not, be refrigerated. See the general disclosure of U.S. Pat. No. 5,001,205, for example, for general process conditions. See also, WO 96/33227 and WO 97/22639, for example.

Random Propylene Copolymer (RCP) Polymerization Products

In an embodiment, the process described herein produces propylene homopolymers or propylene copolymers, such as propylene-ethylene and/or propylene-alpha olefin (for example $C_3$ to $C_{20}$) copolymers (such as propylene-hexene copolymers or propylene-octene copolymers), having for example a weight average molecular weight (Mw) greater than 200,000 g/mol, a Mw/Mn from 1 to 6 (for example from 2 to 4) for use in making pellet-stable Bimodal Rubber and/or for making TPV with enhanced properties. Likewise, this process disclosure produces olefin polymers, such as polypropylene homopolymers and copolymers.

In an embodiment, the polymers produced herein are homopolymers of propylene, are copolymers of propylene for example having from 0 to 50 mol % (alternately from 0.5 to 25 mol %, alternately from 0.5 to 20 mol %, alternately from 1 to 15 mol %, for example from 1.5 to 10 mol %) of one or more of ethylene or $C_4$ to $C_{20}$ olefin comonomer (for example ethylene or $C_4$ to $C_{12}$ alpha-olefin, for example ethylene, butene, hexene, octene, decene, dodecene, for example propylene, butene, hexene, octene), or are copolymers of propylene for example having from 0 to 25 mol % (alternately from 0.5 to 20 mol %, alternately from 1 to 15 mol %, for example from 1.5 to 10 mol %) of one or more of $C_2$ or $C_4$ to $C_{20}$ olefin comonomer (for example ethylene or $C_4$ to $C_{12}$ alpha-olefin, for example ethylene, butene, hexene, octene, decene, dodecene, for example ethylene, butene, hexene, octene).

In an embodiment, the RCP comprises propylene and at least one alpha-olefin comonomer. In an embodiment, the monomer is propylene and the comonomer is hexene, for example from 1 to 15 mol % hexene, alternately 1 to 10 mol %. In an embodiment, the monomer is propylene and the comonomer is ethylene, for example from 0.5 to 99.5 wt % ethylene, alternately from 1 to 65 wt % ethylene, alternately from 1 to 60 wt % ethylene, alternately from 1 to 30 wt % ethylene, alternately from 2 to 20 wt % ethylene, alternately from 2 to 10 wt % ethylene, based upon the weight of the copolymer.

Typically, the polymers produced herein have an Mw (as measured by GPC-DRI) from 5,000 g/mol to 10,000,000 g/mol, alternately from 100,000 g/mol to 5,000,000 g/mol, alternately 200,000 g/mol to 1,000,000 g/mol. Typically, the polymers produced herein have an Mw/Mn (as measured by GPC-DRI) of greater than 1 to 40, for example 1 to 20, for example 1.1 to 15, for example 1.2 to 10, for example 1.3 to 5, for example 1.4 to 4.

Typically, the RCP produced herein have an Mw (as measured by GPC-DRI) of 5,000 g/mol to 10,000,000 g/mol (for example 100,000 g/mol to 5,000,000 g/mol, for example 200,000 g/mol to 1,000,000 g/mol) and/or an Mw/Mn of greater than 1 to 40 (alternately 1.5 to 20, alternately 1.8 to 10, alternately 2 to 5, 2 to 4). A higher Mw RCP is preferred for PP toughening in TPV, with an Mw as high as possible, depending on the catalyst capability.

In an embodiment, the RCP produced herein has a unimodal or multimodal molecular weight distribution as determined by Gel Permeation Chromatography (GPC). By "unimodal" is meant that the GPC trace has one peak or three inflection points. By "multimodal" is meant that the GPC trace has at least two peaks or more than three inflection points. An inflection point is that point where the second derivative of the curve changes in sign (e.g., from negative to positive or vice versus).

The RCP produced herein can have a melting point (Tm, DSC peak second melt) of at least 145° C., or at least 150° C., or at least 152° C., or at least 153° C., or at least 154° C. For example, the polymer can have a melting point from at least 145° C. to about 175° C., about 150° C. to about 165° C., about 152° C. to about 160° C.

The RCP produced herein can have a melt flow rate (MFR, ASTM 1238, 2.16 kg, 230° C.) from a low of about 0.1 dg/min, about 0.2 dg/min, about 0.5 dg/min, about 1 dg/min, about 15 dg/min, about 30 dg/min, or about 45 dg/min to a high of about 75 dg/min, about 100 dg/min, about 200 dg/min, or about 300 dg/min.

The RCP produced herein by the catalysts is not branched. The RCP may also be further characterized by a random statistical distribution of monomer units, meaning that the probability of finding a given type of monomer residue at a particular point in the polymer chain is about equal to the mole fraction of that monomer residue in the chain.

The RCP may have a composition distribution breadth index of 40% or more, 45% or more, 50% or more, 55% or more, 60% or more, 65% or more, or 70% or more, 75% or more, or 80% or more. In one or more embodiments, the matrix phase may also have a bimodal molecular weight distribution, wherein the propylene:total comonomer molar ratio of the RCP is from 90:10 to 99.5:0.5. In one or more embodiments, the thus-prepared isotactic polypropylene random copolymer (RCP) has a Mn greater than 60,000, ethylene co-monomer in the amount of less than 4 wt % using C2 symmetric or pseudo-symmetric metallocene catalysts. In one or more embodiments, the RCP has a weight average molecular weight (Mw) greater than 200,000 g/mol.

Pellet Stable RCP-Containing Bimodal Rubber

In one or more embodiments, the pellet-stable Bimodal Rubber is made possible by using dual parallel reactors, with a first reactor synthesizing IR Bimodal Rubber with dual catalysts (one metallocene catalyst and one organometallic catalyst), which has an improved molecular weight split ratio of the low and high molecular weight components, while a second reactor is used to prepare random isotactic polypropylene copolymer (RCP), as generally shown in FIG. 1. In one or more embodiments, the effluents from the first reactor are in situ reactor-blended with effluents from a second reactor synthesizing RCP, to thereby form pellet-stable olefinic copolymer Bimodal Rubber ("pellet-stable Bimodal Rubber").

Since in an embodiment the pellets are made by in situ reactor blending, the pellets do not contain fillers. However, Pellet-stable EPDM pellets could be also be made by in situ reactor solution blending of EPDM with 10% of homopolymer of polypropylene (HPP) or RCP with a small amount of ethylene co-monomer, such as below 6%. However RCP, not homopolymer of propylene (or HPP), is preferred for bimodal rubber pellet stabilization.

Subsequently, the pellet-stable Bimodal Rubber can be fed directly into a TPV producing extruder without the need to granulate rubber bales and without the need to add anti-agglomerating solid agents. Considering that HPP is used in TPV production, this addition of RCP through the introduction of pellet-stable bimodal rubber pellets into HPP leads to a final TPV with its thermoplastic resin component (TRC) being a blend of HPP with a small amount of RCP. Blending HPP with a small amount RCP, preferably higher MW RCP, is known to improve the HPP toughness by raising the tie chain concentrations. Commercially, TCR (tailored crystallinity resin) is a blend of HPP with a minor component RCP made in serial slurry reactors with known improved toughness and clarity.

Only a relatively small percent of RCP is needed to stiffen the Bimodal Rubber to thereby become pellet-stable rubber, which can be optionally pelletized. In one or more embodiments, the amount of RCP reactor-blended with the Bimodal Rubber is from about 2.5 to 20 wt %, or from about 5 to 15 wt %, about 8 to 12 wt %, or about 9 to 11 wt %.

In one or more further embodiments, other amounts of the RCP may be added to stiffen the Bimodal Rubber, such as: less than about 20 wt % of RCP, less than about 17.5 wt %, less than about 15 wt %, less than about 12.5 wt %, less than about 11.0 wt %, less than about 10.5 wt %, less than about 10.0 wt %, less than about 9.0 wt %, less than about 8.0 wt %, less than about 7.0 wt %, less than about 6.0 wt %, less than about 5.0 wt %, or even less than about 4.0 wt % of the RCP can be added to the corresponding amounts of Bimodal Rubber.

In yet further embodiments, the following amounts of RCP may be added to stiffen the Bimodal Rubber: about 4.5-5.5 wt %, about 5.5-6.5 wt %, about 6.5-7 wt %, about 7-7.5 wt %, about 7.5-8 wt %, about 8-8.5 wt %, about 8.5-9 wt %, about 9-9.5 wt %, about 9.5-10 wt %, about 10-10.5 wt %, about 10.5-11 wt %, about 11.0-11.5 wt %, about 11.5-12.5 wt %, about 12.5-15 wt %, about 15-17.5 wt %, about 17.5-20 wt %, about 20-22.5 wt %, about 22.5-25.0 wt %, or more than about 25.0 wt % of the RCP can be added to a corresponding amount of the Bimodal Rubber to reach the desired concentration and consistency.

In one or more embodiments, the stiffened Bimodal Rubber is pelletized. The pellets can be formed and extruded using conventional equipment. In an embodiment, the term "pellets" includes but is not limited to the shapes and sizes of plastic pellets that are currently used in other processes and for producing other plastics or products, for any uses and applications. In one or more embodiments, no surface particulates are necessary to prevent the pellets from becoming agglomerated. Furthermore, the pellet-stable stiffened Bimodal Rubber can be formed into various shapes and sizes useable in production of other plastic blends, or in the production of articles, albeit intermediate or final forms.

The pellets can then be used during TPV production, or elsewhere. If the pellets are used to produce TPV, the need to granulate non-particulate rubber and/or large rubber bales is entirely eliminated. Also in embodiments, there is no need to use talc, clay, or other anti-agglomeration agents to prevent granulated rubber crumbs from agglomerating.

While the improved IR Bimodal Rubber is optimal for use in conjunction with the RCP to produce pellet-stable Bimodal Rubber, examples of commercially available elastomeric copolymers that may be used with the newly produced RCP to improved TPV are sold under the tradenames Vistalon™, VISTAMAXX™ (ExxonMobil; Houston, Tex.), Keltan™ (DSM Copolymers; Baton Rouge, La.), Nordel™ IP (DuPont Dow Elastomers; Wilmington, Del.), Nordel MG™ (DuPont Dow Elastomers), Royalene™ (Chemtura) and Buna™ (Lanxess).

Other Constituents and Additives
Thermoplastic Resin Component (TRC)

The thermoplastic resin component (TRC) of the TPV can be any material that is not a "rubber" and that is a polymer or polymer blend considered to be thermoplastic in nature, e.g., a polymer that softens when exposed to heat and returns to its original condition when cooled to room temperature.

The TRC can contain one or more polyolefins, including polyolefin homopolymers and polyolefin copolymers. The TRC may be unvulcanized or non-crosslinked. In embodiments, thermoplastic polymers include crystalline, semi-crystalline, and crystallizable polyolefins, olefin copolymers, and non-olefin resins.

In one or more embodiments, the TRC comprises at least one of i) a polymer prepared from olefin monomers having 2 to 7 carbon atoms, and ii) a copolymer prepared from olefin monomers having 2 to 7 carbon atoms with a (meth) acrylate or a vinyl acetate. In one or more implementations, the thermoplastic copolymers may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor/impact, and random copolymers of propylene with ethylene or the higher α-olefins, described above, or with $C_{10}$-$C_{20}$ diolefins. Comonomer contents for these propylene copolymers may be from 1% to about 30% by weight of the polymer, for example, see U.S. Pat. No. 6,867,260 B2. In one or more embodiments, the TRC may contain a copolymer of propylene and ethylene and/or $C_4$ to $C_{10}$ alpha-olefins, such as those described in U.S. Patent Publication No. 2007/044123, or a random thermoplastic propylene copolymer, such as those described in U.S. Pat. No. 6,288,171, for example.

In one or more embodiments, the TRC is or includes a polypropylene, which can be derived only from propylene monomers (i.e., having only propylene units) or be derived from mainly propylene (more than 75% propylene) and other comonomers. As noted herein, certain polypropylenes having a high MFR (e.g., from a low of 10, or 15, or 20 dg/min to a high of 25 or 30 dg/min) may be used. In one or more embodiments, the TRC contains one or more types of polypropylene, and includes homo, impact, and random polymers or copolymer of propylene, and in one or more embodiments, the TRC includes an isotactic polypropylene homopolymer and isotactic polypropylene random copolymer (RCP), as described herein.

In one or more embodiments, the TRC contains one or more crystalline propylene homopolymers or copolymers of propylene having a melting temperature at least 105° C. as measured by DSC. In an embodiment, copolymers of polypropylene include, but are not limited to, terpolymers of propylene, impact copolymers of propylene, random polypropylene, random copolymer of propylene, and mixtures thereof. In one or more embodiment, the RCP has 2 carbon atoms, or from 4 to 12 carbon atoms, and in an embodiment, the comonomer is ethylene.

In one or more embodiments, the TRC includes propylene-based polymers including solid, generally high-molecular weight plastic resins that primarily comprise units deriving from the polymerization of propylene. In certain embodiments, at least 75%, in other embodiments at least 90%, in other embodiments at least 95%, and in yet other embodiments at least 97% of the units of the propylene-based TRC are derived from the polymerization of propylene. In particular embodiments, these polymers include homopolymers of propylene. The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one or more embodiments, useful propylene-based polymers of the TRC can have a melting temperature (Tm) that is from about 110° C. to about 170° C., in other embodiments from about 140° C. to about 168° C., and in other embodiments from about 160° C. to about 165° C. They may have a glass transition temperature ($T_g$) of from about −10° C. to about 10° C., in other embodiments from about −3° C. to about 5° C., and in other embodiments from about 0° C. to about 2° C. In one or more embodiments, they may have a crystallization temperature ($T_c$) of at least about 75° C., in other embodiments at least about 95° C., in other embodiments at least about 100° C., and in other embodiments at least 105° C., with one embodiment ranging from 105° C. to 130° C.

In particular embodiments, the propylene-based polymers of the TRC include a homopolymer of a high-crystallinity isotactic or syndiotactic polypropylene. In particular embodiments, the heat of fusion ($\Delta H_f$), a measure of crystallinity, greater than 65 J/g, alternatively at least 70 J/g, alternatively at least 80 J/g, or within a range of from 65 or 70 J/g to 90 or 100 or 110 J/g as determined by DSC analysis. The $\Delta H_f$ is dependent on the composition of the polypropylene. A propylene homopolymer will have a higher $\Delta H_f$ than a copolymer or blend of a homopolymer and copolymer. In an embodiment, the thermoplastic polymers are polypropylenes have a crystallinity of at least about 30%, and at least about 40%, and at least about 50%, and at least about 60% in other embodiments, as determined by differential scanning calorimetry (DSC).

This polypropylene can have a density of from about 0.89 to about 0.91 g/cc, with the largely isotactic polypropylene having a density of from about 0.90 to about 0.91 g/cc. Also, high and ultra-high molecular weight polypropylene that has a fractional melt flow rate may be employed. In one or more embodiments, polypropylene resins may be characterized by a MFR (ASTM D-1238; 2.16 kg@230° C.) that is less than or equal to 10 dg/min, in other embodiments less than or equal to 1.0 dg/min, and in other embodiments less than or equal to 0.5 dg/min. One example of a commercially available polypropylene homopolymer that may be used with the improved Bimodal Rubber is sold under the PP5341 designation (from ExxonMobil).

Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable. Useful thermoplastic polymers may also include impact and reactor copolymers.

Catalysts

Any known polymerization process may be used to produce the thermoplastic polymer. For example, the polymer may be a propylene homopolymer obtained by homopolymerization of propylene in a single stage or multiple stage reactor. Copolymers may be obtained by copolymerizing propylene and an α-olefin having 2 or from 4 to 20 carbon atoms in a single stage or multiple stage reactor. Polymerization methods include high pressure, slurry, gas, bulk, suspension, supercritical, or solution phase, or a combination thereof, using a traditional Ziegler-Natta catalyst or a single-site, metallocene catalyst system, or combinations thereof including bimetallic (i.e., Z/N and/or metallocene) catalysts.

Copolymers may be obtained by copolymerizing propylene and an α-olefin having 2 or from 4 to 20 carbon atoms in a single stage or multiple stage reactor. Polymerization methods include high pressure, slurry, gas, bulk, suspension, supercritical, or solution phase, or a combination thereof, using a traditional Ziegler-Natta catalyst or a single-site, metallocene catalyst system, or combinations thereof including bimetallic (i.e., Z/N and/or metallocene) catalysts. In an embodiment, the selected catalysts are those capable of polymerizing a $C_2$ to $C_{20}$ olefin to produce a polypropylene having at least 30% crystallinity and at least 0.01% terminal unsaturation. The catalysts can be in the form of a homogeneous solution, supported, or a combination thereof. Polymerization may be carried out by a continuous, a semi-continuous or batch process and may include use of chain transfer agents, scavengers, or other such additives as deemed applicable. By "continuous" is meant a system that operates (or is intended to operate) without interruption or cessation. For example a continuous process to produce a polymer would be one where the reactants are continually introduced into one or more reactors and polymer product is continually withdrawn.

Where the thermoplastic matrix comprises a polyolefin, such as a propylene polymer or copolymer, the polyolefin will generally be produced in the presence of a single site catalyst, such as a metallocene catalyst, with an activator and optional scavenger. In an embodiment, the metallocene catalysts are those capable of polymerizing a $C_2$ to $C_{20}$ olefin to produce a polypropylene having at least 30% crystallinity.

In one or more embodiments, the metallocene catalysts useful for producing the polypropylene in the process of the invention are not narrowly defined but generally it is found that the most suitable are those in the generic class of bridged, substituted bis(cyclopentadienyl) metallocenes, specifically bridged, substituted bis(indenyl) metallocenes known to produce high molecular weight, high melting temperature, highly isotactic propylene polymers. Particularly suitable catalysts are bridged bis-indenyl metallocene catalysts having a substituent on one or both of the 2- and 4-positions on each indenyl ring or those having a substituent on the 2-, 4-, and 7-positions on each indenyl ring. Generally speaking, those of the generic class disclosed in U.S. Pat. No. 5,770,753 (fully incorporated herein by reference) should be suitable, however, it has been found that the exact polymer obtained is dependent on the metallocene's specific substitution pattern, among other things. A specific list of useful catalyst compounds is found at WO 2004/026921 page 29 paragraph [00100] to page 66, line 4. In another embodiment, the catalyst compounds described at WO 2004/026921 page 66, paragraph [00103] to page 70, line 3 may also be used in the practice of this invention.

In an embodiment the metallocenes are racemic metallocenes, such as rac-dimethylsiladiyl(2-isopropyl,4-phenylindenyl)2 zirconium dichloride; rac-dimethylsiladiyl(2-isopropyl,4-[1-naphthyl]indenyl)2 zirconium dichloride; rac-dimethylsiladiyl(2-isopropyl,4-[3,5-dimethylphenyl] indenyl)2 zirconium dichloride; rac-dimethylsiladiyl(2-isopropyl,4-[ortho-methyl-phenyl]indenyl)2 zirconium dichloride; rac-dimethylsilyl bis-(2-methyl, 4-phenylindenyl)zirconium dichloride, rac dimethylsiladlyl bis-(2-methyl, 4-napthylindenyl) zirconium dichloride, rac-dimethyl siladiyl(2-isopropyl, 4-[3,5 di-t-butyl-phenyl] indenyl)2 zirconium dichloride; rac-dimethyl siladiyl(2-isopropyl, 4-[orthophenyl-phenyl]indenyl)2 zirconium dichloride, rac-diphenylsiladiyl(2-methyl-4-[1-naphthyl]indenyl)2 zirconium dichloride and rac-biphenyl siladiyl(2-isopropyl, 4-[3,5 di-t-butyl-phenyl]indenyl)2 zirconium dichloride. Alkylated variants of these metallocenes (e.g. di-methyl instead of dichloride) are also useful, particularly when combined with a non-coordinating anion type activator. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372.

The manner of activation of the catalyst used in the first polymerization step can vary. In an embodiment, alumoxane and methyl alumoxane (MAO) can be used. Non- or weakly coordinating anion activators (NCA) may be obtained in any of the ways described in EP 0 277 004 and EP 0 426 637. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g. trityl or ammonium derivatives of tetrakis pentafluorophenyl boron (See EP 0 277 004). The NCA precursor can be a neutral compound such as a borane, which is formed into a cation by the abstraction of and incorporation of the anionic group abstracted from the metallocene (See EP 0 426 638).

The alumoxane activator may be utilized in an amount to provide a molar aluminum to metallocene ratio of from 1:1 to 20,000:1 or more. The non-coordinating compatible anion activator may be utilized in an amount to provide a molar ratio of metallocene compound to non-coordinating anion of 10:1 to 1:1.

Particularly useful activators include dimethylaniliniumtetrakis (pentafluorophenyl) borate and dimethyl anilinium tetrakis(heptafluoro-2-naphthyl) borate. For a more detailed description of useful activators please see WO 2004/026921 page 72, paragraph [00119] to page 81 paragraph [00151]. A list of particularly useful activators that can be used in the practice of this invention may be found at page 72, paragraph [00177] to page 74, paragraph [00178] of WO 2004/046214.

In an embodiment, the polymerization is conducted in a continuous, stirred tank reactor. Tubular reactors equipped with the hardware to introduce feeds, catalysts and cross-linking agents in staged manner can also be used. Generally, polymerization reactors are agitated (stirred) to reduce or avoid concentration gradients. Reaction environments include the case where the monomer(s) acts as diluent or solvent as well as the case where a liquid hydrocarbon is used as diluent or solvent. In an embodiment, hydrocarbon liquids include both aliphatic and aromatic fluids such as desulphurized light virgin naphtha and alkanes, such as propane, isobutane, mixed butanes, hexane, pentane, isopentane, cyclohexane, isooctane, and octane. In an alternate embodiment a perfluorocarbon or hydrofluorocarbon is used as the solvent or diluent.

Suitable conditions for the polymerization include a temperature from about 50 to about 250° C., such as from about 50 to about 150° C. and further from about 70 to about 150° C. and a pressure of 0.1 MPa or more, such as 2 MPa or more. The upper pressure limit is not critically constrained but is typically 200 MPa or less, such as 120 MPa or less, except when operating ins supercritical phase then the pressure and temperature are above the critical point of the reaction media in question (typically over 95° C. and 4.6 MPa for propylene polymerizations). For more information on running supercritical polymerizations, please see WO 2004/026921. Temperature control in the reactor is generally obtained by balancing the heat of polymerization with reactor cooling via reactor jackets or cooling coils, auto refrigeration, pre-chilled feeds, vaporization of liquid medium (diluent, monomers or solvent) or combinations of all three. Adiabatic reactors with pre-chilled feeds may also be used.

The ordinarily skilled chemist will recognize which other type of TRC may be used based upon the TPV property requirements, and will also be able to determine the amount of such TRC.

In addition to the rubber, the thermoplastic resin component, and optional processing additives, the TPVs may include a wide variety of additives and processing aids.

Vulcanizing/Cross-Linking/Curative Agents, Cure Retarders

Curatives for use in the TPV can include sulfur, zinc oxide, and fatty acids. Peroxide cure systems can also be used. Generally, polymer compositions can be crosslinked by adding curative molecules, for example sulfur, metal oxides (i.e., zinc oxide), organometallic compounds, radical initiators, etc., followed by heating. In particular, the following are common curatives that may be used: ZnO, CaO, MgO, $Al_2O_3$, $CrO_3$, FeO, $Fe_2O_3$, NiO. These metal oxides can be used in conjunction with the corresponding metal stearate complex (e.g., $Zn(Stearate)_2$, $Ca(Stearate)_2$, $Mg(Stearate)_2$, and $Al(Stearate)_3$), or with stearic acid, and a sulfur compound or an alkylperoxide compound.

Depending on the rubber component employed, certain curatives can be selected. For example, where elastomeric copolymers containing units deriving from vinyl norbornene are employed, a peroxide curative may be chosen because the required quantity of peroxide will not have a deleterious impact on the engineering properties of the thermoplastic phase of the TPV. In other situations, peroxide curatives are not used because they can, at certain levels, degrade the TRC of the TPV.

Depending on the rubber component employed, certain curatives can be selected. Useful phenolic cure systems are disclosed in U.S. Pat. Nos. 2,972,600, 3,287,440, 5,952,425 and 6,437,030, for example. In one or more embodiments, phenolic resin curatives include resole resins, which can be made by the condensation of alkyl substituted phenols or unsubstituted phenols with aldehydes, for example formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms may be employed. In one embodiment, a blend of octylphenol-formaldehyde and nonylphenol-formaldehyde resins are employed. The blend includes from about 25 to about 40 wt % octylphenol-formaldehyde and from about 75 to about 60 wt % nonylphenol-formaldehyde, in other embodiments, the blend includes from about 30 to about 35 wt % octylphenol-formaldehyde and from about 70 to about 65 wt % nonylphenol-formaldehyde. In one embodiment, the blend includes about 33 wt % octylphenol-formaldehyde and about 67 wt % nonylphenol-formaldehyde resin, where each of the octylphenol-formaldehyde and nonylphenol-formaldehyde include methylol groups. This blend can be solubilized in paraffinic oil at about 30% solids without phase separation.

An example of a phenolic resin curative includes that defined according to the general formula

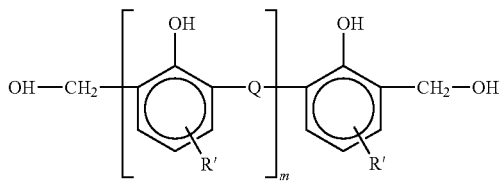

where Q is a divalent radical selected from the group consisting of —$CH_2$—, —$CH_2$—O—$CH_2$—; m is zero or a positive integer from 1 to 20 and R' is an organic group. In one embodiment, Q is the divalent radical —CH2-O—$CH_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

In one or more embodiments, the phenolic resin is used in conjunction with a cure accelerator such as stannous chloride, and metal oxide such as zinc oxide, which is believed to function as a scorch retarder and acid scavenger and/or polymer stabilizer. Useful zinc oxide includes that conventionally employed for rubber processing. In one or more embodiments, the zinc oxide can have a mean particle diameter of about 0.05 to about 0.15 m. Useful zinc oxide can be obtained commercially under the tradename Kadox™ 911 (Horsehead, Corp.). In these or other embodiments, the phenolic resin can be used in conjunction with an acid scavenger, such as a hydrotalcite, which may be added downstream of the curative.

In one or more embodiments, the phenolic resin may be employed in an amount from about 2 to about 6 parts by weight, in other embodiments from about 3 to about 5 parts by weight, and in other embodiments from about 4 to about 5 parts by weight per 100 phr. A complementary amount of stannous chloride may include from about 0.5 to about 2.0 parts by weight, in other embodiments from about 1.0 to about 1.5 parts by weight, and in other embodiments from about 1.2 to about 1.3 parts by weight per phr. In conjunction therewith, from about 0.1 to about 6.0 parts by weight, in other embodiments from about 1.0 to about 5.0 parts by weight, and in other embodiments from about 2.0 to about 4.0 parts by weight of zinc oxide may be employed. In one or more embodiments, the olefinic rubber employed with the phenolic curatives includes diene units deriving from 5-ethylidene-2-norbornene.

Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy)diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy)valerate, benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Others include azo initiators including Luazo™ AP (ARCHEMA). Useful peroxides and their methods of use in dynamic vulcanization of TPVs are disclosed in U.S. Pat. No. 5,656,693, for example, and is incorporated herein by reference for purposes of U.S. patent practice. In certain embodiments, cure systems such as those described in, for example, U.S. Pat. No. 6,747,099, U.S. Publication No. 2004/0195550, and International Patent Application Publication Nos. WO 2002/28946, 2002/077089, and 2005/092966, may also be employed.

In one or more embodiments, the free-radical cure agent may be employed in conjunction with one or more coagents. Coagents may include high-vinyl polydiene or polydiene copolymer, triallylcyanurate, triallyl isocyanurate, triallyl phosphate, sulfur, N,N'-m-phenylenedimaleimide, N,N'-p-phenylenedimaleimide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multi-functional acrylates, multi-functional methacrylates, or oximers such as quinone dioxime. Combinations of these coagents may be employed. For example, combinations of high-vinyl polydienes and α,β-ethylenically unsaturated metal carboxylates are useful, as disclosed in U.S. patent application Ser. No. 11/180,235, for example. Coagents may also be employed as neat liquids or together with a carrier. For example, the multi-functional acrylates or multi-functional methacrylates together with a carrier are useful, as disclosed in U.S. patent application Ser. No. 11/246,773, for example. Also, the curative and/or coagent may be pre-mixed with the plastic prior to formulation of the TPV, as described in U.S. Pat. No. 4,087,485, for example.

Silicon-containing cure systems may include silicon hydride compounds having at least two SiH groups. Silicon hydride compounds that are useful include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof. An example of a silicon hydride cure agent is commercially available from Dow Chemical under the tradename Silicone Fluid 2-5084. Useful catalysts for hydrosilylation include, but are not limited to, transition metals of Group VIII. These metals include, but are not limited to, palladium, rhodium, and platinum, as well as complexes of these metals. Useful silicon-containing curatives and cure systems are disclosed in U.S. Pat. No. 5,936,028, for example. In one or more embodiments, the silane-containing compounds may be employed in an amount from about 0.5 to about 5.0 parts by weight, in other embodiments from about 1.0 to about 4.0 parts by weight, and in other embodiments from about 2.0 to about 3.0 parts per phr. A complementary amount of catalyst may include from about 0.5 to about 20.0 parts, in other embodiments from about 1.0 to about 5.0 parts, and in other embodiments from about 1.0 to about 2.0 parts of metal per million parts by weight of the rubber. In one or more embodiments, the olefinic rubber employed with the hydrosilylation curatives includes diene units deriving from 5-vinyl-2-norbornene.

The ordinarily skilled chemist will recognize which type of curatives can be used based upon the property requirements, and also be able to determine the amount of curatives or cure agents.

Accelerators

Accelerators that may be used include amines, guanidines, thioureas, thiazoles, thiurams, sulfenamides, sulfenimides, thiocarbamates, xanthates, and the like. Acceleration of the cure process can be accomplished by adding to the composition an amount of the accelerator. The mechanism for accelerated vulcanization of the compositions of the Bimodal Rubbers involve complex interactions between the curative, accelerator, activators and polymers. Ideally, the entire available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), N'N-di-ortho-tolyl guanidine (DOTG), dipentamethylenethiuram tetrasulfide (DPTT), 4,4'-dithiodimorpholine (DTDM), tetrabutylthiuram disulfide (TBTD), 2-mercaptobenzothiazole (MBT), 2,2'-benzothiazyl disulfide (MBTS), hexamethylene-1,6-bisthiosulfate disodium salt dihydrate, 2-(morpholinothio)benzothiazole (MBS or MOR), compositions of 90% MOR and 10% MBTS (MOR 90), N-tertiarybutyl-2-benzothiazole sulfenamide (TBBS), N-oxydiethylene thiocarbamyl-N-oxydiethylene sulfonamide (OTOS), zinc diethyldithiocarbamate (ZDEC), zinc 2-ethyl hexanoate (ZEH), and N,N'-diethyl thiourea.

The ordinarily skilled chemist will recognize which type of accelerators can be used based upon the property requirements, and also be able to determine the amount of accelerators.

Extender Oils/Process Oils

In one or more embodiments, additive oils may be added into the TPVs. The term "additive oil" includes both "process oils" and "extender oils," and include mineral oils, hydrocarbon oils, aromatic, paraffinic synthetic oils, or a combination thereof. For example, when high molecular weight rubbers are selected for use in TPV applications, they often inherently possess very high viscosities which result in difficulties related to the processability of these polymers. Therefore, commercially available very high molecular weight bimodal rubbers, typically contain from about 50 to about 125 phr additive oil. The required level of extender oil depends on the molecular weight of the elastomer, but in one or more embodiments the selected quantity is usually sufficient to reduce the apparent viscosity to a Mooney viscosity of about 100 ML(1+4@125° C.) or below. Still, problems may arise from the use of extender/processing oil. For example, elastomers extended with oil are limited in compounding latitude since they already contain a level and/or type of oil which may be undesirable in the compound recipe and restrict further compounding options. Furthermore, the extender oil simply acts as a processing aid and does not participate in the formation of a tight cross-link network upon vulcanization, which reduces the elasticity of the vulcanized compounds.

Examples of additive oils include mineral oils which may include aromatic, naphthenic, paraffinic, and isoparaffinic oils, and may be treated or untreated. Useful mineral oils can be obtained under the tradename SUNPAR™ (Sun Chemicals). Others are available under the name PARALUX™ (Chevron), for example. Process oils may also include plasticizers, such as organic esters and synthetic plasticizers. Further, other synthetic fluids having a lower pour point, lower emission, etc., compared to paraffin or mineral oil, and the like can be used in some implementations.

In one or more embodiments, synthetic oils include polymers and oligomers of butenes including isobutene, 1-butene, 2-butene, butadiene, and mixtures thereof. In one or more embodiments, these oligomers may include isobutenyl mer units, and in one or more embodiments can be characterized by a number average molecular weight (Mn) of from about 300 g/mole to about 9,000 g/mole, and from about 700 g/mole to about 1,300 g/mole, in other embodiments. Other examples of synthetic oils include polyisobutylene, poly(isobutylene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils also include synthetic polymers or copolymers having a viscosity in excess of about 20 cp, in other embodiments in excess of about 100 cp, and yet in other embodiments in excess of about 190 cp, where the viscosity is measured according to ASTM D-4402 at 38° C. In these or other embodiments, the viscosity of these oils can be less than 4,000 cp and in other embodiments less than 1,000 cp. Useful synthetic oils can be obtained under the Polybutene™ (Soltex; Houston, Tex.), Indopol™ (Innouvene), and Parapol™ (ExxonMobil), tradenames. White synthetic oil is available under the tradename SPECTRASYN™ (ExxonMobil), formerly SHF Fluids (Mobil). Oils described in U.S. Pat. No. 5,936,028, for example, may also be employed. It is believed that synthetic oils may provide enhanced low temperature performance. Also, high temperature performance may be enhanced based upon molecular structure.

In one or more embodiments, carbon-based or carbon containing oils such as petroleum oil, vulcanized petroleum oil, vulcanized vegetable oils, and paraffin oils may be used. In one or more embodiments, the extender oils may include organic esters, alkyl ethers, or combinations thereof including those disclosed in U.S. Pat. Nos. 5,290,866 and 5,397,832, for example, and are incorporated herein by reference, for purposes of U.S. patent practice. In one or more embodiments, the organic esters and alkyl ether esters may have a molecular weight that is generally less than about 10,000, and suitable esters include monomeric and oligomeric materials having an average molecular weight of below about 2,000, and in other embodiments below about 600.

In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. However in one or more embodiments, the TPVs are devoid of polymeric aliphatic esters and aromatic esters, as well as phosphate esters.

Finally, the ordinarily skilled chemist will recognize which type of oil should be used with a particular rubber, and also be able to determine the suitable amount of oil. Some commercial examples of useful processing oils are SUNDEX™ (Sun Chemicals) and FLEXON™ (ExxonMobil).

Fillers

The TPV composition may include at least one filler, and includes reinforcing and non-reinforcing fillers. The classes of materials described herein that are useful as fillers can be utilized alone or admixed to obtain desired properties. In prior art TPV compositions, the filler may often be present at from about 50 wt % to about 150 wt %, relative to the total amount of TPV and the elastomeric component, because substantial amounts of fillers must be added to granulated rubber in order to accomplish mixing.

However, when pellet-stable, RCP containing, Bimodal Rubbers are used as the rubber feed for TPV production, there is no need to add the usual talc, clay, or other anti-agglomeration agent to prevent clumping or to accomplish mixing. More specifically, when the prior art rubber bales are mechanically granulated into small rubber crumbs, talc, clay, or other anti-agglomeration agent are required to prevent such granulated rubber crumbs from agglomerating and to facilitate the free, steady flow of rubber crumbs that are, for example, gravimetrically added to the mixing equipment. Furthermore, when even more talc, clays, or solid particles are added to the prior art TPV to accomplish mixing, and such added particles inadvertently stiffen the TPV—which is not desirable.

However, if a filler is still desirable for other reasons, such fillers can be organic fillers and/or inorganic fillers. When non-black fillers are used, it can be desirable to include a coupling agent to compatibilize the interface between the non-black fillers and polymers.

Organic fillers include such materials as carbon black, fly ash, graphite, cellulose, starch, flour, wood flour, and polymeric fibers like polyester-based, and polyamide-based materials, and combinations thereof.

Examples of inorganic fillers are calcium carbonate, talc, silica, fumed silica, aluminum silicate, calcium silicate, sand, glass, glass fibers, glass beads, marble dust, cement dust, clay, calcined clay, kaolin clay, nanoclay, feldspar, mineral aggregates, wollastonite, mica, alumina, magnesium oxide, antimony oxide, zinc oxide, barium sulfate, calcium sulfate, titanium dioxide, titanates, organo-modified clay or nanoclay, glass microspheres, and chalk. Of these fillers, calcium carbonate, barium sulfate, antimony oxide, talc, silica/glass, glass fibers, alumina, aluminum trihydroxide, magnesium hydroxide, and titanium dioxide, and mixtures thereof are can be selected.

The ordinarily skilled chemist will recognize which type of fillers can be used based upon the property requirements, and also be able to determine the amount of fillers.

Polymeric Processing Additives

In certain embodiments, the TPV may include a polymeric processing additive. The processing additive may be a polymeric resin that has a very high melt flow index. These polymeric resins include both linear and branched polymers unless otherwise specified, and have a melt flow rate that is greater than about 500 dg/min, in other embodiments, greater than about 750 dg/min, in other embodiments, greater than about 1000 dg/min, in other embodiments, greater than about 1200 dg/min, and in other embodiments, greater than about 1500 dg/min. Melt flow rate is a measure of how easily a polymer flows under standard pressure, and is measured by using ASTM D-1238 at 230° C. and a 2.16 kg load. The TPVs may include mixtures of various branched or various linear polymeric processing additives.

In one or more embodiments, linear polymeric processing additives include polypropylene homopolymers, and branched polymeric processing additives include diene-modified polypropylene polymers, for example. TPVs that include similar processing additives are disclosed in U.S. Pat. No. 6,451,915, for example. Further, in one or more embodiments, the linear polymeric processing additives are crystalline or semi-crystalline materials, although amorphous materials may result from certain copolymers. In general, these linear additives will have a melt temperature that is from about 130° C. to about 180° C., and in an aspect from about 140° C. to about 170° C., and in an implementation from about 150° C. to about 165° C. In one or more embodiments, the linear polymeric processing additives or resins are polyolefins, and in an implementation are isotactic polyolefins. These polyolefins can be derived from ethylene or α-olefin monomers having from two to about 10 carbon atoms such as, but not limited to, ethylene, propylene, 1-butene, 1-hexene, and 1-octene. In one or more embodiments, the polyolefins are homopolymers, although copolymers and terpolymers are also contemplated. In an implementation, the polyolefin is polypropylene. One example of a commercially available linear polymeric processing additive that is polypropylene having an MFR of about 700 or about 1,500 is available under the tradename Achieve™ (ExxonMobil).

The average molecular weight of the polymeric processing additives may be reduced by oxidative degradation or other post-reactor treatment of the polyolefin, which may be referred to as controlled rheology treatment (CR treatment), that will accomplish molecular scission. This may be accomplished by post-reactor treatment with an oxidizing agent, such as organic or inorganic peroxides that will cleave polyolefin polymers. As a result, the average molecular weight of the polymers will be reduced, yet the molecular weight distribution will remain substantially unchanged. This process is described in U.S. Pat. No. 5,736,465, for example, and is incorporated herein by reference, for purposes of U.S. patent practice.

The ordinarily skilled chemist will recognize which type of polymeric processing additives can be used based upon the property requirements, and also be able to determine the amount of such additives.

Other Additives

In one or more embodiments additional additives such as: antioxidants (e.g., hindered phenolics such as IRGANOX™ 1010 or IRGANOX™ 1076 available from Ciba-Geigy); phosphites (e.g., IRGAFOS™ 168 available from Ciba-Geigy); nucleating agents (e.g. Hyperform™; as Hyperform™ HPN-68L, HPN-68L available from Milliken Chemical; anti-cling additives; tackifiers, such as polybutenes, terpene resins, aliphatic and aromatic hydrocarbon resins; waxes; rosins; hydrogenated rosins alkali metal and glycerol stearates; chemical conditioners; homogenizing agents; peptizers; foaming agents; defoamers; blocking agents; anti-blocking agents; acid scavengers; slip agents, release agents; anti-static agents; conductive particles; crystallization agent; metal deactivators; adhesion promoters; neutralizers; desiccants; stabilizers; heat stabilizers; UV inhibitors; UV stabilizers; light stabilizer; light absorber; pigments; colorants; dyes; coupling agents including silanes and titanates; lubricants; adjuvants; surfactants; preservatives; thickeners; rheology modifiers; humectants; dispersants; flame retardants, and the like, and combinations thereof may be added to the TPV.

The ordinarily skilled chemist will recognize which type of other additives can be used based upon the property requirements, and also be able to determine the amount of such additives.

Preparation of Thermoplastic Vulcanizates (TPVs)

The elastomeric components, RCP, and thermoplastic components are prepared as described above, and then combined. Any known process for making TPVs can be employed. For example, the individual materials and components, such as the one or more rubbers, TRC, thermoplastic modifiers, curing agents, additive oils, and other additives, can be mixed at a temperature above the melting temperature of the TRC to form a melted material.

For example, the thermoplastic and elastomeric components are combined by melt pressing/folding/rolling, melt blending, solution blending, continuous mixing in single and twin screw mixing extruders, utilizing static mixers for mixing molten polymer streams of low viscosity, or impingement mixers. Mixing is complete when the blend exhibits a substantial homogeneous morphology of thermoplastic and elastomeric components. In some embodiments, particulate compositions are prepared by suspending a particulate material in liquid monomer and then forming a polymer via polymerization.

Illustrative mixing equipment include: extruders with kneaders or mixing elements with one or more mixing tips or flights, extruders with one or more screws, and extruders of co or counter rotating type. Suitable mixing equipment also includes Brabender™, Banbury™, Buss mixers and kneaders, and Farrell Continuous mixers, for example. One or more of those mixing equipment, including extruders, can be used in series. Some additional details for making a TPV are disclosed in U.S. Pat. No. 4,594,390, for example, and the content of which is hereby incorporated by reference, for purposes of U.S. patent practice.

In one or more embodiments, the composition is prepared by blending the components in a batch mixer, such as a twin rotor internal mixer equipped with a pressure ram. Mixing can be performed at pressures and temperatures such that the filler (if used) and other compounding components are finely incorporated and become uniformly dispersed within the TPV and ethylene-based elastomer.

Blending may also involve a "masterbatch" approach, where the target concentration of the elastomer is achieved by combining the TRC, the elastomeric component and optionally fillers and other additives with an appropriate amount of pre-blended masterbatch, and the along with curing agents, accelerators, processing oils, and other additives to make the final compositions.

In one or more embodiments, the bimodal rubber component may be present in the amount of from about 15 wt % to about 95 wt %, based upon the total weight of rubber component and TRC. In one or more embodiments, the bimodal rubber component is present in the amount of from about 45 wt % to about 90 wt %, or from 60 wt % to 88 wt %, based upon the total weight of the TPV composition. In one or more embodiments, when EPDMs comprising bimodal ethylene, alpha-olefin, and diene terpolymers are used to produce TPVs, such rubber may be present at from about 10 to about 99 wt %, based upon the weight of the polymers in the blend, further about 20 to about 95 wt %, at least about 30 to about 90 wt %, at least about 40 to about 90 wt %, at least about 50 to about 90 wt %, at least about 60 to about 90 wt %, and at least about 70 to about 90 wt % in other embodiments.

In one or more embodiments, the thermoplastic resin component (TRC) is present in the amount of from about 5 wt % to about 85 wt % based upon the total weight of rubber component and TRC. In one or more embodiments, the TRC is present in the amount of from about 10 wt % to about 55 wt %, or from 12 wt % to 40 wt %, based upon the total weight of rubber component and TRC. In other embodiments, such TRC may be present at from about 10 to about 20 wt %, based upon the weight of the polymers in the blend, further about 15 to about 25 wt %, at about 20 to about 30 wt %, at about 25 to about 35 wt %, at about 30 to about 35 wt %, at about 35 to about 40 wt %, at least about 40 wt %, and at least about 45 wt %, in other embodiments.

In one or more embodiments, the TRC may contain less than 50 wt %, or less than 30 wt %, or less than 10 wt %, or less than 1 wt % of a styrenic block copolymer. The styrenic block copolymer may have a hydrogenated mid-block of styrene-ethylene/butylene-styrene (SEBS) or styrene-ethylene/propylene-styrene (SEPS). In other embodiments, the TPV does not contain any SEBS, or does not contain any SEPS.

Most TPVs typically have a total oil content of about 15 to 50 wt %, with usually about 10 wt % or less being added during subsequent melt mixing. However, pellet-stable Bimodal Rubber does not contain oil. Thus, extender oils/process oils, such as those described above, must be added during the production of TPV, when such pellet-stable Rubber is used. In one or more embodiments, about 15 to 40 wt % of processing oil is added during production of the TPV with such pellet-stable Rubber. In other embodiments, such extender oils are added in amounts of from about 15 to about 25 wt %, from about 20 to about 30 wt %, from about 25 to about 35 wt %, from about 35 to about 40 wt %, or at from about 45 to about 50 wt %, based upon the total weight of the TPV. In yet still other embodiments, such extender oils are added at from about 15 to about 100 parts by weight rubber (phr), at from about 25 to about 50 phr, at from about 40 to about 60 phr, at from about 50 to about 70 phr, at from about 60 to about 80 phr, at from about 70 to about 90 phr, or about 90 to about 100 phr, for example.

In one or more embodiments, the amount of non-rubber particulate, such as carbon black, within or carried by the multimodal rubber as it is introduced with the other ingredients used to make the TPV is less than 15 parts by weight, in other embodiments less than 5.0 parts by weight, in other embodiments less than 1.0 part by weight, in other embodiments less than 0.5 part by weight, and in other embodiments less than 0.05 part by weight per 100 parts by weight rubber. In some embodiments, the rubber is devoid, and in other embodiments substantially devoid, of non-rubber particulate. In one or more embodiments, the non-rubber particulate includes carbon black and/or inorganic materials.

One or more of the curatives or cure agents listed above are capable of curing or crosslinking the rubber that is mixed with the TRC in order to prepare the thermoplastic vulcanizate. For example, where the rubber includes an olefinic elastomeric copolymer, the cure agent may include peroxides, phenolic resins, free radical curatives, silicon-containing curatives, or other curatives conventionally employed, and known to those of skill in the art, in preparing thermosets. In contrast, where butyl rubber is employed in preparing the thermoplastic vulcanizate, the cure agents may include phenolic resins, silicon-containing cure systems, zinc oxide systems, and amine systems.

The cure agent is for example present in an amount effective to produce the desired amount of cure within the rubber phase. In certain embodiments, the cure agent is present in an amount of from 0.01 phr to 50 phr, in other embodiments of from 0.05 phr to 40 phr, in other embodiments of from 0.1 phr to 30 phr, in other embodiments of from 0.5 phr to 25 phr, in other embodiments of from 1.0 phr to 20 phr, in other embodiments of from 1.5 phr to 15 phr, and in other embodiments of from 2.0 phr to 10 phr. After the cure agent is added, in one or more embodiments, the rubber is cured or crosslinked by dynamic vulcanization, wherein the rubber is crosslinked or vulcanized under conditions of high shear at a temperature above the melting point of the thermoplastic. Vulcanization, or crosslinking, of rubbers in TPVs is necessary to keep the rubber, which is the majority blend component, as the dispersed phase, instead of the continuous phase.

In one or more embodiments, the rubber can be simultaneously cured and dispersed as fine particles within the thermoplastic matrix of the TRC, although other morphologies may also exist. Dynamic vulcanization can be effected by mixing the thermoplastic elastomer components at elevated temperatures. This dynamic vulcanization may take place in the presence of processing oil charged to the reactor, as well as other ingredients that have been employed in the art. The resulting TPVs include a continuous thermoplastic phase with fine particles of cured rubber dispersed therein. The rubber within these thermoplastic elastomers can be in the form of finely-divided and well-dispersed particles of vulcanized or cured rubber within a continuous phase of the TRC blended with RCP.

In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 2 µm, less than 1 µm, and in some embodiments when pellet-stable Bimodal Rubber is used.

When the pellet-stable Bimodal Rubber is used to produce thermoplastic vulcanizates (TPVs), the vulcanized rubber particles are smaller and more uniform in size, which results in TPVs with higher particle counts. The higher particle counts result in TPVs with better elastic properties. The finer (smaller), more uniform, and more "elastic" rubber dispersions within the resulting TPVs come from the design and synthesis of bimodal rubbers with an improved molecular weight split ratio and composition distribution of the moderate and ultra-high molecular weight components of the IR Bimodal Rubber. The ability to increase the amount of elastic rubber dispersions results in a TPV which has a lower set/hysteresis and faster recovery facilitated with lower Tg (accomplished by the higher ethylene-content in the rubber). Additionally, the higher molecular weight rubber provides more conformational states for elasticity of the rubber.

The incorporation of RCP into the pellet-stable rubber also results in the addition of more and stronger thermoplastic "ligaments," between the particles within the resulting TPVs. The addition of such RCP also lowers the yield stresses, and thus provides a TPV with better overall elastic properties.

The ordinarily skilled chemist will recognize which additional additives or production regimes can be utilized with the pellet-stable bimodal rubber.

Blends

Thermoplastic vulcanizates are thermoplastic elastomers, but are not thermoset rubbers, and can therefore be processed or re-processed as thermoplastics but with vulcanized rubber dispersions, despite the fact that the rubber may be in a partially or fully cured state. Multiple-step processes can also be employed whereby additional ingredients may be added after dynamic vulcanization has been achieved. When the TPV has already been produced and has solidified, the improved TPV blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder. Additionally, additives, as described herein may be included in the blend, in one or more components of the blend, and/or in an article or product formed from the blend, as desired.

Articles of Manufacture

Despite the fact that the rubber may be partially or fully cured, the TPV can be processed and reprocessed by conventional plastic processing techniques such as extrusion, injection molding, blow molding, and compression molding. The improved TPV composition is suitable for use in a multitude of applications, and further encompasses forming an article with the improved TPV material. Additionally the TPV may be formed into intermediate article, such as pellets, and later remelted to form an article.

The articles of the TPV material may be made or formed by any useful discrete molding or continuous extrusion means for forming and shaping polyolefins known in the art, including: compounding, extrusion, sheet extrusion, casting, profile extrusion or co-extrusion, blow molding, injection molding, thermo-forming, transfer molding, elasto-welding, compression molding, injection molding, co-injection molding, gas-assisted injection molding, transfer molding, foam molding, transfer molding, rotational molding, vacuum forming, melt blowing, lamination, pultrusion, draw reduction, calendering, or other forms of processing such as described in, for example, "Rubber Technology," by Maurice Norton (Van Nostrand Reinhold-New York), or combinations thereof. In one or more embodiments, after processing the article may be further treated, cured, cross-linked, irradiated, heating, and the like, or combined with other articles. In an implementation, the improved TPV may also be used in the formulation of materials made with a portion of recycled materials or from foamed TPVs.

Such TPV's are particularly useful for making articles including but not limited to automotive parts, consumer goods, industrial goods, construction materials, packaging materials, and the like. In an aspect, the article is includes but is not limited to: cookware, storageware, toys, medical devices, sterilization containers, sheets, crates, containers, packaging, wire and cable jacketing, pipes, roofing sheets, geomembranes, sporting equipment, chair mats, tubing, profiles, instrumentation sample holders, sample windows, outdoor furniture, playground equipment, boat and water craft components, elastic fibers, and the like.

Examples of automotive parts include but are not limited to vehicle weather seals, such as for a glass run channel, trunk seals, tailgate seals, cowl seals, gap fillers, glass encapsulation, cut line seals, door seals, hood-to-radiator seals, roof line seals, rocker panels, sashes, and belt-line seals, other vehicle parts and components such as tires, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer-based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's. Additional automotive and vehicle articles include: bumpers, grills, trim parts, dashboards, instrument panels, exterior door and hood components, spoiler, wind screen, hub caps, mirror housing, body panel, and protective side molding, and the like.

In an aspect, the article includes but is not limited to: cookware, synthetic corks, storageware, toys, medical devices, sterilization containers, sheets, crates, containers, packaging, wire and cable jacketing, pipes, roofing sheets, geomembranes, sporting equipment, chair mats, tubing, profiles, instrumentation sample holders, sample windows, outdoor furniture, playground equipment, other automotive components, boat and water craft components, elastic fibers, and the like.

Further molded articles include, but are not limited to a non-automotive seal or gasket; hoses, such as air hose, heat hose, garden hose, industry hose, and the like; building materials, such as roof membranes, building profiles, foam, pipe insulation, cable insulation layers and outside jackets, belts, gaskets, synthetic corks. Consumer goods include but are not limited to electronics, cell phones, construction applications printers, printer parts, sporting goods, soft touch grips, and the like.

In one or more embodiments, the compositions described can be at least partially adhered to a glass substrate, such as for glass encapsulation. Illustrative uses for glass encapsulation include windshield seals, sunroof seals, rear window seals, side window seals, and quarterlight seals, for example. In an embodiment, the composition is extruded using techniques known in the art to form an extruded elastomeric profile or gasket. This extruded profile or gasket is then adhered to the glass substrate.

The above description is intended to be illustrative of the improvements disclosed herein, but should not be considered to be limiting the scope. Persons skilled in the art will recognize that various modifications may be made without departing from the spirit and scope of the disclosure herein. Thus, the improvements will be deemed to include all such modifications that fall within the appended claims and their equivalents. The following examples and tables may provide further context to the improvements disclosed herein.

EXPERIMENTAL EXAMPLES a. Bimodal Rubber Synthesis

General Procedure for Solution Polymerization in Continuous Stirred Tank Reactor (Table 1, Examples 1-2)—

Polymerization reactions were carried out in a well-stirred 2-liter batch reactor equipped to perform coordinative insertion polymerization in the presence of an inert hydrocarbon (isohexane) solvent at temperatures up to 150° C. In the vapor-liquid polymerization system, the polymerization occurred in the liquid phase where gas ethylene was pressurized into the solution and liquid propylene and ethylidene norbornene were fed into the reactor prior to the addition of the catalyst solutions. Prior to polymerization, the reactor was first washed with toluene and then dried with nitrogen purge at 150° C. for one hour.

Afterward, 1 to 1.25 ml toluene solution of dibalo (bis (diisobutylaluminum)oxide, CAS No. 998-00-5, 0.2 mmol/ml solution), as a scavenger, was charged into the reactor before the addition of isohexane solvent. Ethylene and isohexane came from ExxonMobil Chemical Plant, and all have been purified.

Catalyst 1 was selected to mainly prepare moderate MW rubber with majority propylene is a Cs symmetric bridged metallocene of bis(p-triethylsilylphenyl)carbyl(cyclopentadienyl)(2,7-di-t-butylfluorenyl)hafnium dimethyl activated by dimethylaniliniumtetrakis-(pentafluorophenyl) borate. Catalyst 1 can be purchased from commercial sources, or synthesized.

Catalyst 2 was selected to synthesize ultra-high MW rubber is a non-metallocene C1-symmetric pyridyldiamide catalyst of 2-(8-anilino-5,6,7,8-tetrahydronaphthalen-1-yl)-N-(2,6-diisopropylphenyl)quinolin-8-amine hafnium dimethyl activated by dimethyl-anilinium-tetrakis(pentafluorophenyl) borate.

The toluene solutions of Catalyst 1 and 2 are pre-activated with 1:1 molar ratio of activator to catalyst, mixed at a predetermined ratio, and injected into the reactor. Reactor conditions are listed in Table 1 for preparation of the two Bimodal Rubbers which were prepared.

TABLE 1

Reactor Conditions for Example Preparation

| | Example 1 | Example 2 |
|---|---|---|
| Catalyst 1 (ml) | 2.5 | 2.0 |
| Catalyst 2 (ml) | 2.5 | 2.0 |
| Catalyst ratio 1/2 | 1 | 1 |
| Ethylene (psi) | 100 | 100 |
| Propylene (ml) | 120 | 120 |
| ENB (ml) | 7 | 7 |
| Reactor Temp (° C.) | 70 | 70 |
| Reaction exotherm | 26 | 29 |
| Activity (g/g) | 18,200 | 30,000 |

The reactor was loaded with liquid propylene, ethylidene norbornene (ENB), scavenger (typically about 0.2 M bis (diisobutylaluminum) in hexane), and isohexane solvent (about 1000 mL). The mixture was stirred (about 800 rpm) and heated to the desired temperature for a minimum of about 10 minutes. The reactor pressure at this temperature was noted and then the ethylene regulator is set to the desired pressure above this value. Ethylene gas was introduced and the reactor is allowed to equilibrate while stirring. Polymerization began immediately upon addition of the catalyst, and was allowed to continue under controlled reactor temperature for 30 minutes. 5 ml of a stabilizer solution (20 g of Irganox 1076 in 1 liter of toluene) was added into the bimodal rubber synthesized to prevent gelation during polymer drying. Afterward, the reactor was allowed to reach room temperature and depressurized by venting. The polymerization solution was poured into an aluminum tray. The polymer was collected and allowed to dry over 16 hours under ambient condition. The polymer was dried further under vacuum at 60° C.

Table 1 shows that except for the amount of catalyst employed, the amounts of the ethylene, propylene, ENB (ml), and the reactor temperatures were the same. NMR was used to determine the average ethylene and ENB contents. The characterization results of these Bimodal Rubbers can be found in Table 2.

Table 2 shows that the reactor of Example 2 which employed a lesser amount of catalyst had a higher comparative activity of 30,000 (g/g) and comparatively higher peak molecular weights of the lower and higher molecular weight fractions, while the reactor of Example 1 which employed a greater amount of catalyst had a lower comparative activity of 18,200 (g/g), and comparatively lower peak molecular weights of the lower and higher molecular weight fractions.

TABLE 2

Molecular Weights and Compositions of Examples

| | Example 1 | Example 2 |
|---|---|---|
| Mn | 118,468 | 147,736 |
| Mw | 966,164 | 944,352 |
| PDI | 8.16 | 6.39 |
| C2 content (wt %) | 41 | 36 |
| ENB content (wt %) | 2 | 2 |
| Moderate MW | | |
| Amount (wt %) | 93 | 92 |
| Peak MW | 219,000 | 319,000 |
| C2 content (wt %) | 32 | 30 |
| Ultra-high MW | | |
| Amount (wt %) | 7 | 8 |
| Peak MW | 3,630,000 | 4,190,000 |
| C2 content (wt %) | 62 | 60 |

GPC-IR was used to determine the molecular weight and composition distributions, and the GPC-4D plots for Examples 1 and 2 can be found in FIGS. 2A and 2B, respectively. FIG. 2A is a representative plot for the Bimodal Rubber produced under Example 1 conditions, and the plot of dWt/d Log M versus propylene incorporation (C3 wt %) shows that the curve representing MWD is bimodal, and that the moderate MW component is the majority component of the produced Bimodal Rubber. Furthermore, the propylene content ($C_3$ wt %) of the Bimodal Rubber shown in the solid line ranges from about 65% for the moderate MW component to about 35% for the ultra-high component.

FIG. 2B is a representative plot for Bimodal Rubber produced under Example 2 conditions, and the plot of dWt/d Log M versus propylene incorporation (C3 wt %) shows that the curve representing MWD is bimodal, and that the moderate MW component is the majority component of the produced Bimodal Rubber. Furthermore, the propylene content ($C_3$ wt %) of the Bimodal Rubber shown in the solid line ranges from about 70% for the moderate MW component to about 40 wt % for the ultra-high component.

b. Example RCP Synthesis

Polymerization reactions were carried out in a well-stirred 2-liter batch reactor equipped to perform coordinative insertion polymerization in the presence of an inert hydrocarbon (isohexane) solvent at temperatures up to 150° C. In the vapor-liquid polymerization system, the polymerization occurred in the liquid phase where gas ethylene was pressurized into the solution and liquid propylene was fed into the reactor prior to the addition of the catalyst solutions. Prior to polymerization, the reactor was first washed with toluene and then dried with nitrogen purge at 150° C. for one hour. Afterward, 1 ml hexane solution of tri-isobutyl aluminum (CAS 100-99-2, 1 mmol/ml solution), as a scavenger, was charged into the reactor before the addition of isohexane solvent. Ethylene, propylene, and isohexane came from ExxonMobil Chemical Plant and all have been purified.

The metallocene catalyst used to synthesize RCP is a pseudo $C_2$ symmetric bridged C57H68OSiZr, with a molecular weight of 888.48 g/mol, or dimethylsilyl (4-o-biphenyl-2-n-butyl indenyl) (4-(3',5'-di-tert-butyl-4'-methoxyphenyl)-2-methyl-1,5,6,7-tetrahydro-s-indacenyl) zirconium dimethyl, activated by dimethylaniliniumtetrakis-(pentafluorophenyl) borate. Catalyst toluene solution is pre-activated with 1:1 molar ratio of activator to catalyst, mixed at a predetermined ratio, and injected into the reactor.

Reactor conditions are listed in Table 3 for the two RCP prepared. Polymerization began immediately upon addition of the catalyst, and was allowed to continue under controlled reactor temperature for 60 minutes. Afterward, the reactor was allowed to reach room temperature and depressurized by venting. The polymerization solution was poured into an aluminum tray. The polymer was collected and allowed to dry over 16 hours under ambient condition. The polymer was dried further under vacuum at 60° C.

The characterization results of the RCP can also be found in Table 3. It should be noted that the ethylene content listed in Table 3 is an average. Table 3 shows that the reactor of Example 4 which employed a lesser amount of catalyst had a higher comparative activity of 115,000 (g/g), while the reactor of Example 3 which employed a greater amount of catalyst had a lower comparative activity of 56,000 (g/g).

TABLE 3

Reactor conditions used to prepare Examples 3 and 4

|  | Example 3 | Example 4 |
| --- | --- | --- |
| Catalyst (mg) | 2 | 1.5 |
| Ethylene (psi) | 5 | 5 |
| Propylene (ml) | 350 | 350 |
| Reactor Temp (° C.) | 80 | 75 |
| Reaction exotherm (° C.) | 25 | 30 |
| Activity (g/g) | 56,000 | 115,000 |
| Mn | 68,000 | 106,000 |
| Mw | 258,000 | 350,000 |
| PDI | 3.8 | 3.3 |
| C2 content (wt %) | 1.65 | 3.86 |

GPC-IR was used to determine molecular weight and composition distributions, and the GPC-4D plots for Examples 3 and 4 can be found in FIG. 3A and FIG. 3B, respectively.

FIG. 3A is a representative plot for RCP produced under Example 3 conditions, and the plot of dWt/d Log M versus ethylene incorporation ($C_2$ wt %) shows that the curve representing MWD is unimodal. Furthermore, the ethylene content ($C_2$ wt %) of the RCP shown in the solid line ranges from about 3% to less than about 0.5% as molecular weight increases.

FIG. 3B is a representative plot for Bimodal Rubber produced under Example 4 conditions, and the plot of dWt/d Log M versus ethylene incorporation ($C_2$ wt %) shows that the curve representing MWD is unimodal. Furthermore, the ethylene content ($C_2$ wt %) of the RCP shown in the solid line ranges from about 5% to about 0% as molecular weight increases. The negative slope of the right side of the curves of FIG. 3A and FIG. 3B is indicative of lower ethylene content as MW of the RCP copolymer increases.

c. Pellet Stable Bimodal Rubber

Solution blending of 10 wt % of Example 3 (RCP) into 90 wt % of Example 2 (Bimodal Rubber) was conducted at 150° C. using dichloro benzene (o-DCB) as the solvent with addition of 0.5 wt % of BHT antioxidant to prevent thermal degradation during solution blending. Example 5, the thus prepared RCP-containing Bimodal Rubber, was stable and less tacky suggesting potential pellet stability.

d. TPV Preparation

Example Components

Vistalon™ 3666 rubber is an oil-extended terpolymer grade rubber with a medium-high molecular weight, medium diene content, medium ethylene content and a broad molecular weight distribution was selected as a comparative rubber control Example. Vistalon™ 3666 rubber has an oil content of 75 phr, a Mooney Viscosity (ML 1+4, 257° F. (125° C.)) of 52 MU (ASTM 01646 (mod)), an ethylene content of 64.0 wt % (ASTM D3900A), and an ethylidene norbornene (ENB) content of 4.5 wt % (ASTM 06047 (mod)), and is sold in a dense bale form.

5341 PP, a polypropylene homopolymer (PP) is a thermoplastic polymer available from ExxonMobil. 5341 PP has a specific gravity of 0.95 (ASTM D792), and a density of 0.950 g/cm3 (ISO 1183).

"ROI"—a mix of 30% resin/70% oil, wherein the resin is SP1045 a phenolic resin (SI Group) in Sunpar™ 150 oil (Sunoco).

The main ingredients used in one or more commercial TPVs are isotactic polypropylene, EPDM (oil extended) phr oil, and processing oil, RIO, and a curative.

Pellet Stable Bimodal Rubber is made with a blend of Example 3 RCP (10%) and Example 2 EDPM Copolymer (90%), for purposes of the experimental example. It should be noted that for Example 5, the RCP containing Bimodal Rubber does not contain oils.

d. TPV Formulations

The detailed TPV formulations for Examples 6-8 can be found in Table 4.

TABLE 4

TPV Formulations

| | Example 6 (control) | Example 7 (control) | Example 8 |
|---|---|---|---|
| PP (PP5341) | 97 | 97 | 87 |
| EPDM (V3666)* | 175 | 175 | 0 |
| Example 5** | 0 | 0 | 100 |
| Oil (Sunpar) | 5 | 5 | 80 |
| RIO | 7 | 7 | 7 |
| ZnO | 1 | 1 | 1 |
| Oil (Sunpar) | 1.95 | 1.95 | 1.95 |
| C2 content (wt %) | 5 | 5 | 5 |

Units above in phr, parts per hundred rubber
*V3666 EPDM has an oil content of 75 phr
**Example 5 is a blend of 10 wt % Example 3 (RCP) and 90 wt % Example 2 (EDPM Copolymer).

It should be noted Example 8 is oil-adjusted in since the RCP-containing bimodal copolymer rubber of Example 5 contains no oil, while the Bimodal Rubbers used in Examples 6 and 7 (controls) are oil extended. This is to ensure that the final and total oil amount in each formulation is the same.

Additionally, the PP amount in Example 8 is adjusted by the addition of 87 phr of PP homopolymer in order to have the same final PP amount as the control Examples 6 and 7, for comparison purposes.

All TPVs were prepared in a Brabender internal mixer running at 180° C. (190° C. for Example 7) and 100 RPM. For Example 8, 100 phr of the pellet-stable Bimodal Rubber of Example 5 and 87 phr of the polypropylene homopolymer (PP homopolymer) were added at the beginning. After 1 minute, ½ of the oil (40 phr) was added, then after 2 minutes 7 phr of RIO was introduced and the sample was mixed for 1 minute. Next the SnCl2/ZnO was added, and the sample was mixed for another 5 minutes. Finally the other ½ of oil (40 phr) was added and mixed for 3 minutes. The total mixing time was 12 minutes. The samples were then removed and allowed to cool.

Similarly, Example 6 was mixed at 180° C., but Example 7 was mixed at 190° C., but both were mixed at 100 RPMs. For Examples 7-8, 175 phr of commercially available bimodal rubber and 97 phr of the PP homopolymer were added at the beginning. After 1 minute, ½ of the oil (40 phr) was added, then after 2 minutes 7 phr of RIO was introduced and the sample was mixed for 1 minute. Next the SnCl2/ZnO was added, and the sample was mixed for another 5 minutes. Finally the other ½ of oil (40 phr) was added and mixed for 3 minutes. The total mixing time was 12 minutes. The samples were then removed and allowed to cool.

It should be noted that for Example 5, the RCP containing bimodal EPDM does not contain oils, but can be processed just as easily as the oil extended bimodal rubbers, which are a commonly used ingredient in TPVs.

e. TPV Dispersion and Properties

Figure 4A:
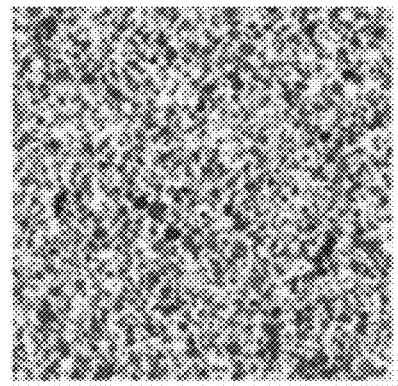
FIG. 4A is an image showing rubber particle size distribution of a comparative TPV.
Figure 4B:
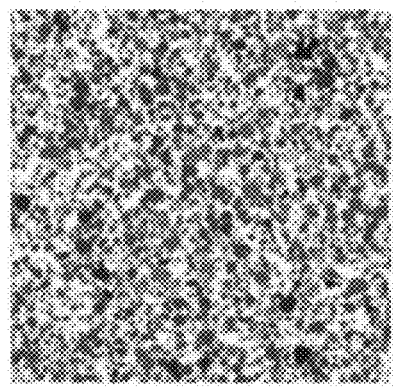
FIG. 4B is an image showing rubber particle size distribution of a comparative TPV.
Figure 4C:
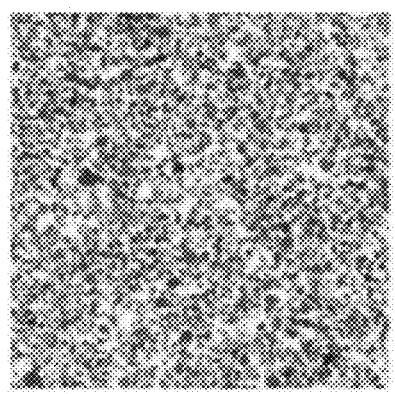
FIG. 4C is an image showing rubber particle size distribution of a TPV of the present disclosure, according to one embodiment.

All TPV samples were compression molded into test specimens for mechanical measurements. All TPV Examples, including controls, were also cryo-faced using a cryo-microtom (Leica) and examined afterward by tapping phase AFM (atomic force microscopy, Icon, Bruker). For each sample, three 60×60 micron$^2$ phase images were collected and then processed by SPIP software (scanning probe image processing, Image Metrology). Representative images of the various TPV blends are shown in FIGS. 4A-4C, which depict the particle size, shape, and particle count of the dispersion particles measured in the respective images in a cross section of the TPV. FIG. 4A shows comparative Example 6, FIG. 4B shows comparative Example 7, and FIG. 4C shows TPV made with the high molecular weight EDPM, blended with specially prepared RCP.

Table 5 shows the TPV properties and the dispersion sizes of the particles, and the particle count of each sample.

TABLE 5

TPV Properties, Particle Data

| | Example 6 (comparative) | Example 7 (comparative) | Example 8 |
|---|---|---|---|
| Flexural modulus (MPa) | 75.3 | 76.7 | 56.9 |
| 1$^{st}$ hysteresis | 1.456 | 1.431 | 1.124 |
| 2$^{nd}$ hysteresis | 0.644 | 0.614 | 0.369 |
| Dispersion | | | |
| Dn (micron) | 0.678 | 0.681 | 0.605 |
| Dw (micron) | 1.107 | 1.122 | 0.90 |
| Dv (micron) | 1.60 | 1.626 | 1.166 |
| Dw/Dn | 1.63 | 1.65 | 1.48 |
| Dv/Dn | 2.36 | 2.39 | 1.93 |
| Count | 8510 | 8327 | 9851 |

As illustrated by FIG. 4A and FIG. B (control Examples) and Table 5, the properties of Examples 6 and 7 are similar to each other. However, the inventive TPV of Example 8 has a higher particle count and has a significantly lower flexural modulus (MPa), and 1st hysteresis and 2nd hysteresis, as compared to Examples 6 and 7. With respect to $D_n$, $D_w$, and $D_v$, which pertain to equivalent dispersion diameters of number average, weight average, and volume average respectively, and Dw/Dn which is a measure of the size dispersity, as shown by Table 5, the TPV of Example 8 made with the pellet-stable Bimodal Rubber has significantly improved properties, significantly smaller particle sizes, and a higher particle count.

Example 8 demonstrates that the pellet-stable RCP-containing Bimodal copolymer Rubber which has an improved molecular weight split ratio of the low and high molecular weight components ("IR Bimodal Rubber") can be used to make TPVs with improved properties and performance. For example, the improved properties and performance of a lower set/hysteresis and faster recovery are attributable to a lower Tg (more ethylene). The higher molecular weight bimodal rubber also has more conformational states for rubber elasticity, and the pellet-stable Bimodal Rubber provides an increased number and decreased sizes of rubber particles within the TPV.

These more uniform and finer vulcanized rubber dispersions in TPVs increases the plastic ligament that form between the rubber particles, and raises the elasticity of the TPV. Additionally, more elastic vulcanized rubber dispersions would produce more plastic ligament kinks in a TPV during deformation to further enhance its elasticity.

When the aforementioned pellet-stable Bimodal Rubber is used to produce TPVs, such TPVS are improved by having a lower hysteresis and flexural modulus (MPa), and therefore better elastic properties. Furthermore, the addition of a small amount of random isotactic polypropylene copolymer (RCP) results in more numerous and more robust PP plastic ligaments which results in a lower yield stress/strain in the TPV.

Additional Testing Methodologies

Molecular volume may be calculated as reported in Girolami, G. S. (1994) "A Simple 'Back of the Envelope' Method for Estimating the Densities and Molecular Volumes of Liquids and Solids," *Journal of Chemical Education*, v. 71(11), pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Polypropylene microstructure was determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by Bovey, F. A. (1969) *Polymer Conformation and Configuration* (Academic Press, New York) and Randall, J. (1977) *Polymer Sequence Determination, $^{13}$C-NMR Method* (Academic Press, New York).

To determine various molecular weight related values by GPC (RCP), high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm×7.5 mm linear columns, each containing PLgel 10 um, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL, and 250 uL of a polymer solution was injected into the system. The concentration of the polymer in the eluent was monitored using a Polymer Char IR4 detector. The molecular weights presented are relative to linear polystyrene standards and are uncorrected. For purposes of this invention only, the Rapid-GPC Mw (weight average molecular weight) data can be divided by 1.9 to approximate GPC-3D Mw results for ethylene-propylene copolymers. Likewise, for purposes of this invention only, the Rapid-GPC Mw data for propylene homopolymers can be divided by 1.5 to approximate GPC-3D Mw results.

Differential Scanning Calorimetry (DSC Procedure-1) Used for RCP Data

Measurements were performed on a TA-Q200 instrument to determine the melting point of the polymers. Samples were pre-annealed at 220° C. for 15 minutes and then allowed to cool to room temperature overnight. The samples were then heated to 220° C. at a rate of 100° C./minutes and then cooled at a rate of 50° C./minutes. Melting points were collected during the heating period. The amount of ethylene incorporated in the polymers (wt %) was determined by rapid FT-IR spectroscopy on a Bruker Vertex 70 IR in reflection mode. Samples were prepared in a thin film format by evaporative deposition techniques. Weight percent ethylene was obtained from the ratio of peak heights at 729.8 and 1157.9 cm-1. This method was calibrated using a set of ethylene/propylene copolymers with a range of known wt % ethylene content.

Differential Scanning Calorimetry (for Larger Scale Products) (DSC-Procedure-2)—RCP Peak melting point, (Tm, also referred to as melting point), peak crystallization temperature (Tc, also referred to as crystallization temperature), glass transition temperature (Tg), heat of fusion ($H_f$), and percent crystallinity were determined using the following DSC procedure according to ASTM D3418-03. Differential scanning calorimetric (DSC) data were obtained using a TA Instruments model Q2100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −70° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the *Polymer Handbook*, Fourth Ed., published by John Wiley and Sons, New York 1999, provided, however, that a value of 189 J/g is used as the heat of fusion for 100% crystalline polypropylene, a value of 290 J/g is used for the heat of fusion for 100% crystalline polyethylene. The melting and crystallization temperatures reported here were obtained during the first cooling/second heating cycle unless otherwise noted. In the event of conflict between the DSC Procedure-1 and DSC procedure-2, DSC procedure-2 shall be used.

Gel Permeation Chromatography with Three Detectors (GPC-3D) (Used for RCP Data)

Mw, Mn and Mw/Mn are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: Sun, T. et al. (2001) "Effect of Short Chain Branching on the Coil Dimensions of Polyolefins in Dilute Solution," *Macromolecules*, v. 34(19), pp. 6812-6820 and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and $(dn/dc)$ is the refractive index increment for the system. The refractive index, n=1.500 for TCB at 145° C. and λ=690 nm. Units on parameters throughout this description of the GPC-3D method are such that concentration is expressed in g/cm³, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, *Light Scattering from Polymer Solutions*, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and $(dn/dc)$ is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the following equation:

$$\eta_S = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'vis = \frac{[\eta]_{avg}}{kM_v^\alpha}$$

$M_V$ is the viscosity-average molecular weight based on molecular weights determined by LS analysis. Z average branching index ($g'_{Zave}$) is calculated using Ci=polymer concentration in the slice i in the polymer peak times the mass of the slice squared, Mi².

The Mark-Houwink parameters used in the data processing for the tested samples are: 1) for ethylene polymers: K/a=0.000579/0.695; and 2) for propylene polymers: K/a=0.0002288/0.705).

All molecular weights are weight average unless otherwise noted. All molecular weights are reported in g/mol unless otherwise noted.

In the event of conflict between the GPC-3D procedure and the "Rapid GPC," the GPC-3D procedure immediately above shall be used. Further details regarding methods of determining Mw, Mn, MWD are described in US 2006/0173123 pages 24-25, paragraphs [0334] to [0341].

GPC-4D Procedure: Molecular Weight, Comonomer Composition and Long Chain Branching Determination by GPC-IR Hyphenated with Multiple Detectors (Used for Newly Produced Bimodal Rubber)

Unless otherwise indicated, the distribution and the moments of molecular weight (Mw, Mn, Mw/Mn, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-m Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M g/mole. The MW at each elution volume is calculated with following equation $$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha^{PS}=0.67$ and $K_{PS}=0.000175$ while α and K are for other materials as calculated as published in literature (Sun, T. et al. (2001) *Macromolecules*, v. 34, pp. 6812-6820), except that for purposes of the present disclosure, α=0.700 and K=0.0003931 for ethylene, propylene, diene monomer copolymers (Nota Bene: Example 1 below used K=0.000351 and α=0.701), α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards. In particular, this provides the methyls per 1,000 total carbons ($CH_3/1000TC$) as a function of molecular weight. The short-chain branch (SCB) content per 1000TC (SCB/1000TC) is then computed as a function of molecular weight by applying a chain-end correction to the $CH_3/1000TC$ function, assuming each chain to be linear and terminated by a methyl group at each end. The wt % comonomer is then obtained from the following expression in which f is 0.3, 0.4, 0.6, 0.8, and so on for $C_3$, $C_4$, $C_6$, $C_8$, and so on comonomers, respectively.

$$w2 = f*SCB/1000TC$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained.

$$\text{Bulk } IR \text{ ratio} = \frac{\text{Area of } CH_3 \text{ signal within integration limits}}{\text{Area of } CH_2 \text{ signal within integration limits}}$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $$w2b = f*\text{bulk CH3/1000TC}$$

$$\text{bulk } SCB/1000TC = \text{bulk } CH3/1000TC - \text{bulk } \frac{CH3end}{1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972).

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the equation $[\eta]=\eta_s/c$, where c is concentration and is determined from the IR5 broadband channel output. The viscosity MW at each point is calculated as $$M = K_{PS} M^{\alpha_{PS}+1}/[\eta],$$

where $\alpha_{ps}$ is 0.67 and $K_{PS}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and α are for the reference linear polymer, which are, for purposes of the present disclosure, α=0.700 and K=0.0003931 for ethylene, propylene, diene monomer copolymers, α=0.695 and K=0.000579 for linear ethylene polymers, α=0.705 and K=0.0002288 for linear propylene polymers, α=0.695 and K=0.000181 for linear butene polymers, a is 0.695 and K is 0.000579*(1−0.0087*w2b+0.000018*(w2b)^2) for ethylene-butene copolymer where w2b is a bulk weight percent of butene comonomer, a is 0.695 and K is 0.000579*(1−0.0075*w2b) for ethylene-hexene copolymer where w2b is a bulk weight percent of hexene comonomer, and a is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

Experimental and analysis details not described above, including how the detectors are calibrated and how to calculate the composition dependence of Mark-Houwink parameters and the second-virial coefficient, are described by Sun, T. et al. (2001) *Macromolecules*, v. 34(19), pp. 6812-6820.

All molecular weights are weight average unless otherwise noted. All molecular weights are reported in g/mol unless otherwise noted.

Methyl groups per 1000 carbons ($CH_3$/1000 Carbons) is determined by $^1$H NMR.

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

While the foregoing is directed to embodiments of the present disclosure, other and further embodiments of the disclosure may be devised without departing from the basic scope thereof, and the scope thereof is determined by the claims that follow.

What is claimed is:

1. A method of preparing a pellet-stable olefinic copolymer bimodal rubber, comprising:

producing a high molecular weight olefinic copolymer rubber with a weight average molecular weight (Mw) of greater than 500,000 g/mol and characterized by a bimodal molecular weight and a bimodal composition distribution ("bimodal rubber") within a first reactor;

concurrently producing isotactic polypropylene random copolymer (RCP) within a second reactor, wherein the first and second reactors are operated in parallel to each other;

obtaining an effluent from the first reactor;

obtaining an effluent from the second reactor;

reactor-blending the effluents in situ to thereby produce a cross-linkable pellet-stable RCP-containing bimodal rubber ("pellet-stable bimodal rubber"), wherein about 80-97.5 wt % of the bimodal rubber is blended with about 2.5-20 wt % of the RCP, and optionally pelletizing—the pellet-stable bimodal rubber.

2. The method of claim 1, further comprising producing the RCP by contacting, at a temperature of 80° C. or more, propylene and an optional comonomer with a homogeneous catalyst system comprising a non-coordinating anion activator and one or more metallocene catalyst compound represented by the formula:

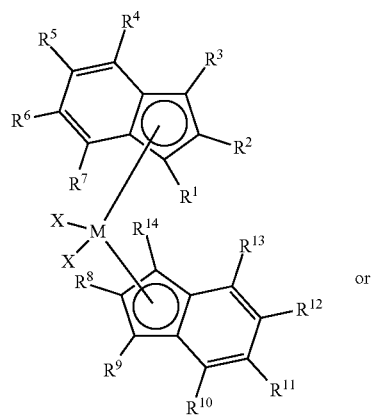

or

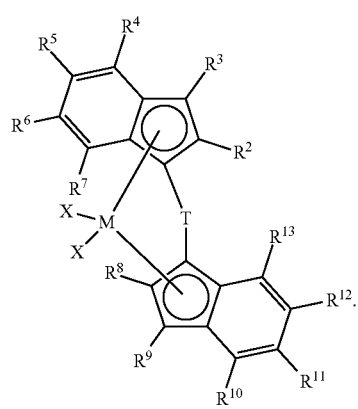

wherein:

R² and R⁸ are, independently, a $C_1$ to $C_{20}$ linear alkyl group;

R⁴ and R¹⁰ are substituted or unsubstituted aryl groups, provided that at least one of the aryl groups is: 1) substituted at an othro-position with at least one group selected from $C_1$ to $C_{40}$ hydrocarbyls, heteroatoms, and heteroatom containing groups, 2) substituted at the 3', 4' or 5'-position with at least one group selected from $C_1$ to $C_{40}$ hydrocarbyls, heteroatoms, and heteroatom containing groups, or a combination thereof;

M is a group transition 2, 3 or 4 metal;

T is a bridging group;

each X is an anionic leaving group;

each R¹, R³, R⁵, R⁶, R⁷, R⁹, R¹¹, R¹², R¹³, and R¹⁴ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents; and recovering a reactor effluent.

3. The method of claim 2, wherein the one or more metallocene catalyst compound further comprises one or more of:

R² is methyl, ethyl, n-propyl, n-butyl, n-pentyl, n-hexyl, n-heptyl, n-octyl, n-nonyl or n-decyl;

R⁸ is methyl, ethyl, n-propyl, n-butyl, n-pentyl, n-hexyl, n-heptyl, n-octyl, n-nonyl or n-decyl;

at least one of R⁴ and R¹⁰ is a phenyl group substituted at the 3' and 5'-positions with $C_1$ to a $C_{10}$ alkyl groups or aryl groups or combinations thereof;

R⁴ and R¹⁰ are independently a phenyl group substituted at the 3' and 5'-positions with $C_1$ to a $C_{10}$ alkyl groups or aryl groups or combinations thereof;

R⁴ and R¹⁰ are independently a phenyl group substituted at the 3' and 5'-positions with $C_1$ to a $C_{10}$ alkyl groups or aryl groups or combinations thereof, the 4'-position is substituted with a group selected from (XR'$_n$), wherein X is a Group 14-17 heteroatom having an atomic weight of 13 to 79 and R' is one of a hydrogen atom, halogen atom, a $C_1$-$C_{10}$ alkyl group, or a $C_6$-$C_{10}$ aryl group and n is 0, 1, 2, or 3;

M is Hf, Ti and/or Zr;

at least one of R⁴ and R¹⁰ is a phenyl group substituted at the 2'-position with an alkyl or aryl group;

wherein one of $R_5$ and $R_6$ or $R_{11}$ and $R_{12}$ join together to form a ring structure;

wherein T is represented by the formula $R_2^a J$, where J is C, Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system; and wherein T is $CH_2$, $CH_2CH_2$, $C(CH_3)_2$, $SiMe_2$, $SiPh_2$, SiMePh, $Si(CH_2)_3$, $Si(CH_2)_4$, $Si(Me_3SiPh)_2$, or $Si(CH_2)_5$.

4. The method of claim 1, further comprising producing the RCP by using a metallocene catalyst compound represented by one or more of the following formulas:

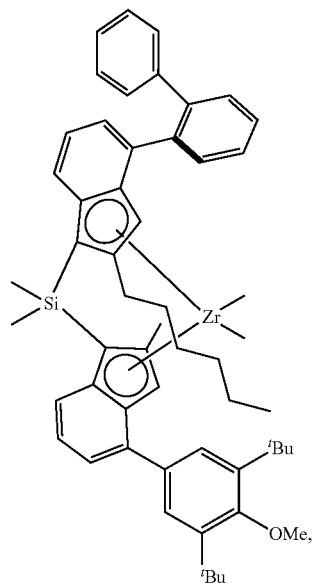

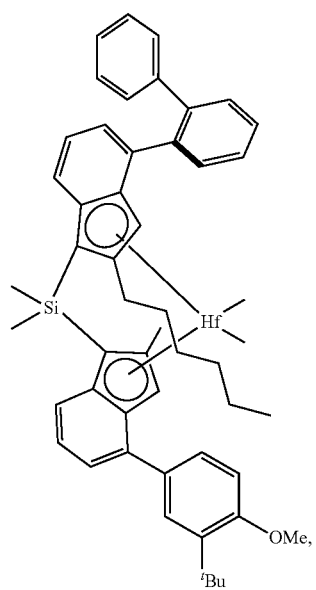

97
-continued
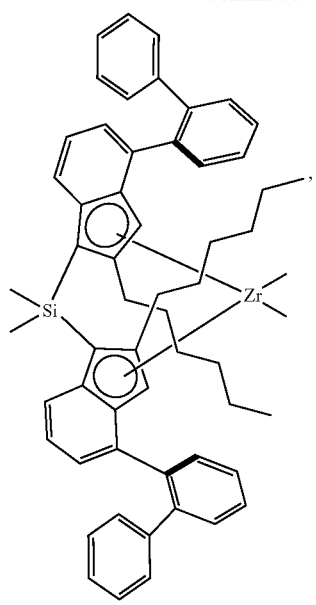
98
-continued
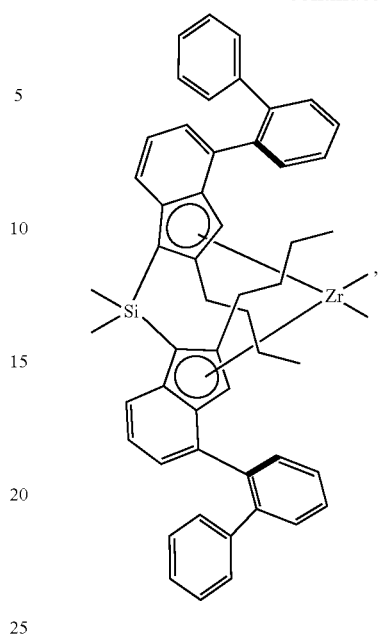
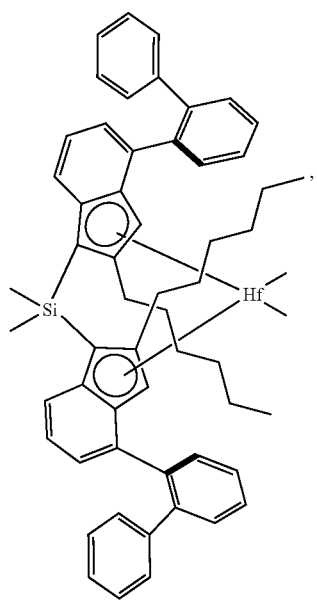
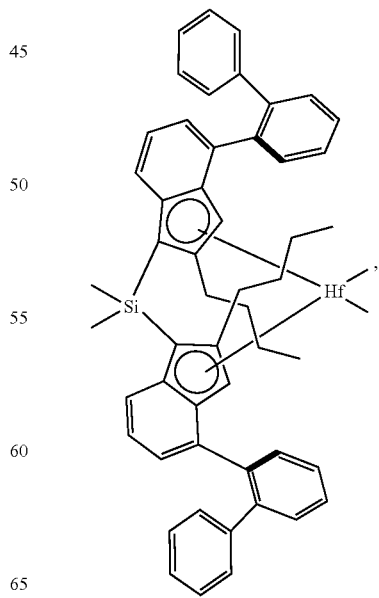

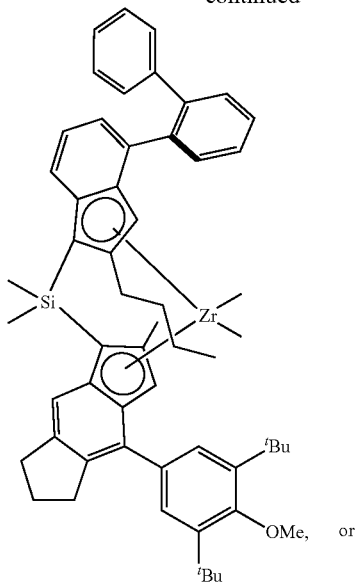

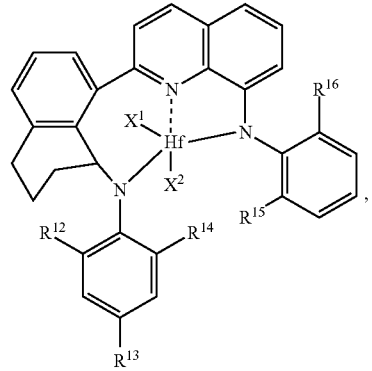

wherein:

each of $R^{12}$, $R^{13}$, $R^{14}$, $R^{15}$, and $R^{16}$ is independently hydrogen, methyl, ethyl, propyl, isopropyl, isobutyl, or tertbutyl; and each of $X^1$ and $X^2$ is independently halogen or alkyl.

6. The method of claim 1, further comprising producing the bimodal rubber by using transition metal pyridyldiamides from a catalyst system including one or more of (1) to (8) below:

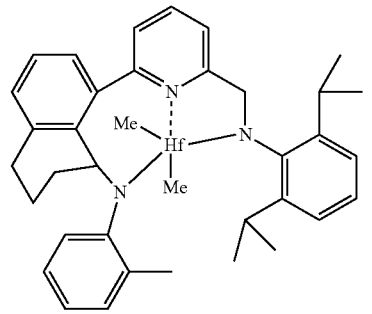

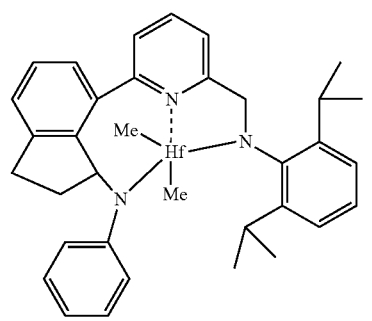

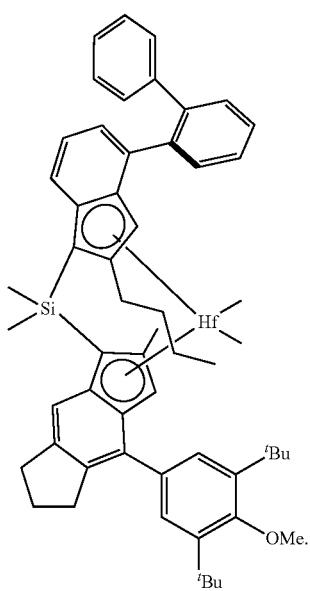

5. The method of claim 1, further comprising producing the bimodal rubber by using a transition metal pyridyldiamide catalyst component represented by formula (III):

(3)

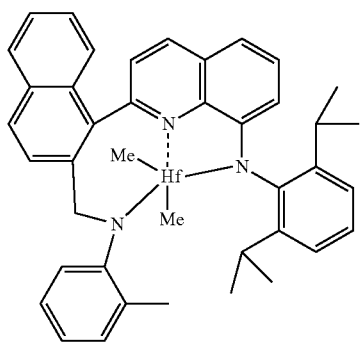

(4)

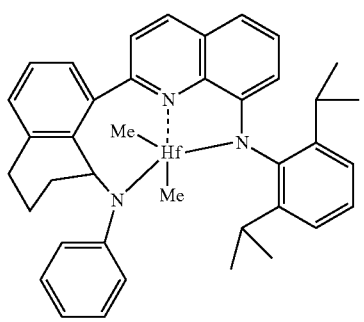

(5)

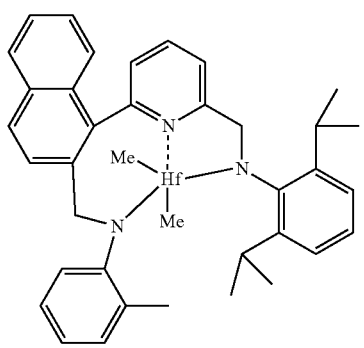

(6)

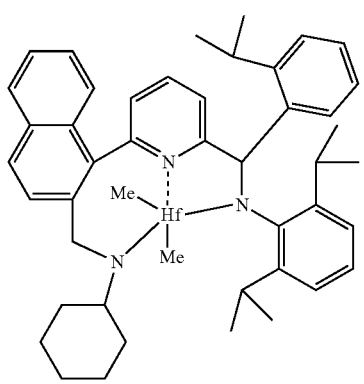

(7)

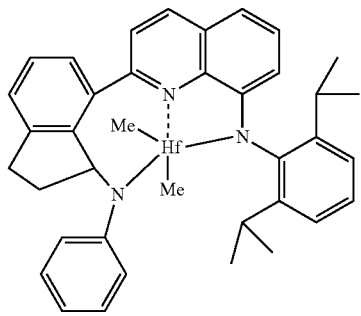

(8)

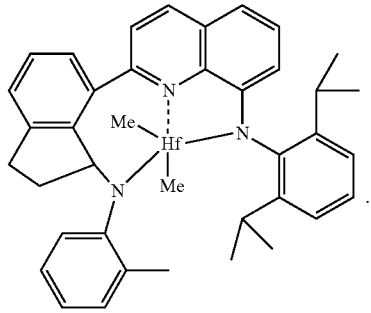

.

7. The method of claim 1, further comprising producing the bimodal rubber by using a bridged biscyclopentadienyl compound represented by the formula:

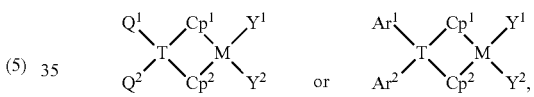

wherein:
M is zirconium or hafnium;
each of $Cp^1$ and $Cp^1$ is independently a substituted or unsubstituted cyclopentadienyl-containing group;
T is a Group 14 element containing bridging group;
each of $Y^1$ and $Y^2$ is independently an anionic leaving group;
each of $Q^1$ and $Q^2$ is independently a substituted or unsubstituted hydrocarbyl group; and
each of $Ar^1$ and $Ar^2$ is independently a substituted or unsubstituted aryl group.

8. The method of claim 7, further comprising producing the bimodal rubber, wherein $Ar^1$ and $Ar^2$ may be independently:

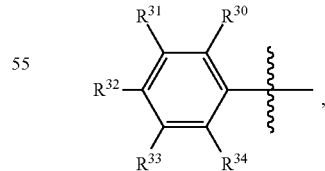

wherein each of $R^{30}$, $R^{31}$, $R^{32}$, $R^{33}$, and $R^{34}$ may be independently hydrogen, linear or branched $C_1$-$C_{40}$ hydrocarbyl, linear or branched substituted $C_1$-$C_{40}$ hydrocarbyl, silylcarbyl, substituted silylcarbyl, $C_6$-$C_{10}$ aryl, substituted $C_6$-$C_{10}$ aryl, —$NR'_2$, —$SR'$, —$OR'$, —$OSiR'_3$, —$PR'_2$, where each R' is hydrogen, halogen, $C_1$-$C_{10}$ alkyl, or phenyl;

Q¹ and Q² may be independently hydrogen, linear or branched $C_1$-$C_{40}$ hydrocarbyl, linear or branched substituted $C_1$-$C_{40}$ hydrocarbyl, silylcarbyl, substituted silylcarbyl, $C_6$-$C_{10}$ aryl, substituted $C_6$-$C_{10}$ aryl, —NR'₂, —SR', —OR', —OSiR'₃, —PR'₂, where each R' is hydrogen, halogen, $C_1$-$C_{10}$ alkyl, or phenyl;

each of Cp¹ and Cp² may be independently unsubstituted cyclopentadienyl, substituted cyclopentadienyl, unsubstituted indenyl, substituted indenyl, unsubstituted fluorenyl, or substituted fluorenyl; and wherein Y¹ and Y² may be independently hydrogen, halide, hydroxyl, or $C_1$-$C_{50}$ substituted or unsubstituted hydrocarbyl, amide, alkoxide, sulfide, phosphide, halide, or a combination thereof, or Y¹ and Y² are joined together to form a metallocycle ring, or Y¹ and Y² are joined to form a chelating ligand, or an alkylidene.

9. The method of claim 1, further comprising making the bimodal rubber by contacting at least one olefin with a catalyst system, comprising Catalyst A and Catalyst B, wherein:

Catalyst A is a bridged biscyclopentadienyl compound comprising:
i) at least one unsubstituted cyclopentadienyl ligand or aromatic fused-ring substituted cyclopentadienyl ligand;
ii) one aromatic fused-ring substituted cyclopentadienyl ligand;
iii) a transition metal bound to both cyclopentadienyl ligands; and
iv) a bridge group connecting the two cyclopentadienyl ligands, said bridge having one or more carbon or silicon atoms; and wherein Catalyst B is a transition metal pyridyldiamide compound represented by formula (I) or (II):

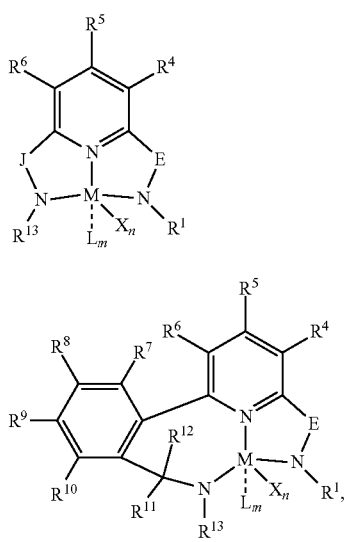

wherein:
M is a Group 3, 4, 5, 6, 7, 8, 9, or 10 metal;
E is C(R²) or C(R³)(R³');
X is an anionic leaving group;
L is a neutral Lewis base;
R¹ and R¹³ are independently selected from substituted or unsubstituted hydrocarbyl or silyl groups;

R² is a group containing 1-10 carbon atoms that is optionally joined with R⁴ to form an aromatic ring;

R³, R³⁺, R⁴, R⁵, R⁶, R⁷, R⁸, R⁹, R¹⁰, R¹¹, and R¹² are each independently selected from hydrogen, substituted or unsubstituted hydrocarbyl, alkoxy, silyl, amino, aryloxy, halogen, and phosphino;

J is a divalent group that forms a three-atom-length bridge between the pyridine ring and the amido nitrogen;

n is 1 or 2;

m is 0, 1, or 2;

two X groups may be joined to form a dianionic group;

two L groups may be joined to form a bidentate Lewis base;

an X group may be joined to an L group to form a monoanionic bidentate group; and adjacent groups from the following R³, R³', R⁴, R⁵, R⁶, R⁷, R⁸, R⁹, R¹⁰, R¹¹, and R¹² may be joined to form a ring.

10. The method of claim 9, wherein the bridged biscyclopentadienyl compound of Catalyst A comprises:

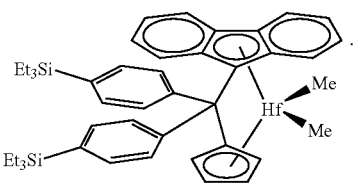

11. The method of claim 1, further comprising making the bimodal rubber by contacting at least one olefin with a catalyst system comprising a transition metal pyridyldiamide compound represented by formula (III):

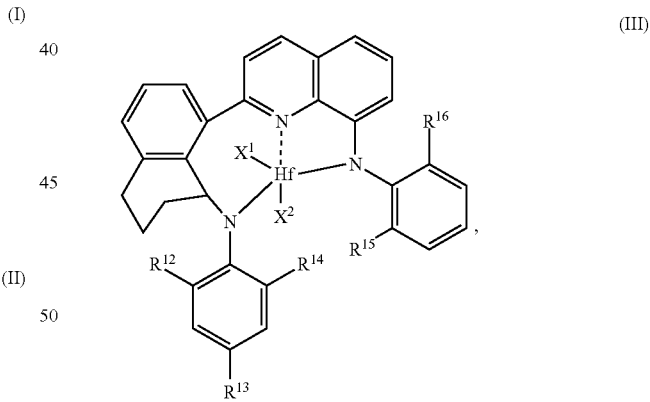

wherein:
each of R¹², R¹³, R¹⁴, R¹⁵, and R¹⁶ is independently hydrogen, methyl, ethyl, propyl, isopropyl, isobutyl, or tertbutyl, and each of X¹ and X² is independently halogen or alkyl.

12. The method of claim 1, further comprising making the bimodal rubber by contacting at least one olefin with a catalyst system including the following transition metal pyridyldiamide compound:

(4)

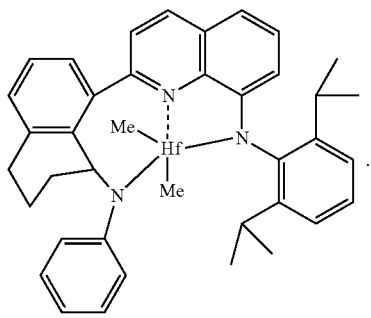

13. The method of claim 1, further comprising making the bimodal rubber by using Catalysts A and B, wherein:

Catalyst A is used to prepare a moderate molecular weight (MW) bimodal rubber having a majority of propylene, wherein Catalyst A is a Cs symmetric bridged metallocene of bis(p-triethylsilylphenyl)carbyl(cyclopentadienyl)(2,7-di-t-butylfluorenyl)hafnium dimethyl:

(A)

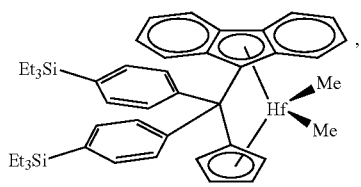

activated by N, N-dimethyl-anilinium-tetrakis-(pentafluorophenyl) borate; and

Catalyst B is used to prepare an ultra-high MW bimodal rubber, and is a non-metallocene pyridyldiamide catalyst of 2-(8-anilino-5,6,7,8-tetrahydronaphthalen-1-yl)-N-(2,6-diisopropylphenyl)quinolin-8-amido hafnium dimethyl:

(B)

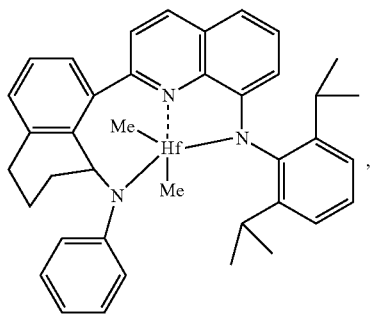

activated by N, N-dimethyl-anilinium-tetrakis(pentafluorophenyl) borate.

14. The method of claim 1, wherein the bimodal rubber comprises an ultra-high molecular weight (MW) fraction and a moderate molecular weight (MW) fraction, and wherein based upon a total weight of the copolymer the bimodal rubber comprises from about 5 to about 50 wt % of the ultra-high MW fraction.

15. The method of claim 1, wherein the bimodal rubber comprises an ultra-high molecular weight (MW) fraction and a moderate molecular weight (MW) fraction, and wherein based upon a total weight of the copolymer the bimodal rubber has at least about 50 wt % of the moderate MW fraction.

16. The method of claim 1, wherein the bimodal rubber comprises an ultra-high molecular weight fraction and a moderate molecular weight fraction, and wherein the ultra-high molecular weight fraction has one or more of:
 a) a peak molecular weight of from about 1,000,000 g/mol to 20,000,000 g/mol,
 b) an ethylene content of greater than about 45 wt %,
 c) a propylene content of from about 25 wt % to about 55 wt %,
 d) a diene content of from about zero to about 12 wt %, and
 e) an ethylidene norbornene content of from about 1 wt % to about 7 wt %.

17. The method of claim 1, wherein the bimodal rubber comprises an ultra-high molecular weight fraction and a moderate molecular weight fraction, and wherein the moderate molecular weight fraction has one or more of:
 a) a peak molecular weight of from about 100,000 g/mol to about 800,000 g/mol,
 b) an ethylene content of less than about 45 wt %,
 c) a propylene content of from about 50 wt % to about 90 wt %,
 d) a diene content of from about zero to about 12 wt %, and
 e) an ethylidene norbornene content of from about 1 wt % to about 7 wt %.

18. The method of claim 1, wherein the bimodal rubber comprises from about 0.1 wt % to about 20 wt % of an ultra-high molecular weight component, based upon a total weight of the copolymer;
 the bimodal rubber has from about 80 wt % to about 99.9 wt % of a moderate molecular weight component, based upon a total weight of the copolymer; and
 wherein the bimodal rubber has an improved molecular weight split ratio ("IR bimodal rubber") and composition distribution, as compared to a bimodal rubber copolymer produced within two or more reactors in series.

19. The method of claim 1, wherein the pellet-stable bimodal rubber comprises from about 87.5 to about 92.5 wt % of the bimodal rubber and about 7.5 to about 12.5 wt % of the RCP.

20. The method of claim 1, wherein the bimodal rubber comprises an ultra-high molecular weight fraction and a moderate molecular weight fraction;
 wherein the ultra-high molecular weight (MW) component has a peak molecular weight of from about 1,000,000 g/mol to about 20,000,000 g/mol, and wherein the ultra-high MW component has and one or more of:
 a molecular weight (MW) spread (half-peak width) of from about 2 to about 20;
 an ethylene content of from about 40 wt % to about 80 wt %;
 a $C_3$ to $C_{40}$ alpha olefin content of from about 20 wt % to about 60 wt %; and
 a diene content of 0.1 to 12 wt %.

21. The method of claim 1, wherein the bimodal rubber comprises an ultra-high molecular weight fraction and a moderate molecular weight fraction;
 wherein the moderate molecular weight (MW) component has a peak molecular weight of from about 100,000 to less than about 800,000 g/mol, and wherein the moderate MW component has one or more of:

a molecular weight (MW) spread (half peak width) of from about 2 to 20;

an ethylene content of from about 10 to about 50 wt %;

a $C_3$ to $C_{40}$ alpha olefin content of from about 50 wt % to about 90 wt %; and a diene content of from about 0.1 to about 12 wt %.

22. The method of claim 1, wherein the bimodal rubber has one or more of:

a) a $g'_{vis}$ value of about 0.95 or greater;

b) a Mw of about 500,000 g/mol or more;

c) a Mn of about 50,000 g/mol or more;

d) a Mw/Mn of from about 3 to about 15; and e) an ethylene content of about 55 wt % or less.

23. The method of claim 1, wherein the RCP comprises propylene and at least one alpha-olefin comonomer; and wherein the propylene:total comonomer molar ratio of the RCP is from about 90:10 to about 99.5:0.5.

24. The method of claim 1, wherein the RCP comprises propylene and at least one alpha-olefin comonomer, wherein the comonomer is hexene or ethylene.

25. The method of claim 1, wherein the RCP has a weight average molecular weight (Mw) greater than 200,000 and an Mw/Mn from 1 to 6.

26. The method of claim 1, wherein the RCP has a random statistical distribution of monomer units, and wherein a probability of finding a given type of a monomer residue at a particular point in a polymer chain is about equal to a mole fraction of that particular monomer residue in the chain.

27. The method of claim 1, wherein the bimodal rubber comprises bimodal EPDMs comprising ethylene, alpha-olefin, and diene terpolymers, ethylene, propylene, and 5-ethylidene-2-norbornene terpolymers, or a combination thereof.

28. The method of claim 1, further comprising forming pellets with the pellet-stable bimodal rubber.

29. The method of claim 28 wherein the pellets are extrudable without an addition of a particulate filler.

30. The method of claim 1, wherein the pellet-stable bimodal rubber is pelletized without baling.

* * * * *